US007702795B2

(12) United States Patent  (10) Patent No.: US 7,702,795 B2
Zintel et al.  (45) Date of Patent: Apr. 20, 2010

(54) PEER NETWORKING HOST FRAMEWORK AND HOSTING API

(75) Inventors: William Michael Zintel, Kenmore, WA (US); Daniel R. Weisman, Kirkland, WA (US); Shyamalan Pather, Redmond, WA (US); Ravi T. Rao, Redmond, WA (US); Mason K Bendixen, Bellevue, WA (US); Christopher M Rude, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/336,756

(22) Filed: Jan. 19, 2006
(Under 37 CFR 1.47)

(65) Prior Publication Data
US 2006/0168159 A1  Jul. 27, 2006

Related U.S. Application Data

(62) Division of application No. 09/872,614, filed on Jun. 1, 2001, now Pat. No. 7,171,475.

(60) Provisional application No. 60/250,863, filed on Dec. 1, 2000.

(51) Int. Cl.
*G06F 15/16* (2006.01)
(52) U.S. Cl. .................. 709/227; 709/228; 709/230
(58) Field of Classification Search ............... 709/227, 709/228, 230
See application file for complete search history.

(56) References Cited

U.S. PATENT DOCUMENTS

| 5,394,556 | A | 2/1995 | Oprescu |
| 5,491,800 | A | 2/1996 | Goldsmith et al. |
| 5,499,343 | A | 3/1996 | Pettus |
| 5,559,967 | A | 9/1996 | Oprescu et al. |
| 5,627,964 | A | 5/1997 | Reynolds et al. |
| 5,689,708 | A | 11/1997 | Regnier et al. |
| 5,748,980 | A | 5/1998 | Lipe et al. |
| 5,764,930 | A | 6/1998 | Staats |

(Continued)

FOREIGN PATENT DOCUMENTS

WO   WO 99/35856   7/1999

OTHER PUBLICATIONS

"EIB Technology," *EIB* (2000).

(Continued)

*Primary Examiner*—Kenny S Lin
(74) *Attorney, Agent, or Firm*—Klarquist Sparkman, LLP

(57) ABSTRACT

A device hosting framework provides hosting for software-implemented logical devices (including peripheral devices bridges) on a computer to expose their services as controlled devices per a peer networking protocol. The device hosting framework encapsulates discovery, description and control protocol operations of the peer networking protocol, which frees the developers of the hosted devices from having to individually implement the peer networking protocol in the hosted devices' software and need implement only the core functionality of the hosted device. The device hosting framework operates as a host supporting device interoperability via the peer networking protocol for multiple hosted devices.

6 Claims, 21 Drawing Sheets

U.S. PATENT DOCUMENTS

| | | | |
|---|---|---|---|
| 5,764,982 | A | 6/1998 | Madduri |
| 5,787,246 | A | 7/1998 | Lichtman et al. |
| 5,787,259 | A | 7/1998 | Haroun et al. |
| 5,793,979 | A | 8/1998 | Lichtman et al. |
| 5,809,331 | A | 9/1998 | Staats et al. |
| 5,845,081 | A * | 12/1998 | Rangarajan et al. ......... 709/224 |
| 5,881,230 | A | 3/1999 | Christensen et al. |
| 5,903,455 | A * | 5/1999 | Sharpe et al. ................ 700/83 |
| 5,903,728 | A | 5/1999 | Semenzato |
| 5,903,894 | A | 5/1999 | Reneris |
| 5,938,752 | A | 8/1999 | Leung et al. |
| 5,956,715 | A | 9/1999 | Glasser et al. |
| 6,047,312 | A | 4/2000 | Brooks et al. |
| 6,101,499 | A | 8/2000 | Ford et al. |
| 6,199,136 | B1 | 3/2001 | Shteyn |
| 6,363,411 | B1 | 3/2002 | Dugan et al. |
| 6,438,618 | B1 | 8/2002 | Lortz et al. |
| 6,571,253 | B1 | 5/2003 | Thompson et al. |
| 6,574,655 | B1 | 6/2003 | Libert et al. |
| 6,643,650 | B1 | 11/2003 | Slaughter et al. |
| 6,687,735 | B1 | 2/2004 | Logston et al. |
| 6,725,281 | B1 * | 4/2004 | Zintel et al. ................ 719/318 |
| 6,772,216 | B1 | 8/2004 | Ankireddipally et al. |
| 6,775,244 | B1 * | 8/2004 | Hattig ........................ 370/257 |
| 6,779,004 | B1 | 8/2004 | Zintel |
| 6,782,542 | B1 | 8/2004 | Mein et al. |
| 6,789,077 | B1 | 9/2004 | Slaughter et al. |
| 6,789,126 | B1 | 9/2004 | Saulpaugh et al. |
| 6,792,466 | B1 | 9/2004 | Saulpaugh et al. |
| 6,807,565 | B1 | 10/2004 | Dodrill et al. |
| 6,823,522 | B1 | 11/2004 | Lamb |
| 6,832,120 | B1 | 12/2004 | Frank et al. |
| 6,850,979 | B1 | 2/2005 | Saulpaugh et al. |
| 6,854,120 | B1 | 2/2005 | Lo et al. |
| 6,862,594 | B1 | 3/2005 | Saulpaugh et al. |
| 6,868,447 | B1 | 3/2005 | Slaughter et al. |
| 6,892,230 | B1 * | 5/2005 | Gu et al. ..................... 709/220 |
| 6,898,618 | B1 | 5/2005 | Slaughter et al. |
| 6,910,068 | B2 | 6/2005 | Zintel et al. |
| 7,085,814 | B1 | 8/2006 | Gandhi et al. |
| 2002/0004815 | A1 | 1/2002 | Muhlestein et al. |
| 2002/0010781 | A1 | 1/2002 | Tuatini |
| 2002/0042829 | A1 | 4/2002 | Mizuhara et al. |
| 2002/0065946 | A1 | 5/2002 | Narayan |
| 2005/0022210 | A1 | 1/2005 | Zintel et al. |

OTHER PUBLICATIONS

Anderson, "FireWire System Architecture: Second Edition, IEEE 1394a," chapters 1-4 (1999), 75 pages.

Arnold et al., "The Jini™ Specification," *Addison-Wesley Longman, Inc.*, Reading, Massachusetts (1999, Sun Microsystems, Inc.), 55 pages.

Bennett et al., "Integrating Presence with Multi-media Communications," *White Paper*, Dynamicsoft, (2000), pp. 1-17, 19 pages.

"Lonworks Core Technology," *Echelon Corporation*, (2000), 2 pages.

"Underlying Protocol of Echelon's LONWORKS® Network Adopted as New ANSI Standard, Free Reference Implementation Available to Developers," *Echelon Corporation*, (2000), 2 pages (2000).

Edwards, "Core Jini™, Second Edition," *Prentice Hall PTR*, Upper Saddle River, New Jersey (2001), 71 pages.

"EIB Technology," *EIB* (2000), 49 pages.

Freeman et al., "Java Spaces™ Principles, Patterns and Practice," *Addison-Wesley Longman, Inc.*, Reading, Massachusetts (1999, Sun Microsystems, Inc.) pp. 1-17, 17 pages.

Handley et al., "SIP: Session Initiation Protocol," *The Internet Society*, (Aug. 6, 2000), 130 pages.

"Specification of the Home Audio/Video Interoperability (HAVi) Architecture," *The HAVi Specification, Version 1.0* (Jan. 18, 2000), 498 pages.

Marples, "Naming and Accessing Network Appliances Using Extensions to the Session Initial Protocol," *SIP for Toaster*, Telcordia Technologies (2000), 14 pages.

Moyer et al., "Framework Draft for Networked Appliances Using the Session Initiation Protocol," *Internet Engineering Task Force*, (Nov. 2000), 31 pages.

Moyer et al., "SIP for Light Bulbs, Using SIP to Support Communication with Networked Appliances," Telechordia Technologies (Aug. 2, 2000), 15 pages.

"Networked Appliance," *AR Greenhouse*, Telecordia Technologies, (Dec. 15, 2000), 2 pages.

Rosenberg et al., "An Application Server Architecture for Communications Services," *White Paper*, Dynamicsoft, (2000), pp. 1-12, 14 pages.

Rosenberg et al., "SIP Extensions for Instant Messaging," *Internet Engineering Task Force*, (Jun. 15, 2000), 30 pages.

Rosenberg et al., "SIP Extensions for Presence," *Internet Engineering Task Force*, (Jun. 15, 2000), 77 pages.

"Salutation Architecture Specification (Part-1), Version 2.0c," *The Salutation Consortium* (Jul. 1, 1999) pp. 1-94, 101 pages.

"Salutation Consortium Frequently Asked Questions," *The Salutation Consortium* (Jul. 1, 1999), 6 pages.

"Sun Microsystems and Thalia Products Inc. to Collaborate to Co-Develop Network Software and Protocols for the Home, Results to Make Networked Appliances for the Home a Reality," *Sunbeam Corporation*, (2000), 2 pages.

"Sunbeam Joins Microsoft in the Universal Plug and Play Forum to Establish A 'Universal' Smart Appliance Technology Standard," *Sunbeam Corporation*, (2000), 2 pages.

Technical White Paper, "Jini Architectural Overview," *Sun Microsystems, Inc.*, (1999), pp. 1-23, 29 pages.

"How it works," *Thalia*, visited Jan. 4, 2001, 3 pages.

"Time for Smart Talk is Over, Sunbeam Trumps Small Appliance Industry With Smart Appliance Debut," *Sunbeam Corporation*, (2000), 4 pages.

Tsang et al., "Requirements for Networked Appliances: Wide-Area Access, Control, and Interworking," *Internet Engineering Task Force*, (Sep. 2000), 9 pages.

Tsang et al., "SIP Extensions for Communicating with Networked Appliances," *Internet Engineering Task Force*, (Nov. 2000), 9 pages.

White Paper, "HAVi, the A/V digital network revolution," *HAVi Organization*, (1999), pp. 1-7, 7 pages.

* cited by examiner

FIG. 5

```xml
<?xml version="1.0"?>
<scpd xmlns="x-schema:UTL-schema.xml">
  <serviceStateTable>
    <stateVariable>
      <name>Chapter</name>
      <dataType>i4</dataType>
      <allowedValueRange>
        <minimum>1</minimum>
        <maximum>50</maximum>
        <step>1</step>
      </allowedValueRange>
      <defaultValue>0</defaultValue>
    </stateVariable>
  </serviceStateTable>

<actionList>
    <action>
      <name>GotoChapter</name>
      <argumentList>
        <argument>
          <name>NewChapter</name>
          <direction>in</direction>
          <relatedStateVariable>Chapter</relatedStateVariable>
        </argument>
        <argument>
          <name>OldChapter</name>
          <direction>out</direction>
          <relatedStateVariable>Chapter</relatedStateVariable>
        </argument>
      </argumentList>
    </action>
  </actionList>
</scpd>
```

FIG. 6

```
[
  object
  uuid(ad8b5af4-93fe-4f21-8ff9-a569dc8fcf26),
  helpstring("avtransport-0-1 interface"),
  oleautomation
]
interface IUPnPService_avtransport_0_1
{
  // State Variables (properties)
  [propget] HRESULT Chapter([out, retval] INT * pval);

// Actions (methods)
  HRESULT GotoChapter ([in, out] INT * pChapter);

}

[
  uuid(8944228e-746b-439b-83ba-089d141eaf6f)
]
library UPNPPrivLib
{
  [
    uuid(7e46fad0-e36b-4be9-b7f2-55c8c075ee4a),
    helpstring("avtransport-0-1 dispinterface"),
    nonextensible
  ]
  dispinterface DIUPnPService_avtransport_0_1
  {
    interface IUPnPService_avtransport_0_1;
  };
};
```

FIG. 8

```
[
  uuid(bebc3352-9eb8-4736-b1eb-093daa00d113),
  helpstring("UPnPRegistrar Class")
]
coclass UPnPRegistrar
{
  [default] interface IUPnPRegistrar;
  interface IUPnPReregistrar;
};
```

FIG. 11

```
struct tagUPNP_SOAP_REQUEST
{
BSTR              bstrActionName
IXMLDOMNodeList * pxdnlArgs
} UPNP_SOAP_REQUEST;
```

FIG. 12

```
struct tagUPNP_CONTROL_REQUEST
{
BSTR      bstrActionName;
DWORD     cInputArgs;
VARIANT   rgvarInputArgs[];
} UPNP_CONTROL_REQUEST;
```

FIG. 13

```
struct tagUPNP_CONTROL_RESPONSE
{
        BSTR bstrActionName;
union
{
struct
{
DWORD           cOutputArgs;
VARIANT    rgvarOutputArgs[];
        };
struct
{
BSTR       bstrFaultCode;
BSTR       bstrFaultString;
DWORD           dwUPnPErrorCode;
BSTR       bstrUPnPErrorString;
        };
};
} UPNP_CONTROL_RESPONSE;
```

FIG. 14

```
Deserialize(
    UPNP_SOAP_REQUEST          * pusr,
    IUPnPServiceDescriptionInfo * pusdi,
    UPNP_CONTROL_REQUEST       * pucr)
{
IXMLDOMNode * pxdnArgument = NULL;

// Set up UPNP_CONTROL_REQUEST structure.

pucr->bstrActionName = SysAllocString(pusr->bstrActionName);
pucr->cInputArgs = pusr->pxdnlArgs->length;
pucr->rgvarInputArgs = AllocateMemory(pucr->cInputArgs *
                    sizeof(VARIANT));

// Deserialize each argument

DWORD i = 0;

for each pxdnArgument in pusr->pxdnlArgs
{
VARIANT varDataType;

VariantInit(&varDataType);
varDataType.vt = VT_BSTR;
V_BSTR(&varDataType) =
    pusdi->GetArgumentType(pucr->bstrActionName,
                pxdnArgument.name);

pxdnArgument->put_dataType(varDataType);
pxdnArgument->get_nodeTypedValue(&pucr->rgvarInputArgs[i]);
i++;
}
}
```

FIG. 15

```
struct tagUPNP_SOAP_RESPONSE
{
union
{
struct
{
BSTR        bstrActionName;
IXMLDOMNodeList * pxdnlOutArgs;
};
struct
{
BSTR        bstrFaultCode;
BSTR        bstrFaultString;
BSTR        bstrUPnPErrorCode;
BSTR        bstrUPnPErrorString;
};
}
} UPNP_SOAP_RESPONSE;
```

FIG. 16

```
[
        uuid(0FB40F0D-1021-4022-8DA0-AAB0588DFC8B),
        helpstring("AutomationProxy Class")
]
coclass UPnPAutomationProxy
{
        [default] interface IUPnPAutomationProxy;
        interface IUPnPServiceDescriptionInfo;
};
```

FIG. 17

```
[
    object,
    uuid(de2eca21-99d0-4d92-b2ae-cb994e85f31f),
    pointer_default(unique),
    version(1.0)
]

interface IUPnPEventingManager : IUnknown
{
    [helpstring("method Initialize")]
    HRESULT Initialize(
            [in] LPCWSTR            szUdn,
            [in] LPCWSTR            szSid,
            [in] IUPnPAutomationProxy *  puap,
        [in] IUnknown *       punkSvc);
    [helpstring("method AddSubscriber")]
    HRESULT AddSubscriber(
        [in] LPWSTR    szCallbackUrl,
        [in] DWORD *   pcsecTimeout,
            [out] LPWSTR *  pszSid);
    [helpstring("method RenewSubscriber")]
    HRESULT RenewSubscriber(
        [in] DWORD      *      pcsecTimeout,
        [in] LPWSTR    szSid);
    [helpstring("method RemoveSubscriber")]
    HRESULT RemoveSubscriber(
        [in] LPWSTR  szSid);
    [helpstring("method Shutdown")]
    HRESULT Shutdown();
} interface IUPnPEventSink: IUnknown
{
    [helpstring("method OnStateChanged"), hidden]
    HRESULT OnStateChanged(
                [in] DWORD cChanges,
                [in, size_is(cChanges)] DISPID rgdispidChanges[]);
    [helpstring("method OnStateChangedSafe")]
    HRESULT OnStateChangedSafe(
                [in] SAFEARRAY(DISPID) rgdispidChanges);
}
```

FIG. 18

```
[
    object,
    uuid(b05e0973-c342-4650-9d04-9224c6e6ded9),
    pointer_default(unique),
    version(1.0)
]

interface IUPnPEventSource: IUnknown
{
  [helpstring("method Advise")]
  HRESULT Advise(
         [in] IUnknown *  punkSubscriber);

[helpstring("method Unadvise")]
  HRESULT Unadvise(
     [in] IUnknown * punkSubscriber);
}
```

FIG. 19

```
struct UPNP_SUBSCRIBER
{
        UPNP_EVENT_SOURCE *     pes;            // Pointer to event source
        LPWSTR                  szUrl;          // Callback URL
        FILETIME                ftTimeout;      // Timeout period
        DWORD                   csecTimeout;    // Timeout period
        DWORD                   iSeq;           // Event sequence number
        LPTSTR                  szSid;          // Subscription Identifier
        DWORD                   cRenewals;      // # of renewals received
        HANDLE                  hEventQ;        // Event signaled when Q full
        UPNP_EVENT *            pueQueue;       // Event queue
        HANDLE                  hWait;          // Handle of registered wait
        UPNP_SUBSCRIBER *       psubNext;       // Next subscriber in list
};

struct UPNP_EVENT_SOURCE
{
        LPWSTR                  szEsid;         // Event source identifier
        UPNP_SUBSCRIBER *       pusList;        // List of subscribers
        HANDLE                  hTimerQ;        // Handle to timer queue
        UPNP_EVENT_SOURCE *     pesNext;        // Next in list
        DWORD                   csecTimeout;    // Preferred timeout
};
struct UPNP_RENEWAL
{
        LPWSTR                  szEsid;         // Event source identifier
        LPTSTR                  szSid;          // Subscription Identifier
        DWORD                   iRenewal;       // renewal index
};
struct UPNP_WAIT_PARAMS
{
        LPWSTR                  szEsid;         // Event source identifier
        LPTSTR                  szSid;          // Subscription Identifier
};

struct UPNP_EVENT
{
        LPWSTR                  szBody;         // body of event message
};
```

FIG. 20

```
HRESULT HrRegisterEventSource(LPCWSTR szEsid);

HRESULT HrDeregisterEventSource(LPCWSTR szEsid);

HRESULT HrAddSubscriber(
        LPCWSTR       szEsid,
        LPCWSTR       szCallbackUrl,
        LPCWSTR       szEventBody,
        DWORD *       pcsecTimeout,
        LPWSTR  *     pszSid);

HRESULT HrRenewSubscriber(
        LPCWSTR       szEsid,
        DWORD *       pcsecTimeout,
        LPCWSTR       szSid);

HRESULT HrRemoveSubscriber(
        LPCWSTR       szEsid,
        LPCWSTR       szSid);

HRESULT HrSubmitEvent(LPCWSTR szEsid,
                LPCWSTR szEventBody);

HRESULT HrSubmitEventZero(LPCWSTR szEsid, LPCWSTR szSid,
                LPCWSTR   szEventBody);
```

PEER NETWORKING HOST FRAMEWORK AND HOSTING API

RELATED APPLICATIONS

This is a divisional of U.S. patent application Ser. No. 09/872,614, filed Jun. 1, 2001, which in turn claims the benefit of U.S. Provisional Application No. 60/250,863, filed Dec. 1, 2000. Both applications are incorporated herein in their entirety.

TECHNICAL FIELD

This invention relates to peer networking protocols, and more particularly relates to host-provided peer networking protocol support for hosted devices and software modules.

BACKGROUND AND SUMMARY

A peer networking protocol enables peer-to-peer network connectivity among networked computing devices. Examples of peer networking protocols include the Universal Plug and Play (UPnP), JINI, HAVI, Salutation, and others. The UPnP protocol, for example, is designed for pervasive peer-to-peer network connectivity of PCs of all form factors, intelligent appliances, and wireless devices using a distributed, open networking architecture based on TCP/IP and Internet networking standards, so as to enable seamless proximity networking in addition to control and data transfer among networked devices in the home, office, and everywhere in between.

Previously in the UPnP protocol, a developer of a logical device (including, without limitation, both hardware devices, such as a portable MP3 audio player hardware, and software devices, such as an MP3 audio jukebox software application running on a personal computer) that wished to expose the device for peer networking via the UPnP protocol would individually implement the UPnp protocol in that logical device. Additionally, a legacy device built to use a non-UPnP connectivity protocol (e.g., a personal computer peripheral) could be exposed for peer networking via UPnP by implementing a "UPnP bridge," which adapts between the UPnP protocol and the legacy device's non-UPnP connectivity protocol. In either case, the logical device developer or UPnP bridge-to-legacy device developer would have to expend considerable effort and work to implement the UPnP protocol in the individual logical device or bridge. Further, where multiple logical devices and/or bridges execute using the same hardware computing resources (such as where logical devices for the MP3 audio jukebox application and a DVD movie player application, together with a UpnP bridge to universal serial bus (USB) peripheral hardware devices, are all running on a same personal computer), the separate implementation of the UPnP protocol by each of these logical devices and UPnP bridges results in separate consumption of the computing resources.

The present invention facilitates the development of peer networking capable logical devices, eliminating separate and duplicative implementation of a peer networking protocol by individual logical devices, by providing peer networking hosting of the logical devices. A peer networking host implements the peer networking protocol and provides a programming interface for logical devices and bridges to expose their services to the peer networking protocol using the peer networking protocol implementation of the host. The logical devices and bridges are thus able to expose their services on the peer networking protocol without individually implementing the peer networking protocol.

In accordance with an embodiment of the invention illustrated herein, a device hosting framework provides services for software and devices on a computer (hereafter "hosted devices") to expose themselves as controlled devices per a peer networking protocol (e.g., the Universal Plug and Play protocol or another peer networking protocol). The hosted devices can include bridges to computer peripheral devices and software that provide a set of services (e.g., the device's functionality). The device hosting framework encapsulates discovery, description and control protocol operations of the peer networking protocol, which frees the developers of the hosted devices from having to individually implement the peer networking protocol in the hosted devices' software and need implement only the core functionality of the hosted device. The device hosting framework operates as a host supporting device interoperability via the peer networking protocol for multiple hosted devices.

The device hosting framework defines application programming interfaces with which the hosted devices obtain hosting support for the peer networking protocol from the device hosting framework. The hosted devices register with the device hosting framework by providing information about their properties. The hosted devices also register service objects with the device hosting framework for each service (hereafter "hosted services") they provide that is to be controllable through the peer networking protocol. The service objects individually implement a programming interface (e.g., an IDispatch interface) corresponding to a service description per the peer networking protocol for the hosted service that it represents. A utility to automatically generate the programming interface from the service description is provided with the device hosting framework for use by the hosted device's developer.

The device hosting framework services discovery and description requests in the peer networking protocol received from user control point devices that are directed to its hosted devices. The device hosting framework also listens for control requests in the peer networking protocol that are targeted at the hosted devices and services. The device hosting framework translates the control requests into calls to the service objects' programming interfaces (e.g., IDispatch interfaces). The device hosting framework also translates the return information from the programming interface methods into valid control responses in the peer networking device control protocol.

Additional features and advantages will be made apparent from the following detailed description of the illustrated embodiment which proceeds with reference to the accompanying drawings.

BRIEF DESCRIPTION OF THE DRAWINGS

FIG. 5 is a listing of an illustrative service interface description in a template language.

FIG. 6 is a listing of an illustrative object interface description in interface definition language produced by the translation utility of FIG. 3 from the service interface description of FIG. 5.

FIG. 8 is a listing of a registration interface of the registrar of FIG. 7.

FIG. 11 is a listing of a SOAP request structure definition parsed by the web server of FIG. 10.

FIG. 12 is a listing of a deserialized control request structure definition in the web server of FIG. 10.

FIG. 13 is a listing of a control response structure definition in the web server of FIG. 10.

FIG. 14 is a pseudo-code listing of a deserializer in the web server of FIG. 10.

FIG. 15 is a listing of a SOAP response structure definition returned by the web server of FIG. 10.

FIG. 16 is an interface definition language listing of an automation proxy object co-class in the service control architecture of FIG. 9.

FIG. 17 is an interface definition language listing of an eventing manager object co-class in the software architecture of FIG. 2.

FIG. 18 is an interface definition language listing of an event source interface in the software architecture of FIG. 2.

FIG. 19 is a listing of eventing system data structures in the software architecture of FIG. 2.

FIG. 20 is a listing of an eventing API in the software architecture of FIG. 2.

DETAILED DESCRIPTION

Figure 1:
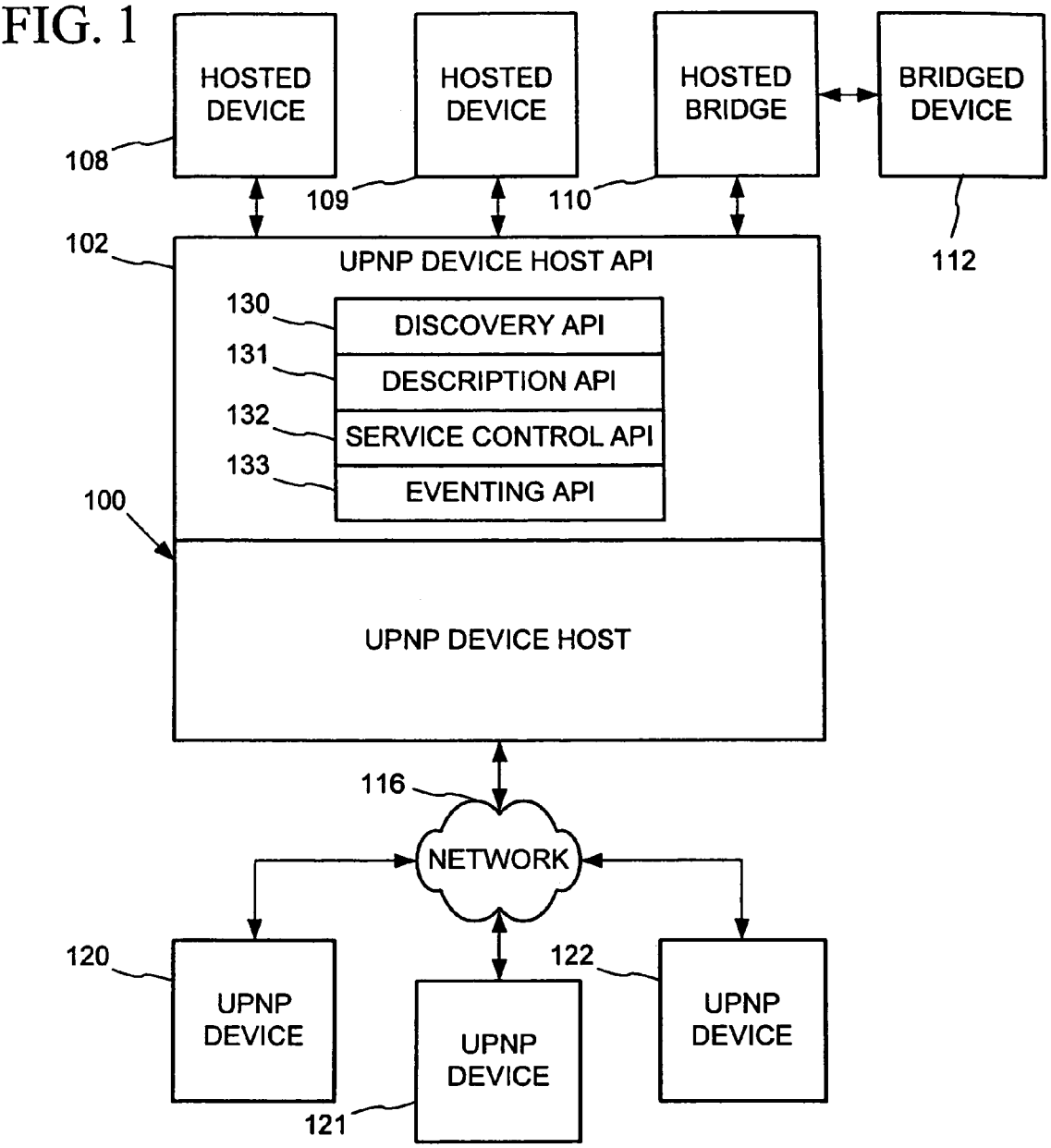
FIG. 1 is a block diagram of a peer networking host and hosting application programming interface (API) through which hosted logical devices expose services for peer networking according to an illustrated embodiment of the invention.

In the following detailed description, one implementation of peer networking hosting according to the invention is embodied in methods, products, and systems that provide a hosting framework and hosting application programming interface (herein called the Device Host 100 and the Device Host API 102 shown in FIG. 1) to support peer networking interoperability for hosted devices 108-109 and hosted bridges 110 for bridged devices 112 with other peer networking devices (e.g., UPnP devices 120-122) over a network 116. The peer networking protocol hosted in the illustrated hosting framework/API implementation may be, for example, the Universal Plug and Play (UPnP) protocol, which is discussed in more detail in the Appendix section below entitled, "Universal Plug and Play Device Architecture," or any other peer networking protocol. In particular, one implementation of the Device Host 100 and API 102 detailed below hosts devices under the UPnP protocol. Alternative implementations of the Device Host 100 and API 102 can host devices in other peer networking protocols.

The Device Host API 102 enables software modules (the hosted devices 108-109 and bridges 110 for bridged devices 112) to publish themselves as peer networking-enabled devices. These software modules (including hosted bridges) are referred to collectively as "hosted devices." The Device Host 100 encapsulates the discovery, description, and control protocols of a peer networking protocol, thus requiring hosted devices to implement only their core functionality.

One implementation detailed below of the Device Host 100 and Host API 102 is designed to run on a computing device using the Microsoft Windows operating system. Alternative implementations of the Device Host and API can be designed for other computing platforms. The illustrated Device Host API 102 is particularly targeted to hosted devices 108-110 that are the hardware computing device itself, bridges to computer peripherals connected to the computing device (e.g., universal serial bus (USB) devices, native IEEE 1394 bus devices, native infrared (IRDA) port devices, computer-enabled cameras, CD-ROM and DVD devices), and "soft" devices running on the computing device (e.g., an MP3 audio jukebox application running on the computing device). Alternative embodiments can support peer networking hosting for hosted devices that are other kinds of hardware and/or software-based devices.

The hosted devices 108-110 register themselves with the Device Host 100 by providing information about their properties. They also register service objects 220 (FIG. 7) with the Device Host for each service instance they contain. The services on hosted devices are referred to as hosted services. Each service object implements a dispatch interface 230 corresponding to the Service Description for the service that it represents. This dispatch interface is generated automatically from the Service Description by a tool.

The Device Host 100 listens for control requests targeted at the hosted services. It translates these requests into calls to the service objects' dispatch interfaces. It also translates the return information from the methods on the dispatch interfaces into valid control responses. The following Device Host Architecture section specifies the parts of the Device Host responsible for receiving control requests, performing these translations, and returning control responses.

The Device Host API 102 includes discovery, description, service control and eventing APIs 130-133, that provide an interface for the hosted devices and bridges 108-110 to the implementation of those respective layers of the peer networking protocol. These APIs are discussed in more detail in the following sections.

Terminology

In summary, the Device Host of the illustrated embodiment of the invention uses the following terminology.

Device Host The implementation of the Device Host API. The Device Host is called by hosted services to perform communications with a network. Functions performed by the Device Host include: processing control messages, sending event notifications, and sending discovery announcements and search replies.

Hosted Service A module written by a client of the Device Host API that exposes a "service" to the network. A service is able to receive commands from the network—a Tape Transport service on a VCR, for example, would allow the network to stop, play, or rewind a tape.

Hosted Device A collection of hosted services that perform a logical function. A "VCR" might be a logical device, comprised of the "Power", "Tape Transport" and "Tuner" services.

Device Host Architecture

Figure 2:
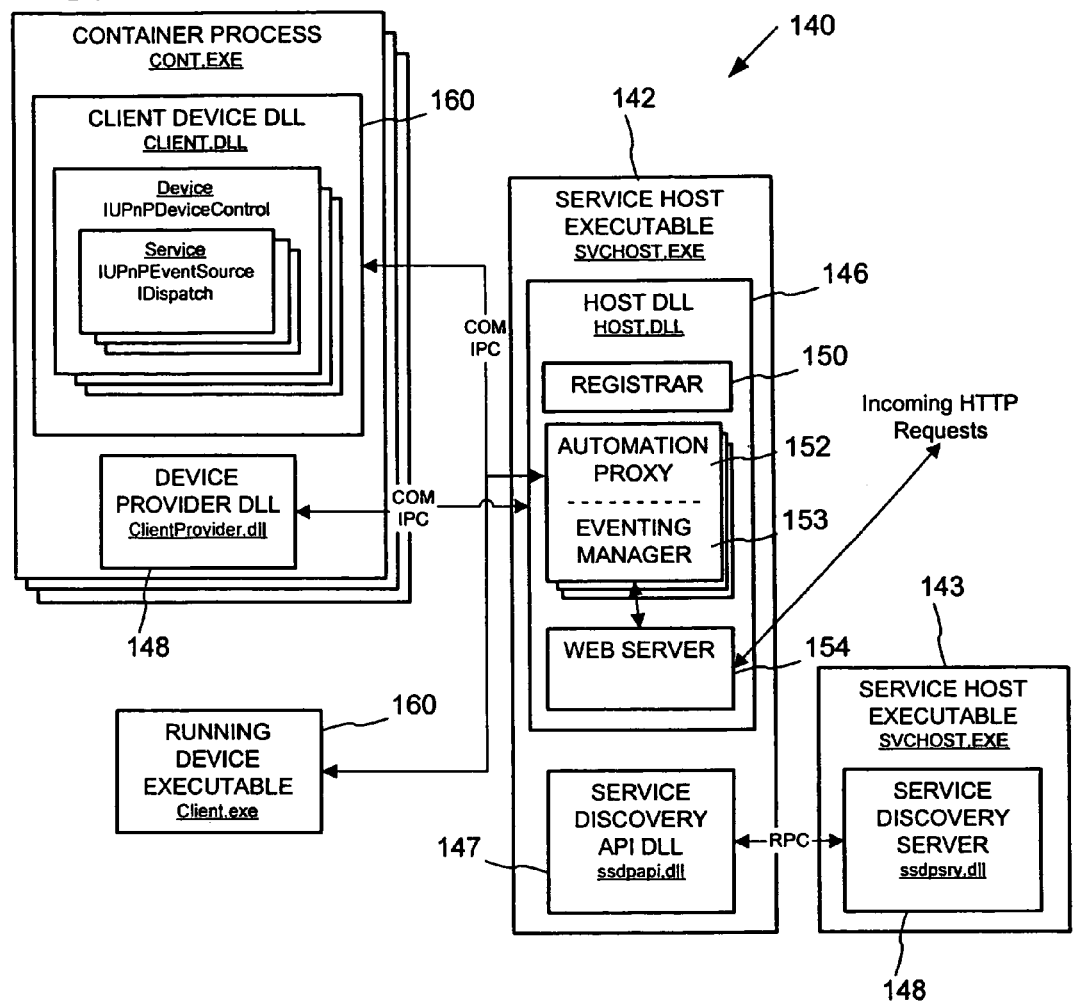
FIG. 2 is a block diagram of a software architecture of the peer networking host and hosting API of FIG. 1.

FIG. 2 illustrates a software architecture (the "Host Architecture") 140 in one implementation of the Device Host 100 (FIG. 1). In the Host Architecture 140, the Device Host 100 and Host API 102 are implemented in a pair of host executable programs 142, 143 and dynamic link library modules 146-148 that are run in the host executable programs' processes on the computing device hardware of the Device Host. A Host DLL 146 includes a service Registrar 150, Eventing Managers 153, Automation Proxies 152 and a Web Server 154, which together implement the description, service control and eventing APIs 131-133 (FIG. 1) and corresponding description, service control and eventing operations of the Device Host. A Service Discovery API DLL 147 implements the discovery API 130 (FIG. 1), and communicates via remote procedure calls (RPC) with a Service Discovery Server DLL 148 in the separate host executable program process 143 to provide discovery operations of the Device Host.

For hosting by the Device Host, the Hosted Devices and Bridges 108-110 (FIG. 1) register their services with the Registrar 150 (via a registrar interface described below), including providing discovery, presentation and control information for their services so that the Device Host can respond to discovery, presentation and control requests from other peer networking devices 120-122 for the Hosted Devices and Bridges. In one implementation of the Host Architecture 140, Hosted Devices and Bridges implemented in any of three ways can be registered with the Registrar 150, including as a Device DLL 160 or as a Device Provider DLL 162 run in a container executable process 166, and as a running executable program 164. In the Device DLL 160 (e.g., "clientdevice.dll"), the devices and services can be COM Objects that support a set of interfaces (described below) for integrating with the Device Host. A registered Device Provider DLL 162 (e.g., "clientprovider.dll") implements a device provider (described more fully below) for registering device implemented by other programs. Devices implemented by a separate running executable program (e.g., "client.exe") also can be registered. Any number of Device DLLs, Device Provider DLLs, and running Device executables can be registered. Alternative implementations of the Device Host can support registration of other types of programs and structures of Hosted Devices.

Once registered, the service discovery API and server DLLs 147, 148 provide servicing of discovery requests for the registered services from other peer networked devices 120-122 (FIG. 1). Also, the Web server 154 services incoming requests for description, presentation, service control and eventing addressed to the registered services from the other peer networked devices. The Host Architecture 140 further provides an eventing manager and automation proxy for each registered service to handle eventing and service control operations under the peer networking protocol for the registered services. The eventing manager publishes information of the device state to other peer networking devices that have requested notification under the peer networking protocol. The automation proxy receives service control requests under the peer networking protocol from other peer networking devices via the Web server, and converts the service control requests to a procedure invocations of the respective service. Interaction between the registered hosted device services and the Device Host DLLs generally is accomplished through COM inter-process procedure calls using a set of COM object interfaces described below.

Alternative implementations of the Device Host can be structured with various other software architectures, such as with Device Host operations and interaction implemented in different configurations of executable programs, library modules, processes, objects, programming interfaces and procedure calls.

As can be seen from the foregoing discussion of the Host Architecture 140, the implementation of the peer networking protocol is provided to hosted devices and services (in Device DLLs, Device Provider DLLs, and Device executables) by the Device Host 100 (in Host executables 142-143 and libraries 146-148). This enables the device/bridge developer to expose the hosted devices and their services through the peer networking protocol by writing the hosted device program as a library or executable to register and interface with the Device Host for hosting by the Device Host, and avoid having to fully implement the peer networking protocol individually in each hosted device.

Further details of the Device Host API 102 (FIG. 1) and the operation of the Device Host 100 (FIG. 1) are discussed below. In the following discussion, details specific to an implementation of the Device Host 100 for the UPnP protocol on the Microsoft Windows operating system computing platform are described. It should be easily understood that these protocol and computing platform-specific details can be readily modified in alternative implementations of the Device Host to support hosting of devices and services by the Device Host under other peer networking protocols on other computing platforms.

Device Host API

The Device Host API 102 (FIG. 1) is a framework that facilitates implementing device functionality under a peer networking protocol (e.g., UPnP or other peer networking protocol) on the host computing platform (e.g., the Microsoft Windows operating system, or other computing platform). The Hosted Devices created with the Device Host API 102 need only implement their core functionality and can rely on the API to handle the peer networking protocol-specific details of discovery, description, control, and eventing.

Implementing a Hosted Device

The Device Host API 102 implements the core UPnP protocols: discovery, description, control and eventing. The implementer of a hosted device must provide:
  a description of the device and its services
  an implementation of the device's behavior For example, the implementer of a clock device provides UPnP device and service descriptions for the clock device, and an implementation of the clock functions (such as keeping time, setting time, and responding to queries for the current time). The Device Host API 102 announces the device according to the UPnP discovery protocol, responds to queries for the device's description, routes control requests to the code that implements the clock functions, maintains subscriptions, and sends event notifications to subscribers when service state changes.

Description

A UPnP device description is an XML document that describes the properties of a device and the hierarchy of nested devices within it. The schema for UPnP device descriptions, known as the UPnP Template Language (UTL) for devices, is defined in the Appendix, the UPnP Device Architecture. Device descriptions contain links to service descriptions: separate XML documents that define the list of state variables and actions in a service. Again, the schema for service descriptions, the UPnP Template Language for services, is defined in the UPnP Device Architecture.

The implementer of a hosted device provides device and service descriptions for the hosted device. The elements of the device descriptions are defined as in the Appendix, the UPnP Device Architecture, with the following exceptions:

<controlURL>, and <eventSubURL> elements are required by the Device Host API, and are all empty; the Device Host API fills in values for these fields when the device is published.

<UDN> contains an identifier unique to the device description, which can be used to lookup the real device UDN generated by the device host.

<SCPDURL> elements do not contain URLs to service descriptions; rather, contain the service description filename, which is placed in the resource directory. The setup program of the device application would determine the location of this directory.

<url> element within the <icon> element do not contain URLs to device icons; rather, contain the icon filename, which must be placed in the resource directory.

<URLBase> element is not present.

All URLs generated by the Device Host are relative URLs. The URLs will be relative to the location of the device description document, sent in the initial device announcement.

Device Behavior Implementation

With reference to FIGS. 3-6, the behavior of a device is defined by the services it exposes. Each service has a service description 208-209 that lists its actions and state variables. Together, these comprise the service interface since they define the ways in which control points can interact with the service.

To implement a service, a hosted device provides a COM object (the "service object") 220 that exposes the service's interface 222. In the service description 208-209, the service interfaces are written in UTL 202, but COM object interfaces are typically specified in IDL 204. The Device Host API provides a tool 200 that translates a service description 208-209, written as a service description in UTL 202, to a COM dispinterface description 204, written in IDL.

As an example of this translation, consider FIG. 5: a service interface description written in UTL. The interface translation tool 200, given this interface definition, would produce the IDL interface description shown in FIG. 6.

The hosted device 108-110 then implements this dispinterface in order to provide the functionality of this service. The hosted device implementer uses the translation tool 200 to translate each of the UTL interfaces of each service in the device description 206 to an IDL interface, and then implement each IDL interface in service objects 220. The objects that implement the service dispinterfaces will be referred to as service objects. In case of UPnP errors, the service object would return a DISP_E_EXCEPTION and fill out the EXCEPINFO parameter to IDispatch::Invoke. In particular, the bstrSource field will contain the error code and bstrDescription will contain the error description.

In addition to implementing the service objects 220, the hosted device must implement a device control object 240. The purpose of the device control object is to serve as a central point of management and control for the device's service objects 220. At registration time, the device control object 240 will be passed to the Device Host API 102, and when a control request arrives for one of the device's services, the API will call into this device control object to ask for the relevant service object. At that time, the device control object can create an instance of the service object, or return an interface on an already existing instance.

Device control objects 240 must implement the IUPnPDeviceControl interface 242, defined below. The Device Host API 102 will call the IUPnPDeviceControl::Initialize( ) method on the device control object, passing it the full text of the UPnP device description it published for the device, and an initialization string specified at registration time. From this, the device control object can read the UDNs assigned to each of the devices in the device tree.

When the Device Host API 102 needs a pointer to a service object 220 that implements a particular service on the device, it will call the IUPnPDeviceControl::GetServiceObject( ) method on the device control object. It passes the UDN and the service ID of the service for which it is requesting a service object, and the address of an IDispatch pointer at which the method is expected to return the service object. Note that the UDN parameter is necessary because the device control object manages services for the entire device tree, including nested devices. The service object being requested might be on one of the nested devices; the UDN identifies the device in question.

Registering a Hosted Device

Figure 3:
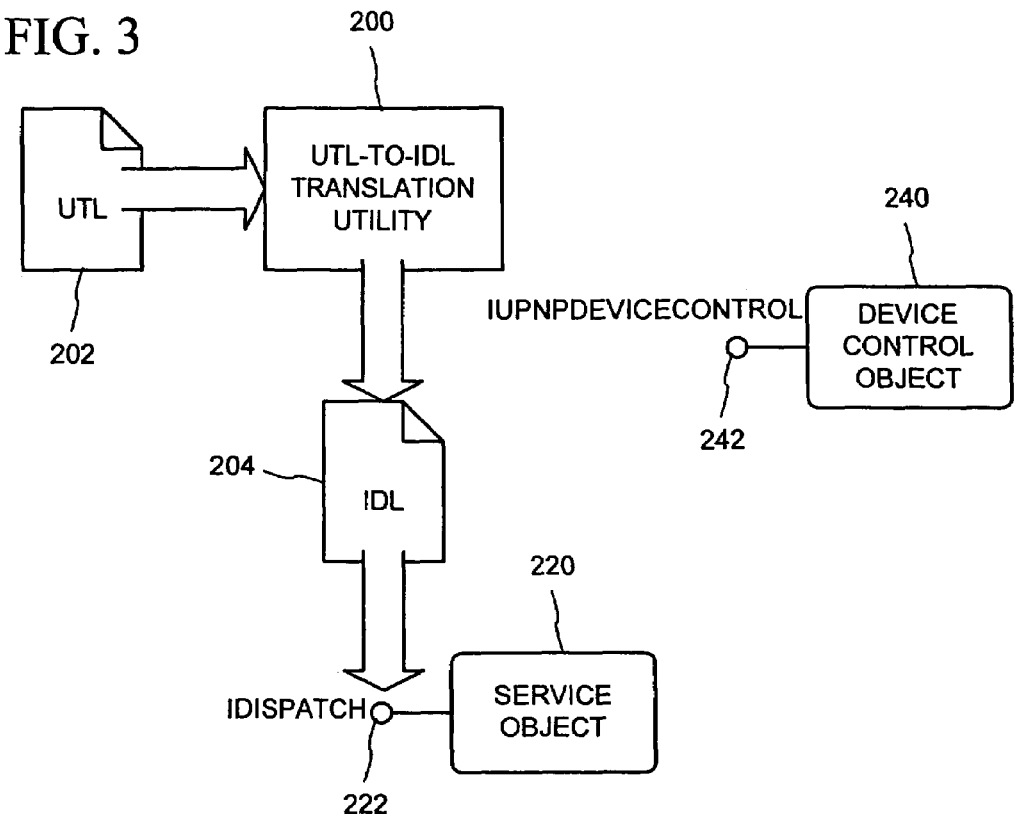
FIG. 3 is a block diagram of a translation utility provided by the peer networking host and hosting API of FIG. 1 for translating a service interface description to an object interface description.
Figure 4:
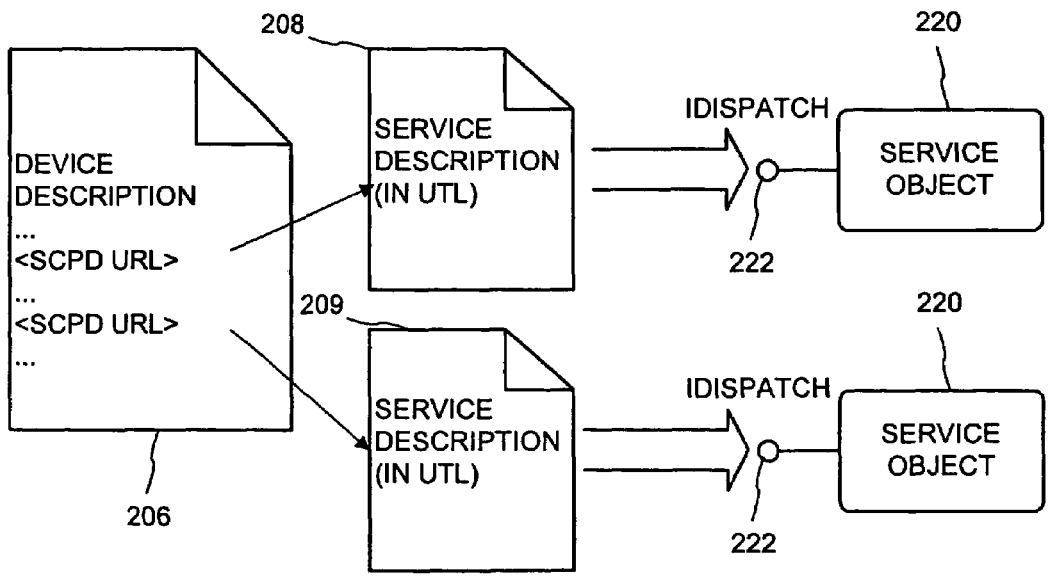
FIG. 4 is a data flow diagram of generating the interfaces of the service objects of the hosted device in FIG. 2 from the device and service descriptions.
Figure 7:
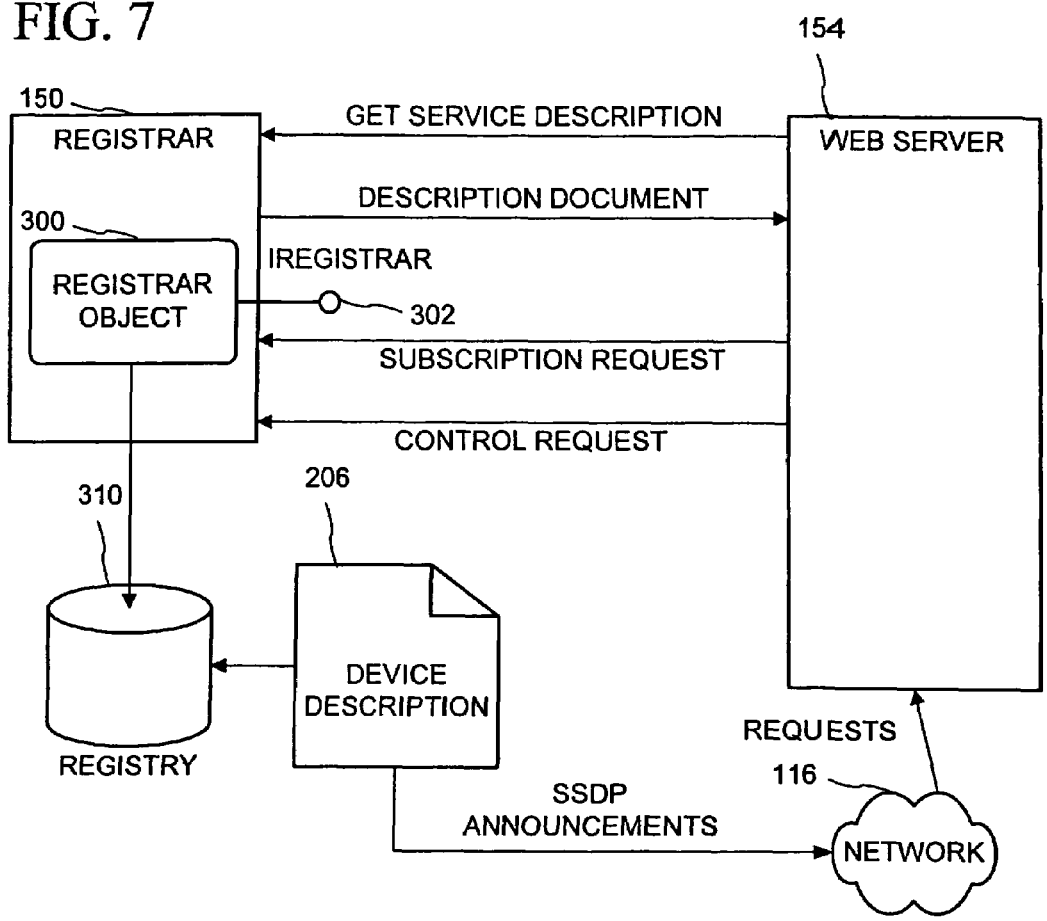
FIG. 7 is a block diagram of device and service registrar in the peer networking host and hosting API of FIG. 1.

With reference now to FIG. 7, registering a hosted device 108-110 means providing the Device Host 100 with the device description 206 (FIG. 4) and its device control object 240 (FIG. 3). The Device Host 100 (FIG. 1) then constructs complete UPnP device descriptions and publish these so that control points (e.g., at UPnP Devices 120-122 of FIG. 1) can access them. The Device Host will then announce the presence of the hosted device using UPnP discovery protocols.

Devices can be registered in two ways:

An application can create an instance of the device control object 240 (FIG. 3) and pass a pointer to the device control object to the Device Host API 102 (FIG. 1).

The CLSID of a device's control object can be passed to the Device Host API, which will instantiate the device control object when needed.

Regardless of which method is used, the Device Host API 102 publishes and announces the device as soon as it is registered. The difference between the two approaches has to do with when the device code is loaded: in the first method, the device code is loaded and running at the time of registration; in the second method, the device code is only loaded when a control or event subscription request arrives. Thus, the second approach is slightly more optimized, but is not suitable for devices that need to be running before any control or event subscription requests arrive for them.

Device registration happens through the UPnPRegistrar object 300 of the Registrar 150 in the Device Host API 102. This object exposes the IUPnPRegistrar interface 302, defined in FIG. 8. To register a device with a running device control object 240, an application (e.g., the hosted device application, "client.exe," 150 of FIG. 2) calls the method, IUPnPRegistrar::RegisterRunningDevice( ), passing the following arguments:

the text of the device's description an IUnknown pointer to the device control object an initialization string that will be passed to the device control object's IUPnPDeviceControl::Initialize( ) method the location of the resource directory Lifetime of the device Device Identifier out parameter, which is also the return value of this call.

Registering a device with a device control object that is not running can be done either through a command line tool, upnpreg, or programmatically, via the IUPnPRegistrar::RegisterDevice( ) method. This assumes that the device control object has already been registered with COM. The command line tool takes the following parameters:

the name of a file containing the device description the ProgID of the device control object an initialization string that will be passed to the device control object's IUPnPDeviceControl::Initialize( ) method (this may be passed in a file)

a container identifier: a string that identifies the group to which the device belongs (all devices with the same container identifier will be hosted in the same process)

Resource path pointing to the location of the service description and icons

Lifetime of the device

An optional output file for the device identifier.

To register a non-running device programmatically, an application calls IUPnPRegistrar::RegisterDevice( ) and passes it the following:

the text of the device's description the ProgID of the device control object an initialization string that will be passed to the device control object's IUPnPDeviceControl::Initialize( ) method a container identifier the location of the resource directory Device identifier out parameter, which is also the return value of this call.

Whether registered through the command-line tool, or through the programmatic interface, the registrations of non-running devices are persisted across system reboots in system registry 310. Therefore, once a device is registered using IUPnPRegistrar::RegisterDevice( ) or upnpreg, it will be published every time the system boots.

A hosted device can be unregistered using the method, IUPnPRegistrar:: UnregisterDevice( ), of the UPnP Registrar object 300. This method will remove the hosted device from the Device Host depending on the value of the fPermanent flag. If this flag is not set, then the device will be removed, however it can be re-registered using the IUPnPReregistrar interface. The IUPnPReregistrar::ReregisterDevice( ) or the IUPnPReregistrar::ReregisterRunningDevice( ) methods using the original root UDN generated by the Device Host and announced on the network. If the flag is not set, then the device will get permanently deleted from the Device Host.

Device Providers

Device Providers are registered objects that the system starts on every reboot. Their purpose is simply to register devices with the Device Host API in response to some event.

Device providers are particularly useful for bridging to polled media. Consider, for example, a peripheral device (such as a digital music player) connected to a computer via a serial port. To expose the music player as a UPnP device, a device control object and a set of service objects would be needed to implement the UPnP music player actions as serial commands. But these objects should only be registered once the music player is plugged into the serial port and available for control. Since the serial port does not offer an explicit notification mechanism for when devices are connected, some polling code is needed. This code could be implemented in a device provider object. At system startup, the Device Host API 102 instantiates the provider object, and tells it to begin polling. When the Device Host API detected the presence of a music player device, it instantiates the appropriate device control object and registers it by calling IUPnPRegistrar:: RegisterRunningDevice( ). This causes the hosted device to be published and thus exposed to the UPnP network.

The same functionality could be achieved by implementing an NT service that polled the serial port. Device providers simplify things by requiring only the core functionality (the polling) to be implemented since they rely on the Device Host API to start and stop their execution. Thus, all the overhead of implementing an NT service is avoided.

Implementing a Device Provider involves implementing an object that exposes the IUPnPDeviceProvider interface (defined below). This object must be registered with the Device Host API using the IUPnPRegistrar::RegisterDeviceProvider( ) method. This method takes three arguments:

a name for the provider (must be unique on the machine)

the ProgID of the class that implements the device provider an initialization string a container identifier: a string that identifies the group to which the device provider belongs (all providers with the same container identifier will be hosted in the same process)

At registration time (and on every system reboot thereafter), the system instantiates the device provider object and calls its IUPnPDeviceProvider::Start( ) method, passing it the initialization string specified during registration.

Once the start method has been called, the device provider can do any type of processing, and when it deems necessary, can register devices by calling IUPnPRegistrar::RegisterRunningDevice( ), as described in the previous section.

At system shutdown, the Device Host API calls the IUPnPDeviceProvider::Stop( ) method, to indicate that the device provider should terminate its operations.

Eventing

Every user-defined hosted service object 220 (FIG. 3) implements a number of standard Device Host interfaces. One of these interfaces is the IUPnPEventSource interface. This interface implements two methods, namely Advise( ) and Unadvise( ). This provides a mechanism for the Device Host to subscribe to event notifications generated by the hosted service.

A hosted service object 220 implements IUPnPEventSource::Advise( ) by querying the given IUnknown pointer for the IUPnPEventSink interface. If found, it then holds a reference to that interface until IUPnPEventSource:: Unadvise( ) is called, or until the hosted service object is deleted. To remove the subscription, the Device Host calls IUPnPEventSource:Unadvise( ) and passes in the same object pointer as for Advise( ). The hosted service will know to remove the subscription if the pointer is the same as the one passed to Advise( ).

When the hosted service wishes to notify the Device Host 100 (FIG. 1) that an event has occurred, it can then call the IUPnPEventSink::OnStateChanged( ) method to do so.

When the Device Host no longer wishes to receive notifications from the hosted service, it will call IUPnPEventSource:: Unadvise( ), passing in the same object pointer that it received in the IUPnPEventSource::Advise( ) call.

Service Control API

Figure 9:
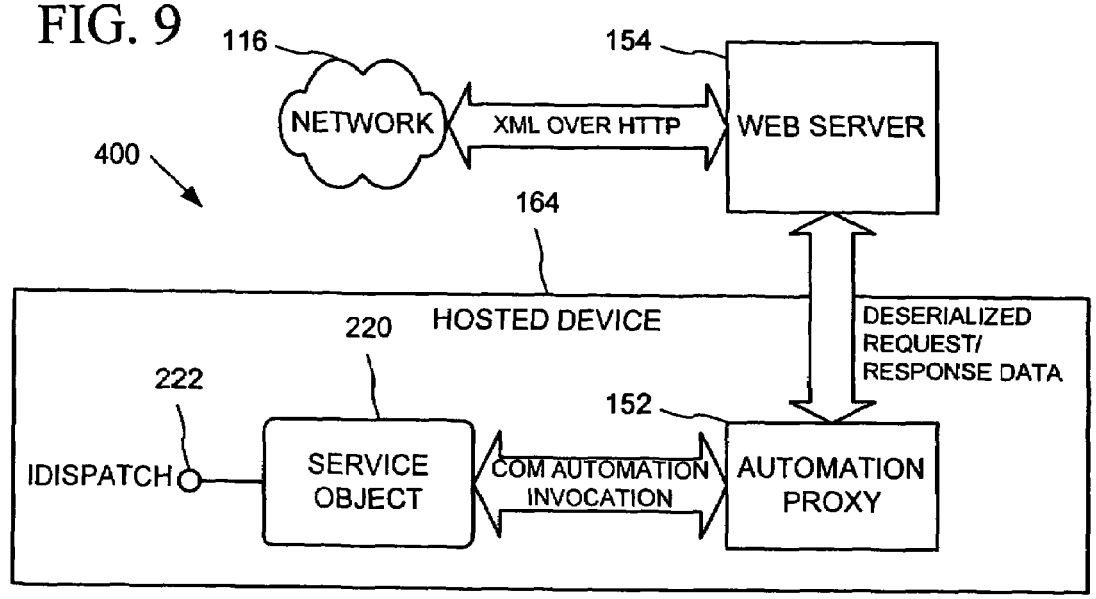
FIG. 9 is a block diagram of a service control architecture of the peer networking host of FIG. 1.

With reference now to FIG. 9, the service control API 132 (FIG. 1) in the Device Host API implements the UPnP control protocol, which is described in more detail in the Appendix, "Universal Plug and Play Device Architecture." Specifically, the service control API is responsible for decoding UPnP control requests from the network
    routing the requests to the hosted device code that executes them
    generating UPnP control responses The service control API 132 isolates all the UPnP protocol specific processing from the hosted device code, making control requests look like simple method calls. FIG. 9 shows a control system software architecture 400 of the service control API of the Device Host 100.

Two main components form the core of the control system software architecture 400:

a Web Server 154 that handles the exchange and processing of control messages
    an Automation Proxy 152 that calls into a hosted devices' service objects 220 to execute control requests Web Server All UPnP control messages travel over HTTP and the Device Host API 102 (FIG. 1) includes the Web Server 154 (FIG. 2) as its HTTP server for HTTP requests/responses.

The Device Host API 102 (FIG. 1) sets up the control URLs of hosted devices 108-110 to point to the Web Server 154. When the Web Server receives an HTTP request with one of the hosted devices' control URLs, the Web Server verifies that the HTTP packet contains a control request, parses the contents of the request, and invokes the Automation Proxy for the service to cause the service to execute the control request. When the hosted device code returns, the Web Server forms a UPnP control response, and sends this back to the originator of the request over HTTP.

Figure 10:
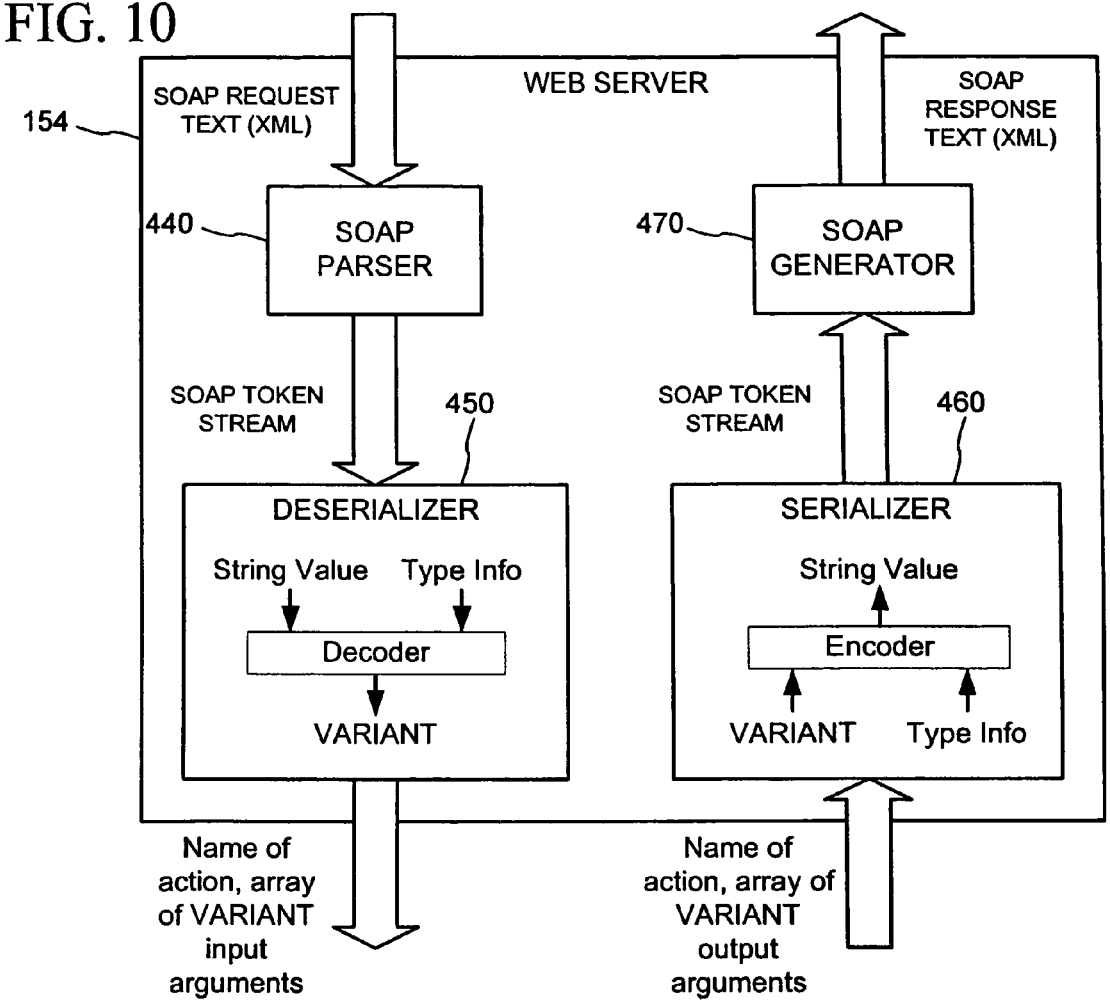
FIG. 10 is a block diagram of a web server in the service control architecture of FIG. 7.

FIG. 10 illustrates the internals of the Web Server 154. Control requests pass through the following components:

SOAP Parser 440: loads the SOAP XML text from the body of the HTTP message and parses it into a stream of tokens.
    Deserializer 450: decodes each SOAP token, converting from text to binary form using the UPnP type information for state variables and arguments.

The deserializer 450 makes use of an automation proxy object 152 (FIG. 9) that provides the data type information required to translate data in the SOAP requests into the binary form required by the service implementations. Once translated, the automation proxy object 152 forwards the request to the hosted device code, by calling into its service objects 220 (FIG. 9).

When the call completes, the automation proxy object 152 passes the return information (return value and the values of any output arguments) to the Web Server 154. This information passes through the following components:

Serializer 460 (FIG. 10): converts the binary return value and argument data into text form using UPnP type information and forms a stream of SOAP tokens.
    SOAP Generator 470 (FIG. 10): forms the XML text of a SOAP response and returns this to the originator of the request The following sections discuss further details of implementation of the illustrated Web Server.

Identifying Service Instances

The same Web Server 154 will receive control requests for all hosted devices on a particular machine and therefore all control URLs will point to this extension. In order to make each service's control URL unique, it will include a unique query string. Thus control URLs are of the following form:

http://<virtual directory path>/web-server-api.dll?<unique identifier>

<virtual directory path> is the path to the virtual directory in which the Web Server is located. <unique identifier> is a concatenation of:

the UDN of the hosted device to which the service belongs
    the service ID
    a short string that is randomly generated at publication time This unique identifier is referred to as the service instance name. The randomly generated string in the service instance name ensures that the control URLs for the services on the hosted device are different each time the device is published). The following is an example of a complete control URL for a hosted service:

http://server1/upnphost/web-server-api.dll?uuid:
        debe205c-b2d8-4886-b60f-3898841a3f41:urn:upnp-
        org:serviceId:myService:745232

Given the service instance name in the control URL, the Web Server 154 is able to locate the service implementation in the hosted device. To do this, the Web Server instantiates the Registrar 150 (FIG. 7) and queries for the IUPnPRegistrar interface. Since the UPnP registrar is the central repository of information about running devices, it is able to locate the service implementation in the hosted device. The Web Server calls IUPnPRegistrar::GetAutomationProxy( ), passing it the service instance name. This method returns the IUPnPAutomationProxy interface on the automation proxy object 152 bound to the service implementation. The Web Server can use this automation proxy object to obtain type information from the service description, or to invoke control requests on the service object.

Parsing SOAP Requests

The bodies of control requests contain XML encoded according to the SOAP rules. In processing a control request, the first task of the SOAP parser 440 is to read the entire request body sent by the client (e.g., UPnP Devices 120-122 of FIG. 1), since the extension control block may not contain all of the request. The SOAP parser examines the cbTotalBytes field in the extension control block, and if its value is greater than the value in the cbAvailable field, the SOAP parser reads the remaining data using the ReadClient( ) Web Server callback function.

Once the data has been read, the SOAP parser converts the request from single-byte to wide characters, creates an XML DOM document object and loads the text into the document object. The SOAP parser then validates that the essential SOAP elements are present and correctly formed, and extracts the data pertinent to the request. Specifically, the SOAP parser creates an instance of the UPNP_SOAP_REQUEST structure shown in FIG. 11 and populate the structure's fields by walking the XML DOM node tree created from the request text.

With reference to FIG. 11, the bstrActionName field in the UPNP_SOAP_REQUEST structure contains the name of the action, extracted from the name of the first child of the SOAP Body element. The pxndlArgs field contains a list of XML nodes that represent the action's arguments. These nodes contain the name of the arguments and their values, represented in text form. This structure is passed to the deserializer 450, which converts the argument values from text to their appropriate binary representations.

Deserializing SOAP Requests

Using the type information from the UPnP Service Description for the target service, the deserializer 450 can convert the arguments in a UPNP_SOAP_REQUEST structure into their binary form. The deserializer 450 places the deserialized values into a UPNP_CONTROL_REQUEST structure, as defined in FIG. 12.

The deserializer takes the following arguments:
- a pointer to the UPNP_SOAP_REQUEST structure (FIG. 11) produced by the SOAP Parser.
- a pointer to the IUPnPServiceDescriptionInfo interface on the automation proxy object 152.
- a pointer to a UPNP_CONTROL_REQUEST structure (FIG. 12) in which to place the deserialized argument values.

FIG. 14 shows pseudo-code for the deserializer 450. The deserializer begins by setting up the UPNP_CONTROL_REQUEST structure (copying the action name and allocating space for the array of VARIANT arguments). The deserializer then walks through the list of argument nodes in the UPNP_SOAP_REQUEST structure, sets the data type on each one according to the type information obtained from the IUPnPServiceDescriptionInfo interface on the automation proxy object 152, and then extracts the typed value. The result is a UPNP_CONTROL_REQUEST structure containing an array of VARIANTs with the typed values for each of the action arguments.

The deserialized request data is then passed to the automation proxy object 152 that invokes the appropriate method on the service object 220 to fulfill the request. The automation proxy returns with deserialized return information in a UPNP_CONTROL_RESPONSE structure (defined in FIG. 13). This structure contains an anonymous union, overlaying the return information for success and failure responses. The HRESULT returned by the automation proxy object 152 determines which set of information should be examined. This information is passed to the Serializer 460 (FIG. 10) before being encapsulated into a SOAP response.

Serializing Control Responses

The serializer 460 (FIG. 10) converts the binary representations of the return values and output arguments returned by the automation proxy object 152 (FIG. 9) into text XML form. The serializer does this by consulting the argument type information from the UPnP Service Description and using the XML DOM to encode the data appropriately. The serializer 460 produces an instance of the UPNP_SOAP_RESPONSE structure, defined in FIG. 15.

For success responses, the serializer 460 will convert the binary VARIANT representations of the output arguments and return value into XML nodes. The names of the output arguments will be obtained from the IUPnPServiceDescriptionInfo interface on the automation proxy object. For failure responses, the serializer 460 simply converts the UPnP error code into a string.

Generating SOAP Responses

The SOAP Generator 470 (FIG. 10) forms the XML text of a SOAP response based on the UPNP_SOAP_RESPONSE structure built by the serializer 460, and returns this to the originator of the request.

Automation Proxy

With reference again to FIG. 9, incoming UPnP control requests follow the UPnP control protocol rules for encoding and message exchange. Service implementations in hosted devices follow the COM Automation rules for method invocation. Automation proxy objects 152 (FIG. 9) serve as the interface between the UPnP control protocol and COM Automation. Automation proxy objects take UPnP action names and deserialized arguments, and make calls to the dispinterfaces on service objects 220. In addition, automation proxy objects map data types of service state variables and action arguments, as declared in the UPnP service description, to COM automation data types.

The Device Host API 102 instantiates one automation proxy object 152 per service object 220.

Binding to a Service Object

The Device Host API 102 (FIG. 1) obtains service objects 220 by calling into the device control objects 240 (FIG. 3) of hosted devices. Specifically, the Device Host API calls the IUPnPDeviceControl::GetServiceObject( ) method to obtain an IDispatch interface on an object that implements a particular service.

The first time the API 102 gets a service object 220, it instantiates an automation proxy object 152 to be bound to it. In the binding operation, the Device Host 100 passes the service object's IUnknown pointer and the text of the service description to an initialization function on the automation proxy object 152. Thereafter, the newly created automation proxy object 152 handles all incoming control requests to the service object.

Parsing the Service Description

During its initialization, the automation proxy object 152 parses the service description and build two internal tables: one that stores the data types of service state variables, and another that stores the data types of the arguments to the service's actions. These tables will then serve as the source for the data type information the automation proxy returns through its IUPnPServiceDescriptionInfo interface (defined in Appendix, "UPnP Device Host API Reference"). Note that these tables store only the names and data types, not values, of the state variables and arguments.

Threading Model

Automation proxy objects 152 (FIG. 9) keep no state and, after setting up data type tables at initialization time, are completely read-only. Thus, any number of threads can call methods on an automation proxy object concurrently and no explicit synchronization is required. The automation proxy object is free-threaded.

CoClass

Automation proxy objects will be instances of the UPnPAutomationProxy coclass defined in the interface definition language description of FIG. 16.

Eventing API

With reference again to FIG. 1, the Eventing API 133 allows hosted devices/bridges 108-110 to notify interested UPnP Devices 120-122 on the UPnP network 116 of changes to their state.

The eventing API 133 relieves the hosted devices/bridges of having to write a UPnP/GENA eventing server, including accepting and maintaining client event subscriptions and generating UPnP event messages. Additionally, the Eventing API provides automatic moderation for certain types of moderated events.

Eventing Manager Object

In the software architecture 140 (FIG. 2) of the Device Host 100, the eventing API 133 is implemented using an eventing manager object 153. The eventing manager (EM) object 153 manages subscription information for each service hosted by a device and handles submission of events for that service. If not already created, the EM object 153 is created by the Registrar object 150 when a SUBSCRIBE request is received.

The Registrar 150 is passed the UDN and service identifier for a specific service and returns the EM object. Eventing manager objects export the IUPnPEventingManager and IUPnPEventSink interfaces defined in FIG. 17.

Implementation

The EM object 153 is a light wrapper around the lower-level eventing API. All of the methods of both the IUPnPEventingManager and IUPnPEventSink interfaces effect a call to one of the low-level eventing APIs. Since the wrapper object is COM-based, the Web Server has the ability to communicate with the central host service from its own process. The methods are implemented as follows:

IUPnPEventingManager

The Initialize( ) method of the IUPnPEventingManager interface connects the EM object 153 with the hosted service object 220 supplied by the device writer and the automation proxy 152 (FIG. 9) for that service. It also communicates the UDN and service identifier of the device and service for which it is handling eventing. Inside the Initialize( ) method, the EM object queries the hosted service object 220 it was passed for the IUPnPEventSource interface. It will then call IUPnPEventSource::Advise( ) and pass its own outgoing interface (IUPnPEventSink) to the hosted service object. When the hosted service object wishes to submit an event, it will call the OnStateChanged( ) method on this interface. The EM object would then query the service object for the state variable names, their new values, and their types, and internally call the HrSubmitEvent( ) API.

AddSubscriber( ) does the following:
- It queries the automation proxy object for the names, values, and types of ALL state variables for the particular service.
- Using this information, the function creates an XML DOM Document and extracts the XML from the document as a string
- It calls the low-level HrAddSubscriber( ) API for the related event source, passing in the Callback URL from the SUBSCRIBE message, the timeout, and the newly created body.
- Upon return, HrAddSubscriber( ) provides the SID of the new subscription and the timeout chosen so that the caller can send the appropriate response. AddSubscriber( ) returns this SID as well.

The RenewSubscriber( ) method takes the SID and timeout from the SUBSCRIBE request and renews the corresponding subscription. Upon return the timeout parameter receives the value chosen by the Device Host.

The RemoveSubscriber( ) method takes the SID from the UNSUBSCRIBE request and removes the corresponding subscriber from the list.

The Shutdown( ) method balances out the Initialize( ) method by simply calling Unadvise( ) on the IUPnPEventSource interface it has.

IUPnPEventSink

The IUPnPEventSink::OnStateChanged( ) method of the IUPnPEventSink interface is called by the hosted service object 220 to notify the EM object 153 that its state has changed. This method is hidden from VB users since they should use the OnStateChangedSafe( ) method instead. The EM object then does the following:
- Query the automation proxy object to get the names, values, and types for each DISPID passed to OnStateChanged( ).
- Then build an XML DOM Document using this information.
- Extract the XML string from the DOM
- Internally call the HrSubmitEvent( ) API with the saved event source identifier and the newly created body.

The IUPnPEventSink::OnStateChangedSafe( ) method is intended for use by VB programmers so that they may communicate the names and values of variables that have changed to the Device Host. C++ programmers may call this method as well, but it is not expected that they will do so since it requires considerably more work.

User-Implemented Eventing Interfaces

Every user-defined hosted service object 220 will implement a number of standard Device Host interfaces. One of these interfaces is the IUPnPEventSource interface. This interface implements two methods, namely Advise( ) and Unadvise( ). This provides a mechanism for the corresponding Eventing Manager object to subscribe to event notifications generated by the hosted service. This interface is defined in FIG. 18.

Implementing IUPnPEventSource

A hosted service will implement the IUPnPEventSource::Advise( ) method by querying the given IUnknown pointer for the IUPnPEventSink interface. If found, it would then hold a reference to that interface until IUPnPEventSource::Unadvise( ) is called, or until the hosted service object is deleted. To remove the subscription, the EM object 153 calls IUPnPEventSource:Unadvise( ) and passes in the same object pointer as for Advise( ). The hosted service knows to remove the subscription if the pointer is the same as the one passed to Advise( ).

When the hosted service wishes to notify the Device Host that an event has occurred, it can then call the IUPnPEventSink::OnStateChanged( ) method to do so.

When the Device Host no longer wishes to receive notifications from the hosted service, it calls IUPnPEventSource::Unadvise( ), passing in a pointer to its own IUnknown interface; the same interface it passed to the Advise( ) call.

Low-Level Eventing API

A low-level eventing API defined in FIG. 20 is a private interface between the EM object 153 and the central UPnP host service. It is a highly scalable API that is called for all hosted services on the computer.

Event Source Identifier

All of the low-level eventing API functions require the event sources identifier as the first parameter. The reason for this is to ensure that every function operates on a valid event source. Since all access to the event source and subscription information is guarded by a single critical section, no eventing function is ever able to access this information without first obtaining the global lock and finding the event source identified by this identifier in the list of event sources. This has little to no effect of performance, but guarantees concurrency of threads.

An event source identifier is a concatenation of the UDN of the device and the service identifier. So, for example, if we have a UDN of "uuid:{3cbaf80e-401a-4c29-be7c-8573c1af87f9}" and a service identifier of "clock:1", then the event source identifier would be "uuid:{3cbaf80e-401a-4c29-be7c-8573c1af87f9} clock:1". This uniquely identifies the event source in the global list of event sources.

Event Source Registration

When a UPnP hosted service is registered via the Registrar, the Device Host will need to register this service as an event source. Part of the registration process involves passing the list of evented state variables and their initial values to the registration so it can be used for the initial event notification message for a new subscriber. This local cache of state variables and their values will be updated each time an event notification is generated.

Event source registration is accomplished with the HrRegisterEventSource( ) API defined in FIG. 20. The following happens when HrRegisterEventSource( ) is called:
Lock global list of event sources
Find szEsid in list
If found
  Return error
Else,
  Create new UPNP_EVENT_SOURCE, copying the params to the members of the struct
  Set rgSubs member to NULL
  Add item to list
Unlock list Event Source Deregistration When a hosted service is unpublished, and thereby no longer accessible to control points, its associated event source is deregistered. This is accomplished through the DeregisterEventSource( ) API defined in FIG. 20. This API simply finds the event source in question, and removes it from the list of event sources. It then frees any data that this event source referenced. The following happens when HrDeregisterEventSource( ) is called:
Lock global list of event sources
Find szEsid in list
If not found
  Return error
Else,
  Remove item from list
Unlock list
For each subscriber in the event source's subscriber list
  Free the subscriber Handling Subscribers The Device Host is responsible for handling and maintaining the subscriber list for each service that it hosts. The Device Host listens for new SUBSCRIBE and UNSUBSCRIBE requests, parses them, and processes them.

According to the UPnP architecture, UPnP devices terminates any subscription that has not been renewed within the specified time period. To this end, the Device Host tracks each subscription and its specified lifetime, and terminates the subscription if it has not been renewed.

Incoming SUBSCRIBE and UNSUBSCRIBE requests are processed by the Web Server 154. The messages are parsed and validated for correctness before being passed to the appropriate eventing manager object 153 for processing. The event subscription URL published in the description document for a device contains a parameter to the Web Server that will indicate which device and service the request was sent to. If no services match the identifier in the URL, "404 Not Found" is sent as a response.

Adding Subscribers

Handling SUBSCRIBE

When a SUBSCRIBE request is received, it is parsed to obtain the relevant pieces of information, namely, the Callback, NT, and Timeout headers. The Callback header contains the URL to which NOTIFY requests should be sent when an event is submitted. The NT header should contain "upnp:event" and nothing else. If a request contains something other than "upnp:event" in the NT header, it is ignored and "412 Precondition Failed" is the response.

The Timeout header contains the subscriber's request for how long the subscription should last. Per UPnP (see Appendix, "Universal Plug and Play Device Architecture"), the device controls what the timeout really is, but it can choose to honor the subscriber's request. In the Device Host 100, the preferred timeout is specified when the service is registered with the Host. If the timeout is 0, then subscriber's request is always honored. If it is non-zero, then the subscriber's request is never honored, rather the timeout specified to the Host API is used instead.

After the SUBSCRIBE request is parsed and validated, a new subscription ID is generated, using the UuidCreate( ) function. This, along with the timeout value calculated according to the algorithm discussed above, is placed into an HTTP response message. After the response is sent, the SID and timeout values are associated with the subscriber.

Once a SUBSCRIBE is received and processed, a timer is started. The timer will expire after the timeout period for this subscriber has elapsed. If the timer expires, the subscription is terminated silently. This entails removing the subscriber from the list and intentionally not re-starting the timer.

If a SUBSCRIBE request contains a SID header, then it is considered a re-SUBSCRIBE request. The SID header should match the one given to the subscriber as a result of the response sent to its initial SUBSCRIBE request. If the SID does not match, then the "404 Not Found" response is sent.

If a SID header is included in the request, along with either an NT header or Callback header, then the response "400 Bad Request" is sent.

If neither SID, NT, nor Callback headers are present, the response "412 Precondition failed" is sent.

When the SID matches an existing subscription's SID maintained by the Device Host, the subscription's timer is reset to the original timeout value. The response "200 OK" is then sent, along with the same SID header as was included in the request along with the same timeout value included in the original subscription response.

HrAddSubscriber( )

The HrAddSubscriber( ) API defined in FIG. 20 operates as follows:
Create new UPNP_SUBSCRIBER, filling in information from the request
Generate new SID by calling UuidCreate( )
Initialize renewal counter to 0
Initialize event queue to empty
Create new unnamed event for event queue
Call RegisterWaitForSingleObject( ) passing in the UPNP_WAIT_PARAMS struct
Lock event source list
Look up the szEsid in the event source list
  If not found, it means the subscriber attempted to subscribe to an event source that is no longer available. Return 404 Not Found.
The timeout value is the one passed to HrAddSubscriber( )
Create a new timer queue timer for the subscriber, using the timeout value. The parameter to the timer will be the UPNP_EVENT_SOURCE and the SID for the subscriber contained in the UPNP_RENEWAL structure. It can't be the UPNP_SUBSCRIBER itself, because it may get deleted prior to executing the callback function.
Set the in/out parameter pcsecTimeout to this timeout that was chosen.
Add Subscriber to list of subscribers for that event source
Unlock event source list
Call the HrSubmitEventZero( ) API below for this event source (defined below)

Renewing Subscribers

The HrRenewSubscriber( ) API operates as follows:
Lock global event source list
Lookup the event source passed in If event source is not found, unlock list then respond
    with 404 Not Found
If SID matches one in the list of subscribers for this event
    source
    Delete (non-blocking) previous timer for subscriber
    Increment renewal counter
    Determine the timeout for the renewal in the same manner as for HrAddSubscriber( )
    Create new timer for subscriber with the same timeout, passing the UPNP_RENEWAL structure as the pvParam
Unlock event source list
If renewal was successful
    Compose response, including same SID and Timeout Renewal Timer Callback The Device Host handles renewal timer callback as follows:
    The pvParam points to the UPNP_RENEWAL structure for this subscription
    Lock the event source list
    Iterate through each event source, looking for one that matches the szEsid member of the structure
    If found,
        Iterate through the list of subscribers for that event source looking for one with a SID that matches szSid.
        If found,
            Compare the cRenewals member of that UPNP_SUBSCRIBER structure with the iRenewal member of the UPNP_RENEWAL
            If they are the same,
                Remove the subscriber from the list
                Unlock the list
                Queue a work item to do the following:
                    Issue a blocking UnregisterWait( ) on the subscriber's wait handle
                    Issue a blocking DeleteTimerQueueTimer( ) on the subscriber's timer handle
                    Free the memory used by the structure
                    Free the structure
    If not found
        Unlock the list How a SUBSCRIBE is Processed The Device Host processes subscribe requests as follows:
    Receive request from network code
    Parse request into headers
    If method is SUBSCRIBE
        Validate headers
        If validation succeeded
            If this is a re-SUBSCRIBE
            Call HrRenewSubscriber( )
            Else if it is a normal SUBSCRIBE
            Call HrAddSubscriber( )
        Else
            Respond with "400 Bad Request"

Removing Subscribers

The Device Host removes a subscriber from an event source as follows:
    Lock the global event source list
    Remove the subscriber from the event source
    Unlock the list
    Queue a work item to do the following:
        Issue a blocking UnregisterWait( ) on the subscriber's wait handle
        Issue a blocking DeleteTimerQueueTimer( ) on the subscriber's timer handle
        Free the memory used by the structure
        Free the structure Handling UNSUBSCRIBE When an UNSUBSCRIBE request is received by the Web Server 154, it is parsed to obtain the relevant pieces of information, namely, the query string and the SID header. The query string contains the identifier of device and the service from which the subscription should be removed.

If the NT or Callback header is present, the response "400 Bad Request" is sent.

If the SID header does not match an existing subscription for the requested service, the response "404 Not Found" is sent.

If the SID header is absent or is empty, then the response "412 Precondition Failed" is sent.

After the UNSUBSCRIBE request is parsed and validated, the subscription to which the SID belongs is accessed. Its timer is stopped and the subscription is removed from the list. Then, the response "200 OK" is sent.

HrRemoveSubscriber( )
    The HrRemoveSubscriber( ) API operates as follows:
    Lock global event source list
    Find the event source referenced in the message
        If event source is not found, unlock list then respond with 404 Not Found
    If SID matches one in the list of subscribers for this event source
        Remove subscriber from list
    Unlock event source list
    Queue a work item to do the following:
        Issue a blocking UnregisterWait( ) on the subscriber's wait handle
        Issue a blocking DeleteTimerQueueTimer( ) on the subscriber's timer handle
        Free the memory used by the structure
        Free the structure How an UNSUBSCRIBE is Processed The Device Host process the unsubscribe request as follows:
    Receive request from network code
    Parse request into headers
    If method is UNSUBSCRIBE
        Validate headers
        If validation succeeded
            Send "200 OK" response
            Call HrRemoveSubscriber( )
        Else
            Respond with "400 Bad Request"

Submitting Event Notifications

When one or more evented service state variables change, the service MUST submit their changes as an event notification. The Device Host handles the submission of the NOTIFY request automatically. The hosted service communicates the fact that one or more state variables have changed by calling the IUPnPEventSink::OnStateChanged( ) method. This will inform the Device Host that it needs to query the hosted service for the values of these variables.

The HrSubmitEvent( ) API defined in FIG. 20 utilizes a UPnP_Event data structure defined in FIG. 19.

Event Submission Architecture

Figure 21:
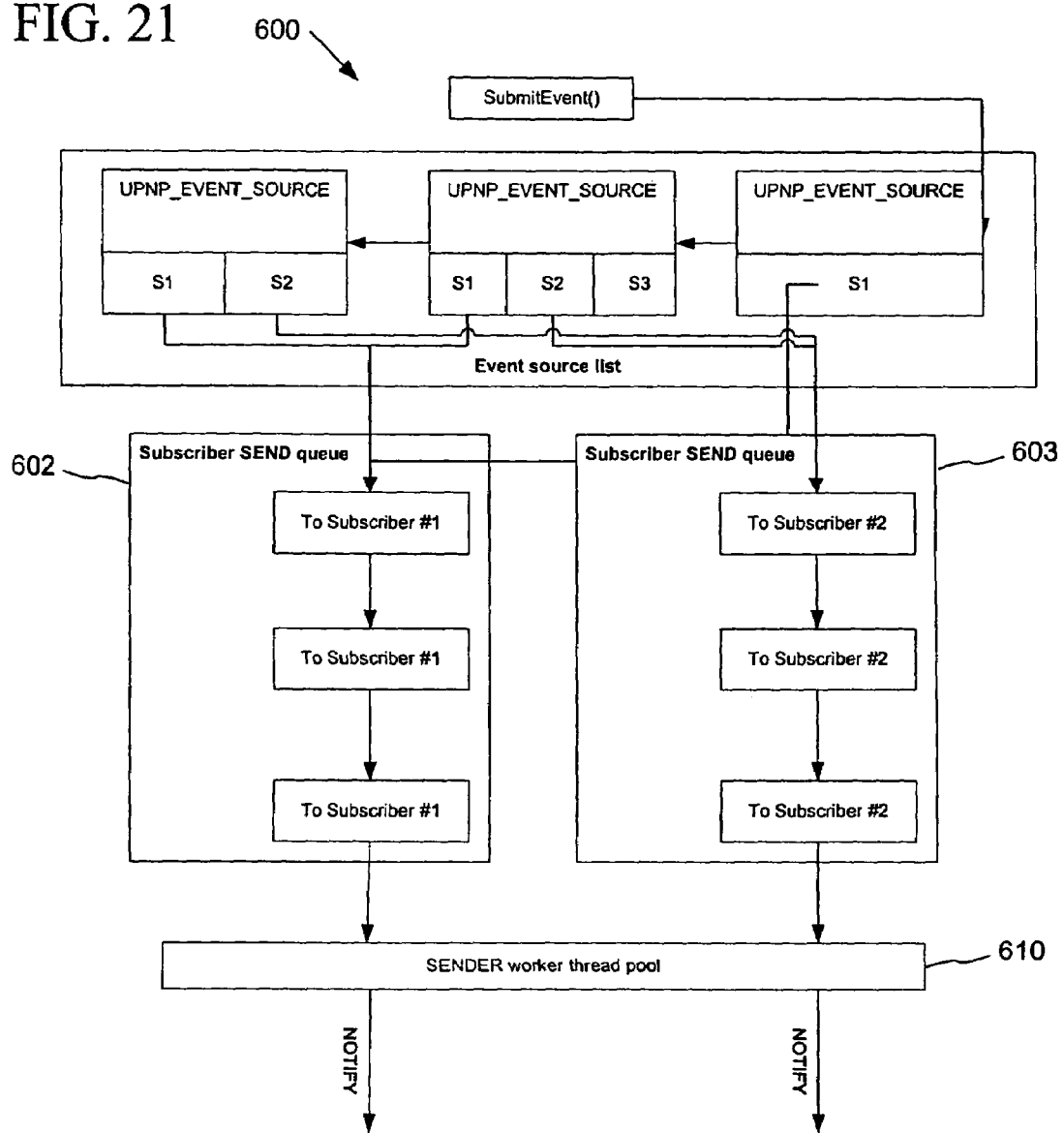
FIG. 21 is a block diagram of an event submission architecture in the peer networking host and hosting API of FIG. 1.

The HrSubmitEvent( ) API relies on an "event queue" 602-603 per subscriber (as shown in the event submission architecture 600 of FIG. 21) in which to place pending event notifications. When an event is submitted, it is placed on the queue for each subscriber for a pool of worker threads 610 to act on sequentially. Each event queue is sequential. An item closer to the front of the queue is always processed prior to an item toward the back of the queue. Event zero notifications for a subscriber always is first in the queue, before any other event notifications to that subscriber.

When an item is added to the queue, an event is signaled so that a worker thread can begin processing it. Once an item is removed from the queue for processing, the worker thread will handle sending the event notification to each subscriber. The heuristics defined here ensure that each subscriber's event queue is processed sequentially, with the next item in the queue not processed until the previous item is complete.

In more detail, when the OnStateChanged( ) method is called by a service, the following happens:
- The eventing manager object calls a function to query the value of each DISPID that has changed.
- The object then calls the HrSubmitEvent( ) API passing the event source identifier (which is composed of the concatenation of the UDN and service identifier) and the name of each variable and its new value. It obtains the names of each variable from a table that maps DISPIDs to state variable names.
- The HrSubmitEvent( ) API then does the following:
- It first attempts to find the event source identified by the caller in the global list of event sources registered.
- Locks the global event source list
- Enumerates each item looking for the event source identifier it was passed
- If the event source was not found in the list, the API unlocks the list and returns a failure code to the caller immediately.
- The XML body of the event notification comes from the szEventBody parameter.
- Then, for each subscriber in the list of subscribers for this event source:
    - If the sequence number>0
        - Create a UPNP_EVENT structure.
        - Copy szEventBody into it
        - Insert the UPNP_EVENT item at the tail of the list of pending send items
        - If the send queue was empty prior to adding this item,
            - Signal the send queue event for this subscriber's queue
- Unlock the event source list
- The Send Queue Worker Thread operates as follows:
- Meanwhile, a pool of worker threads is waiting on each subscriber's queue event
- When a queue event is signaled, the worker wakes up and does the following:
    - The pvParam will be cast to a UPNP_WAIT_PARAMS struct which indicates which event source and subscriber the worker is dealing with
    - Lock the global event source list
    - Iterate the global event source list looking for the szEsid member of the UPNP_WAIT_PARAMS struct.
    - If found,
        - Iterate its list of subscribers looking for the szSid member of the UPNP_WAIT_PARAMS struct
            - If found,
                - Assert that the list of event for this subscriber is not empty. If the worker thread woke up, then it must have been because an item was added to the queue.
                - Remove the first UPNP_EVENT structure from the list of events for this subscriber
                - local variable fEmpty=IsListEmpty( )
                - Copy the callback URL and SID from the subscriber to local variables
                - Copy the current sequence number to a local variable and then increment it
    - Unlock the global event source list
    - Compose the headers for the event message using the local sequence number and SID.
    - Use the body from the UPNP_EVENT struct
    - The message should be of the following form:
    - NOTIFY uri HTTP/1.1
    - HOST: host:port
    - CONTENT-TYPE: text/xml
    - CONTENT-LENGTH: bytes in body
    - NT: upnp:event
    - NTS: upnp:propchange
    - SID: SID
    - SEQ: sequenceNo
    - <e:propertyset xmlns:e="urn:schemas-upnp-org: event-1-0">
    - <e:property>
    - <variableName1>new Value1<variableName1>
    - </e:property>
    - <e:property>
    - <variableName2>newValue2<variableName2>
    - </e:property>
    - </e:propertyset>
        - uri is the Request-URI portion of the EventSinkURL passed in the "Callback" header of a SUBSCRIBE request. This comes from the szUrl member of UPNP_SUBSCRIBER.
        - host is the hostname portion of the EventSinkURL passed in the "Callback" header of a SUBSCRIBE request. This also comes from the szUrl member of UPNP_SUBSCRIBER.
        - port is the port portion of the EventSinkURL passed in the "Callback" header of a SUBSCRIBE request. This also comes from the szUrl member of UPNP_SUBSCRIBER.
        - SID is the subscription identifier generated for the response to a SUBSCRIBE request. This comes from the szSid member of UPNP_WAIT_PARAMS.
        - sequenceNo is the sequence number generated as part of event submission described earlier in this section. This is kept locally as described above.
    - WinINET is then used to open a connection to the subscriber and send the HTTP request. Since there is no recourse for the Device Host at this point, any error code returned from the send operation is ignored except for diagnostic purposes.
    - Send the message to the local callback URL
    - Free the body in the UPNP_EVENT struct
    - Free the UPNP_EVENT struct
    - If fempty is FALSE
        - Signal the event again so another worker thread can pick this item up The response to a NOTIFY can be any of the following:
- "412 Precondition Failed"—An invalid or missing SID was encountered on a NOTIFY request, with an NT header of "upnp:event"
- "400 Bad Request"—The NT or NTS header was not present
- "200 OK"—NOTIFY was accepted and processed.

The response to a NOTIFY request is ignored since there is no recourse for the device to have in the case of failure. Therefore, these return codes will be used strictly for diagnostic purposes.

Sending the Initial Event Notification

The initial event notification is sent using the HrSubmitEventZero( ) API defined in FIG. 20. The following is the implementation of this API:

Lock the event source list
    Ensure that the event source matches on in the list of event sources. If not, return.
    Ensure that the SID passed in matches one of the subscribers in the list. If not, return.
    Find the SID of the subscriber in the list of subscribers for this event source
    Copy the body passed in szEventBody to a new UPNP_EVENT structure
    Add the UPNP_EVENT structure to the list of events for this subscriber
    Assert that the event list for this subscriber was empty prior to adding this item to the queue
    Signal the queue event for this subscriber
    Unlock the event source list Web Server Interface to the Eventing Manager Object All requests from a control point (e.g., at the UPnP Devices 120-122 of FIG. 1) that are sent to a Device Host computer pass through the Web Server 154 that determines if the request is related to a device hosted on the machine. If so, they are processed further. When the Device Host publishes a device and its services, each service's event subscription URL will point at the Web Server. The query string part of the URL identifies the device and service for which a request is destined. The request method determines if it is related to control, eventing, or presentation. An example event subscription URL is as follows:

http://danielwe/upnp/web-server-api.dll?uuid:
        {53030327-9171-48e8-9589-b89456ea9054}+clock.1

In the case of eventing, the request method will be either SUBSCRIBE or UNSUBSCRIBE. Once the Web Server has determined this, it processes the request as follows:

If the method is SUBSCRIBE, determine if this is a SUBSCRIBE or re-SUBSCRIBE request:
        Query the NT header. If it exists, and is not "upnp: event", respond with "412 Precondition Failed." If the NT header exists and is valid, the request is now parsed as a SUBSCRIBE request. If the NT header did not exist, the request is considered a re-SUBSCRIBE request.
    If the request is a SUBSCRIBE request
        Query the Callback header. If it exists, verify that it is a valid HTTP URL and keep it in a local variable. If it is invalid or not present, send a "412 Precondition Failed" response.
        Query the Timeout header. If it exists, convert it to a base 10 integer, and keep it in a local variable. If not use a default timeout of 21,600 seconds (6 hours).
        Query for the SID header and ensure that it is not present. If it is, send a "400 Bad Request" response.
        Using the query string passed to the Web Server, ask the registrar to return the Eventing Manager object associated with that query string.
        Call the IUPnPEventingManager::AddSubscriber( ) method, passing in the callback URL and timeout queried from the headers. The method will return the SID that can be used in the response.
        If the method call returns an error, map the error to an appropriate response code and send the response.
    Else, if the request is a re-SUBSCRIBE request
        Query the SID header. If it exists, ensure that the NT and Callback headers do not. If the latter is true, send a "400 Bad Request" response. If the SID header was not present, or was empty, respond with "412 Precondition Failed."
        Query the Timeout header. If it exists, convert it to a base 10 integer, and keep it in a local variable. If not use a default timeout of 21,600 seconds (6 hours).
        Using the query string passed to the Web Server, ask the registrar to return the Eventing Manager object associated with that query string.
        Call the IUPnPEventingManager::RenewSubscriber( ) method, passing in the SID and timeout queried from the headers.
        If the method call returns an error, map the error to an appropriate response code and send the response (i.e. SID invalid).
    If the addition or renewal of a subscriber succeeded, compose the response by setting the following headers:
        the DATE header to the current date
        the SERVER header to the version of the operating system
        For a SUBSCRIBE, the SID header will be the SID returned from IUPnPEventingManager::AddSubscriber( )
        For a re-SUBSCRIBE, the SID header will be the same SID header queried from the request
        The TIMEOUT header will be the csecTimeout result from the AddSubscriber or RenewSubscriber( ) methods.
    If the method is UNSUBSCRIBE
        Query the request for the SID header. If not present respond with "412 Precondition Failed."
        Query for NT and Callback headers. If either are present, respond with "400 Bad Request."
        Using the query string passed to the Web Server, ask the registrar to return the Eventing Manager object associated with that query string.
        Call the IUPnPEventingManager::RemoveSubscriber( ) method, passing in the SID queried from the headers.
        If the method call returns an error, map the error to an appropriate response code and send the response (i.e. SID invalid).

The response to an UNSUBSCRIBE does not have any additional headers so no additional work is required to send it.

Exemplary Computer Hardware

Figure 22:
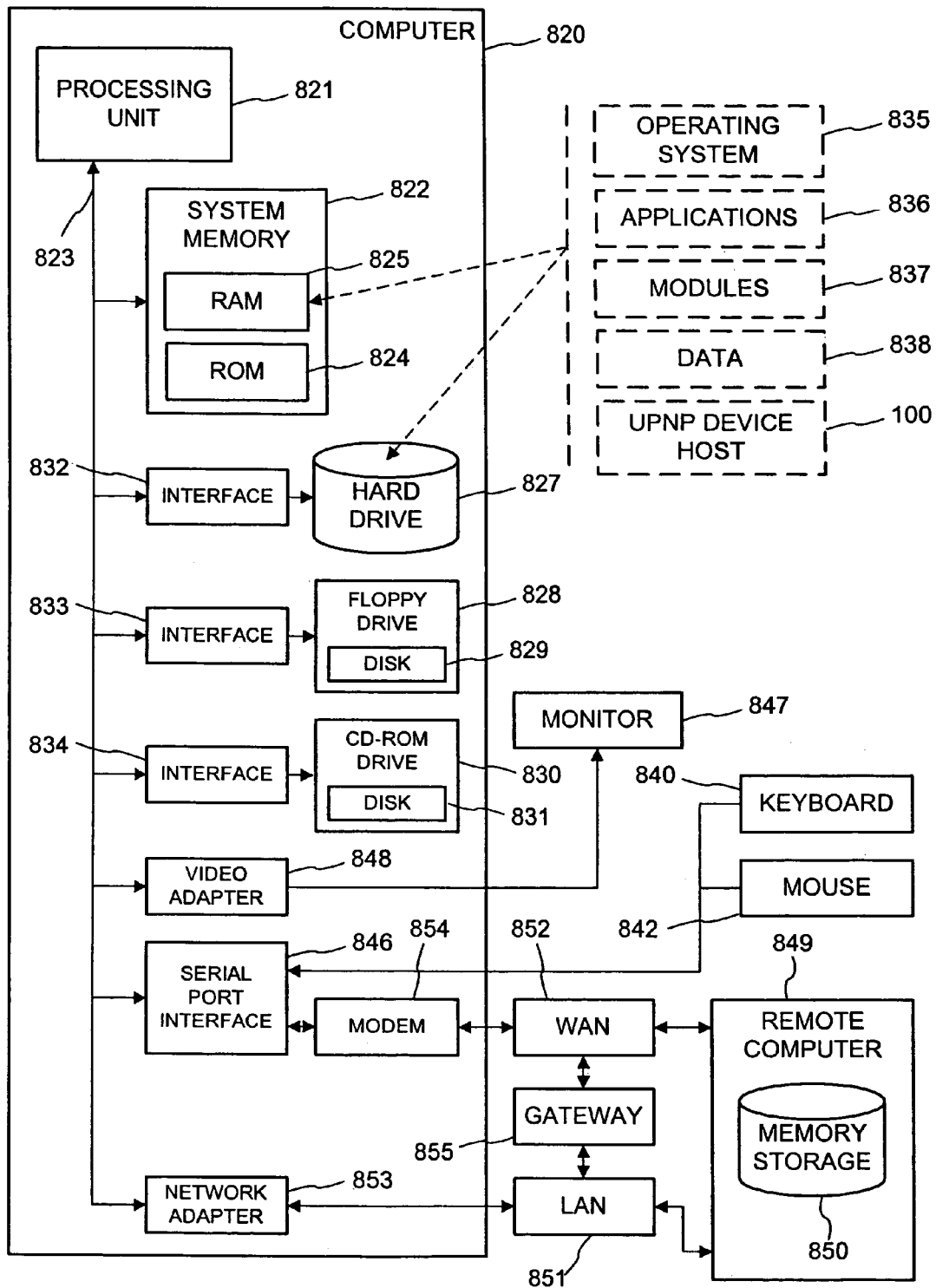
FIG. 22 is a block diagram of a computer system that may be used to run the peer networking host and hosting API of FIG. 1.

FIG. 22 and the following discussion are intended to provide a brief, general description of a suitable computer which may be used to run SSDP services and SSDP clients described above. This conventional computer 820 (such as personal computers, laptops, palmtops or handheld-PCs, set-tops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838, as well as the Device Host 100 and API 102 (FIG. 1).

A user may enter commands and information into the computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated in FIG. 22. The logical connections depicted in FIG. 22 include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described above with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Exemplary Embedded Computing Device

Figure 23:
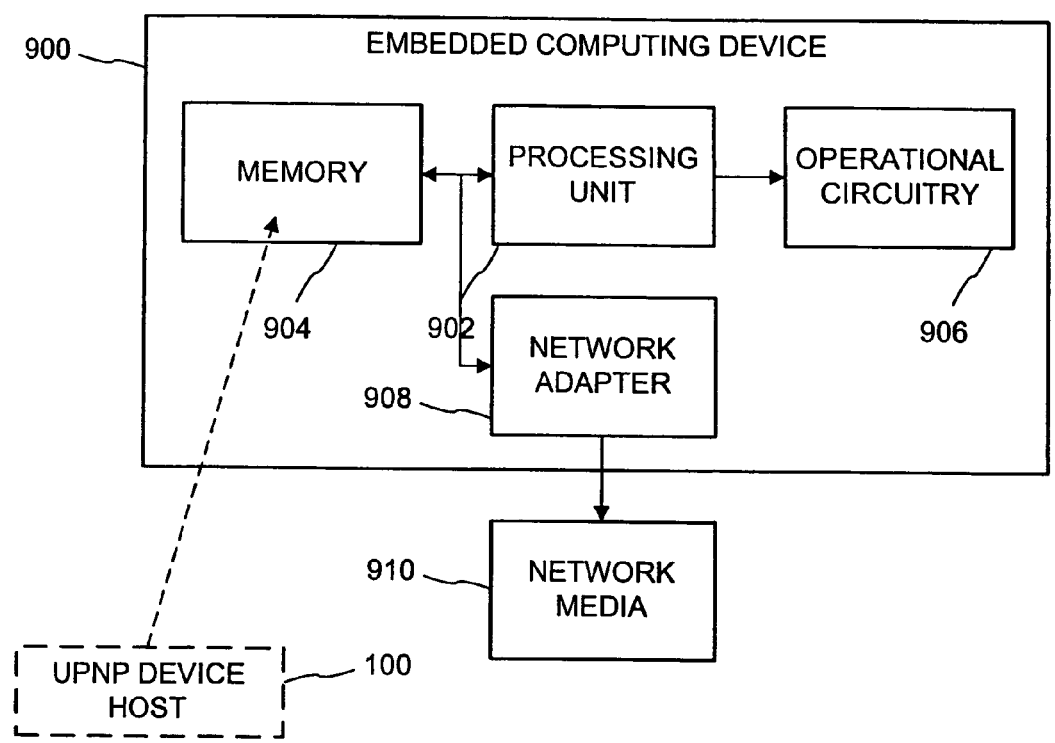
FIG. 23 is a block diagram of a device having embedded computing and networking capability which supports the peer networking host and hosting API of FIG. 1.

FIG. 23 is intended to provide a brief, general description of a suitable embedded computing device 900 which may be used in the illustrated implementation of the invention. The embedded computing device 900 can be any variety of device incorporating electronics to control operational functions (operational circuitry 906), and in which computing and networking capabilities are embedded. For example, devices in which computing and networking functions can be embedded include communications devices (e.g., telephones, cell phones, audio and video conferencing systems, 2-way radios, etc.), office equipment (printers, fax machines, copiers, dictation, etc.), audio-video equipment (audio and video recorders and players, including televisions, radio receivers, compact disk (CD), digital video disk (DVD), camcorders, etc.), entertainment devices (set-top boxes, game consoles, etc.), environment control equipment (thermostats, heating/ventilation/air-conditioning equipment, light switches, etc.), security systems, home appliances (coffee makers, dishwashers, clothes washer/dryer), automobiles, public facilities equipment (signs, traffic signals, etc.), manufacturing equipment, and many others.

The device 900 includes a processing unit 902, and a memory 904 to provide embedded computing capability. The processing unit 902 has hardware interfaces to the operational circuitry 906 that operates devices functions. The processing unit 902 can be a microprocessor or micro-controller, such as are available from Intel, Motorola, IBM, and others. The memory 904 preferably incorporates RAM and ROM to hold software and data for basic operating code as well as for user applications, including the Device Host 100 and API 102 (FIG. 1).

The device 900 also includes a network adapter 908 for connecting with a network media 910 that is interconnected with the computer network in which the authoritative names registry (described below) is implemented in accordance with the invention. The network adapter 908 can be a network interface card (or chip set integrated on a single board with the processing unit 902) appropriate to the particular network media 910. The network media can be any of various wired or wireless network media, including Ethernet, IEEE 1394 (a.k.a. firewire), radio frequency (including satellite, cell, pager, commercial signal sideband, etc.), power line carrier (PLC), phone line, and television cable, among others.

Illustrative Pervasive Computing Environment

Figure 24:
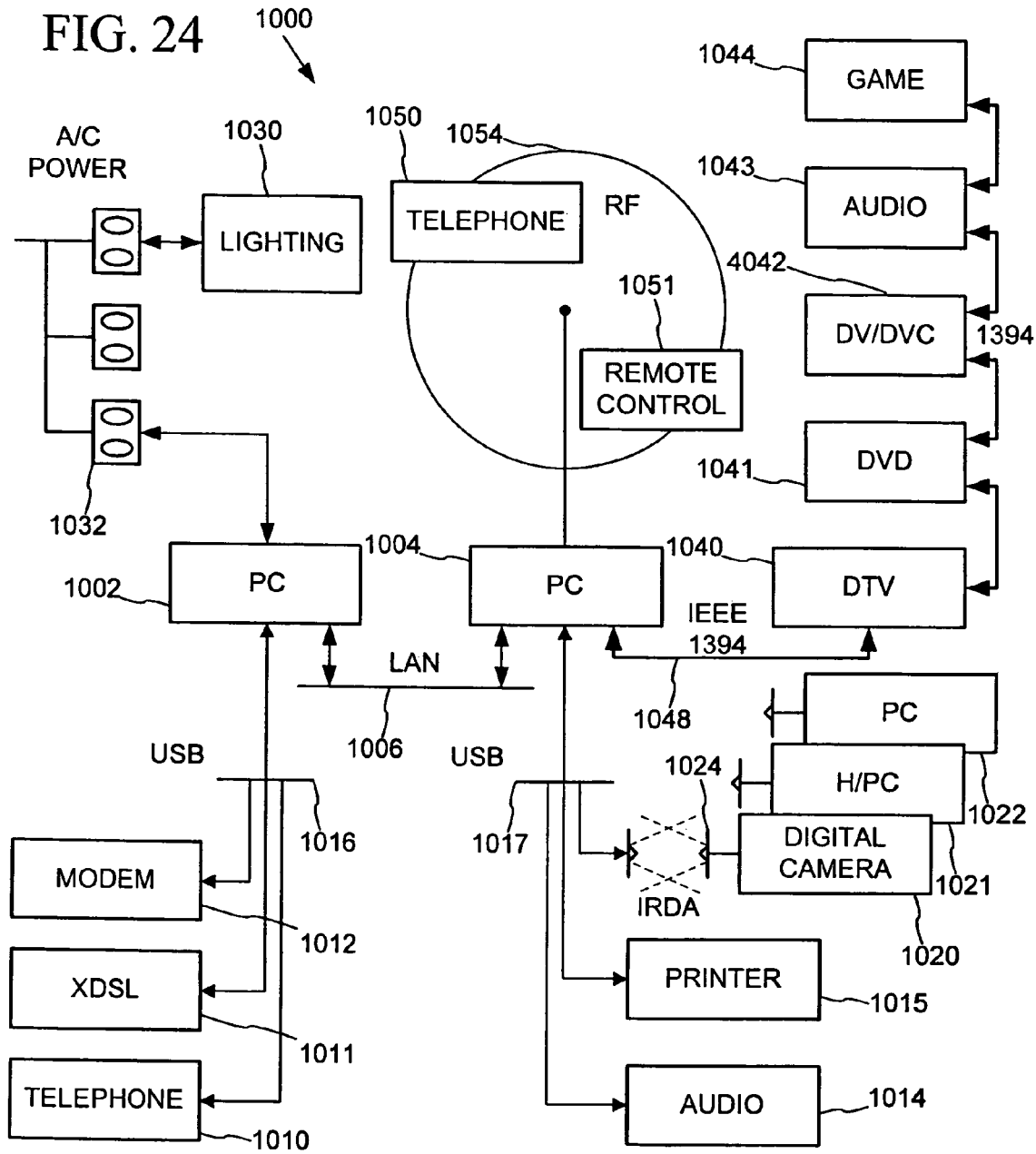
FIG. 24 is a block diagram of an exemplary home or office pervasive computing environment having a variety of computers as per FIG. 22 and embedded computing devices as per FIG. 23 and incorporating the peer networking host and hosting API of FIG. 1.

FIG. 24 illustrates a pervasive computing environment 1000, such as may be installed in a home, office or public place, which includes a large number of embedded computing devices, such as the illustrated device 900 (FIG. 23). The pervasive computing environment 1000 includes personal computers 1002, 1004 (e.g., of the type shown in FIG. 22) connected via a local area network (LAN) 1006. The PC 1002 is connected via a universal serial bus 1016 to a telephone modem 1010, XDSL interface 1011 or a cable modem 1012, which in turn provide a connection with the computer network, e.g., the Internet.

Various embedded computing devices also connect to the computer network via various network connections to the PCs 1002, 1004. These include an audio device 1014 (e.g., speakers, radio tuner, microphone), and printer 1015 which connect to the PC 1004 through a USB 1017. Also, a digital camera 1020, a handheld PC (H/PC) 1021 and another personal computing device 1022 connect via an infrared port (IRDA) 1024, which also attaches to the PC 1004 through the USB 1017. Also, lighting switches 1030 and like home appliances are connected via an A/C power line-based networking 1032 to the PC 1002. Further, a chain of IEEE 1394 cables 1048 connect a digital TV 1040, DVD player 1041, digital video camcorder (DV/DVC) 1042, an audio device 1043 (e.g., CD player/recorder, radio receiver, amplifier, and like audio system component), and a game console 1044. Devices, such as a portable telephone 1050 and remote control 1051, have a radio frequency network connection with the PC 1004.

With their various inter-networked connections, the embedded computing devices are "visible" and accessible from a client device also connected to the computer network.

APPENDIX

Device Host API Reference

IUPnPDeviceControl

The IUPnPDeviceControl interface serves as the central point of management for the device and its service objects

| IDL Reference: |
|---|
| [<br>    uuid(f5bcf2f0-f411-4da5-805c-1ea0afdb0869),<br>    pointer_default(unique),<br>]<br>interface IUPnPDeviceControl : IUnknown<br>{<br>    [helpstring("method Initialize")]<br>    HRESULT Initialize(<br>        [in] BSTR        bstrXMLDesc,<br>        [in] BSTR        bstrInitString,<br>        [in] BSTR        bstrDeviceIdentifier);<br>    [helpstring("method GetServiceObject")]<br>    HRESULT GetServiceObject(<br>        [in]        BSTR    bstrUDN,<br>        [in]        BSTR    bstrServiceId,<br>        [out, retval] IDispatch ** ppdispService);<br>} |

When to Implement

Implemented in the device control object by the hosted device developer.

When to Use

The device host uses this interface to initialize the device and get access to the service objects for related control requests.

Methods and Properties

| Method | Description |
|---|---|
| Initialize | Initializes the device control object with the device description and a device specific initialization string |
| GetServiceObject | Returns an IDispatch pointer to the service object requested by the device host |

IUPnPDeviceControl::Initialize

The IUPnPDeviceControl::Initialize method is invoked by the device host to initialize the device.

```
HRESULT Initialize (
    BSTR bstrXMLDesc,
    BSTR bstrInitString,
    BSTR bstrDeviceIdentifier
    );
```

Parameters:

bstrXMLDesc

[in] Specifies the full XML device description as published by the device host.

bstrInitString

[in] Specifies a device specific initialization string bstrDeviceIdentifier

[in] Device identifier obtained as a result of a call to IUPnPRegistrar::RegisterDevice( ) and IUPnPRegistrar::RegisterRunningDevice( ).

Return Values:

If the method succeeds, the return value is S_OK. Otherwise, the method returns on of the COM error codes defined in WinError.h.

IUPnPDeviceControl::GetServiceObject

The IUPnPDeviceControl::GetServiceObject method is used to retrieve an IDispatch pointer to the service object referenced by the device host

```
HRESULT GetServiceObject(
    BSTR        bstrUDN,
    BSTR        bstrServiceId,
    IDispatch   **pdispService
    );
```

Parameters:

bstrUDN

[in] Specifies the UDN of the device bstrServiceId

[in] Specifies the Service ID of the service pdispService

[out, retval] Contains the address of an IDispatch pointer to the service object Return Values:

If the method succeeds, the return value is S_OK. Otherwise, the method returns one of the COM error codes defined in WinError.h.

Remarks:

This method is called by the device host when a control request is received for a particular service. If the service object already exists, then it returns a pointer to the existing instance, otherwise it instantiates a new service object.

IUPnPRegistar

The IUPnPRegistrar object allows the registration of the devices/bridges that will run in the context of the device host.

---
IDL Reference:
---

```
[
    uuid(204810b6-73b2-11d4-bf42-00b0d0118b56),
    pointer_default(unique)
]
interface IUPnPRegistrar : IUnknown
{
    HRESULT RegisterDevice(
        [in]             BSTR    bstrXMLDesc,
        [in]             BSTR    bstrProgIDDeviceControlClass,
        [in]             BSTR    bstrInitString,
        [in]             BSTR    bstrContainerId,
        [in]             BSTR    bstrResourcePath,
        [in]             long    nLifeTime,
        [out, retval]    BSTR    * pbstrDeviceIdentifier);
    HRESULT RegisterRunningDevice(
        [in]             BSTR       bstrXMLDesc,
        [in]             IUnknown * punkDeviceControl,
        [in]             BSTR       bstrInitString,
        [in]             BSTR       bstrResourcePath,
        [in]             long       nLifeTime
        [out, retval]    BSTR    * pbstrDeviceIdentifier);
    HRESULT RegisterDeviceProvider(
        [in] BSTR       bstrProviderName,
        [in] BSTR       bstrProgIDProviderClass,
        [in] BSTR       bstrInitString,
        [in] BSTR       bstrContainerId);
    HRESULT GetUniqueDeviceName(
        [in]             BSTR    bstrDeviceIdentifier,
        [in]             BSTR            bstrTemplateUDN,
        [out, retval] BSTR        * pbstrUDN);
    HRESULT UnregisterDevice(
        [in] BSTR       bstrDeviceIdentifier,
        [in]  BOOL   fPermanent);
    HRESULT UnegisterDeviceProvider(
        [in] BSTR       bstrProviderName);
}
```

When to Implement
UPnP Device Host implements this interface.
When to Use
You should use this interface to register a device for use on a UPnP network.
Methods and Properties

| Method | Description |
|---|---|
| RegisterDevice | Statically registers a device with the device host |
| RegisterRunningDevice | Registers a device that is already running with the device host |
| RegisterDeviceProvider | Registers a device provider with the device host |
| GetUniqueDeviceName | Returns the UDN of the device |
| UnregisterDevice | Unregisters and unloads the device from the device host |
| UnregisterDeviceProvider | Unregisters and unloads a device provider from the device host |

IUPnPRegistrar::RegisterDevice

The IUPnPRegistrar::RegisterDevice method registers a device with the device host framework, persists this information, and returns a device identifier, which would be used while unregistering or re-registering the device. The device is subsequently published on the network.

```
HRESULT RegisterDevice(
    BSTR bstrXMLDesc,
    BSTR bstrProgIDDeviceControlClass,
    BSTR bstrInitString,
    BSTR bstrContainerId,
    BSTR bstrResourcePath,
    LONG    nLifeTime,
    BSTR *pbstrDeviceIdentifier
);
```

Parameters:

bstrXMLDescr

[in] The XML device description template, as described in section 3.1.

bstrProgIDDeviceControlClass

[in] The ProgID of a device object that implements IUPnPDeviceControl.

This must be an in-process COM server (CLSTX_IN-PROC_SERVER)

bstrInitString

[in] The device specific initialization string that gets passed on to IUPnPDeviceControl::Initialize.

bstrContainerId

[in] A string that identifies the process group in which the device belongs. All devices with the same container identifier will be contained in the same process.

bstrResourcePath

[in] Location of the resource directory of the device. This resource directory will contain the various icon files and service descriptions specified in the device description template.

nLifeTime

[in] SSDP timeout (in seconds) of the device after which the announcements will be refreshed. If the value is 0, then a default timeout of 1800 seconds is used. If a timeout of less 900 seconds is specified, then an E_IN-VALIDARG is returned.

pbstrDeviceIdentifier

[out, retval] Device identifier that will be used when unregistering or re-registering the device Return Values:

If the method succeeds, the return value is S_OK. Otherwise, the method returns one of the COM error codes defined in WinError.h.

IUPnPRegistrar::RegisterRunningDevice

The IUPnPRegistrar::RegisterRunningDevice method registers a running device with the device host framework and returns a device identifier to be used when unregistering or reregistering the device. The device is subsequently published on the network.

```
HRESULT RegisterRunningDevice(
    BSTR       bstrXMLDesc,
    IUnknown *punkDeviceControl,
    BSTR       bstrInitString,
    BSTR       bstrResourcePath,
    LONG       nLifeTime,
    BSTR       *pbstrDeviceIdentifier
);
```

Parameters:

bstrXMLDescr

[in] The XML device description template, as described in section 3.1.

punkDeviceControl

[in] IUnknown pointer to the device's device control class bstrInitString

[in] The device specific initialization string that gets passed to IUPnPDeviceControl::Initialize.

bstrResourcePath

[in] Location of the resource directory of the device. This resource directory will contain the various icon files and service descriptions specified in the device description template.

nLifeTime

[in] SSDP timeout (in seconds) of the device after which the announcements will be refreshed.

pbstrDeviceIdentifier

[out, retval] Device identifier that will be used when unregistering or re-registering the device Return Values:

If the method succeeds, the return value is S_OK. Otherwise, the method returns one of the COM error codes defined in WinError.h.

IUPnPRegistrar::RegisterDeviceProvider

The IUPnPRegistrar::RegisterDeviceProvider method registers a device provider with the device host framework. The device provider, however, is not published on the network. Instead, it should create devices dynamically and register them on the fly with IUPnPRegistrar::RegisterRunningDevice.

```
HRESULT RegisterDeviceProvider(
    BSTR bstrProviderName,
    BSTR bstrProgIDProviderClass,
    BSTR bstrInitString,
    BSTR bstrContainerId
);
```

Parameters:

bstrProviderName

[in] Name of the device provider bstrProgIDProviderClass

[in] The ProgID of the IUPnPDeviceProvider interface that has already been registered with the device host framework bstrInitString

[in] A device provider specific initialization string.

bstrContainerId

[in] A string that identifies the process group in which the device provider belongs. All devices/device providers with the same container identifier will be contained in the same process.

Return Values:

If the method succeeds, the return value is S_OK. Otherwise, the method returns one of the COM error codes defined in WinError.h.

IUPnPRegistrar::GetUniqueDeviceName

The IUPnPRegistrar::GetUniqueDeviceName method retrieves the UDN that the device host has generated for the device. The UDNs specified for devices in the device description template get replaced with globally unique UDNs during registration.

```
HRESULT GetUniqueDeviceName(
    BSTR bstrDeviceIdentifier,
    BSTR bstrTemplateUDN,
    BSTR *pbstrUDN
);
```

Parameters:

bstrDeviceIdentifier

[in] The identifier returned from IUPnPRegistrar::IUPnPRegisterDevice( ) or IUPnPRegistrar::RegisterRunningDevice( ).

bstrTemplateUDN

[in] UDN specified in the device description template pbstrUDN

[out, retval] The device UDN generated by the device host

Return Values:

If the method succeeds, the return value is S_OK. Otherwise, the method returns one of the COM error codes defined in WinError.h.

IUPnPRegistrar::UnregisterDevice

The IUPnPRegistrar::UnregisterDevice method unregisters the device from the device host framework. It allows a device to be temporarily or permanently unregistered.

```
HRESULT UnregisterDevice(
    BSTR bstrDeviceIdentifier,
    BOOL fPermanent
);
```

Parameters:

bstrDeviceIdentifier

[in] The device identifier returned from IUPnPRegistrar::RegisterDevice( ) and IUPnPRegistrar::RegisterRunningDevice( ).

fPermanent

[in] A flag to determine if the device should be deleted permanently (TRUE) or not (FALSE).

Return Values:

If the method succeeds, the return value is S_OK. Otherwise, the method returns one of the COM error codes defined in WinError.h.

Remarks:

This method will remove a device from the device host. If the flag is set, then it will permanently delete the device, otherwise, it will persist the mapping of the device identifier (returned from IUPnPRegistrar::RegisterDevice or IUPnPRegistrar::RegisterRunningDevice) with the UDN of the device generated by the device host. Consequently, on re-registration, the previous UDN associated with the device will be retained.

IUPnPRegistrar::UnregisterDeviceProvider

The IUPnPEventSource::UnregisterDeviceProvider method permanently unregisters and unloads the device provider from the device host.

```
HRESULT UnregisterDeviceProvider(
    BSTR bstrProviderName
);
```

Parameters:
bstrProviderName
[in] Provider Name, as specified in the IUPnPRegistrar::RegisterDeviceProvider.
Return Values:
If the method succeeds, the return value is S_OK. Otherwise, the method returns one of the COM error codes defined in WinError.h.

IUPnPRegistrar

The IUPnPReregistrar object allows the device host to re-register UPnP device(s) with the device host.

---
IDL Reference
---

```
[
    uuid(d9b9bf6a-3986-4071-929e-4ff70e44a5b0),
    pointer_default(unique),
]
interface IUPnPReregistrar : IUnknown
{
    [helpstring("method ReregisterDevice")]
    HRESULT ReregisterDevice(
        [in] BSTR    bstrDeviceIdentifier,
        [in] BSTR    bstrXMLDesc,
        [in] BSTR    bstrProgIDDeviceControlClass,
        [in] BSTR    bstrInitString,
        [in] BSTR    bstrContainerId,
        [in] LONG    nLifeTime);
    [helpstring("method ReregisterRunningDevice")]
    HRESULT ReregisterRunningDevice(
        [in] BSTR       bstrDeviceIdentifier,
        [in] BSTR       bstrXMLDesc,
        [in] IUnknown   * punkDeviceControl,
        [in] BSTR       bstrInitString,
        [in] BSTR       bstrResourcePath,
        [in] LONG       nLifeTime);
}
```

When to Implement
UPnP Device Host implements this interface.
When to Use
The caller should use this interface to re-register devices with the UDN originally generated by the device host on a call to IUPnPRegistrar::RegisterDevice( ) and IUPnPRegistrar::RegisterRunningDevice( ).
Methods and Properties

| Method | Description |
| --- | --- |
| ReregisterDevice | Re-registers the static device with the same original UDN |
| ReregisterRunningDevice | Re-registers the running device with the same original UDN |

IUPnPReregistrar::ReregisterDevice
The IUPnPReregistrar::ReregisterDevice method re-registers a device with the device host.

---
```
HRESULT ReregisterDevice(
    BSTR bstrDeviceIdentifier,
    BSTR bstrXMLDesc,
    BSTR bstrProgIDDeviceControlClass,
    BSTR bstrInitString,
    BSTR bstrContainerId,
    BSTR bstrResourcePath,
    LONG    nLifeTime
);
```
---

Parameters:
bstrDeviceIdentifier
[in] The device identifier returned by IUPnPRegistrar::RegisterDevice( ) and IUPnPRegistrar::RegisterRunningDevice( ).
bstrXMLDescr
[in] The XML device description template, as described in section 3.1.
bstrProgIDDeviceControlClass
[in] The ProgID of a device object that implements IUPnPDeviceControl. This must be an in-process COM server (CLSTX_INPROC_SERVER)
bstrInitString
[in] The device specific initialization string that gets passed on to IUPnPDeviceControl::Initialize.
bstrContainerId
[in] A string that identifies the process group in which the device belongs. All devices with the same container identifier will be contained in the same process.
bstrResourcePath
[in] Location of the resource directory of the device. This resource directory will contain the various icon files and service descriptions specified in the device description template.
nLifeTime
[in] SSDP timeout (in seconds) of the device after which the announcements will be refreshed.
Return Values:
If the method succeeds, the return value is S_OK. Otherwise, the method returns one of the COM error codes defined in WinError.h.

IUPnPReregistrar::ReregisterRunningDevice
The IUPnPReregistrar::ReregisterDevice method re-registers a running device with the device host.

---
```
HRESULT ReregisterRunningDevice(
    BSTR        bstrDeviceIdentifier,
    BSTR        bstrXMLDesc,
    IUnknown    *punkDeviceControl,
    BSTR        bstrInitString,
    BSTR        bstrResourcePath,
    LONG        nLifeTime
);
```
---

Parameters:
bstrDeviceIdentifier
[in] The device identifier returned by IUPnPRegistrar::RegisterDevice( ) and IUPnPRegistrar::RegisterRunningDevice( ).
bstrXMLDescr
[in] The XML device description template, as described in section 3.1.
punkDeviceControl
[in] IUnknown pointer to the device's device control class
bstrInitString
[in] The device specific initialization string that gets passed to IUPnPDeviceControl::Initialize.
bstrResourcePath
[in] Location of the resource directory of the device. This resource directory will contain the various icon files and service descriptions specified in the device description template.
nLifeTime
[in] SSDP timeout (in seconds) of the device after which the announcements will be refreshed.

Return Values:

If the method succeeds, the return value is S_OK. Otherwise, the method returns one of the COM error codes defined in WinError.h.

IUPnPDeviceProvider

The IUPnPDeviceProvider object allows a device provider to be started and stopped.

---
IDL Reference
---

```
[
    object,
    uuid(e5191547-d010-4431-8004-bffb4f8c5d9f),
    pointer_default(unique),
    version(1.0)
]
interface IUPnPDeviceProvider : IUnknown
{
    [helpstring("method Start")]
    HRESULT Start(
        [in] BSTR bstrInitString);
    [helpstring("method Stop")]
    HRESULT Stop( );
}
```

When to Implement
Hosted Device developer implement this interface when writing a device provider.
When to Use
The device host uses this interface to start and stop a device provider. The device provider is automatically started on boot up.
Methods and Properties

| Method | Description |
|---|---|
| Start | Starts the device provider |
| Stop | Stops the device provider |

IUPnPDeviceProvider::Start
The IUPnPDeviceProvider::Start method starts the device provider.

```
HRESULT Start(
    BSTR bstrInitString
);
```

Parameters:
bstrInitString
[in] Device provider specific initialization string, which was passed at registration.
Return Values:
If the method succeeds, the return value is S_OK. Otherwise, the method returns one of the COM error codes defined in WinError.h.

IUPnPDeviceProvider::Stop
The IUPnPDeviceProvider::Stop stops the device provider

```
HRESULT Stop(
);
```

Return Values:
If the method succeeds, the return value is S_OK. Otherwise, the method returns one of the COM error codes defined in WinError.h.

IUPnPEventSink

The IUPnPEventSink object allows the hosted service to send event notifications to the device host.

---
IDL Reference
---

```
[
    uuid(204810b4-73b2-11d4-bf42-00b0d0118b56),
    pointer_default(unique)
]
interface IUPnPEventSink: IUnknown
{
    [helpstring("method OnStateChanged"), hidden]
    HRESULT OnStateChanged(
        [in] DWORD cChanges,
        [in, size_is(cChanges)] DISPID rgdispidChanges[ ]);
    [helpstring("method OnStateChangedSafe")]
    HRESULT OnStateChangedSafe(
        [in] LONG cChanges,
        [in] SAFEARRAY(DISPID) sadispidChanges);
}
```

When to Implement
UPnP Device Host implements this interface.
When to Use
This is the interface you must query for after the device host invokes the Advise method on IUPnPEventSource.
Methods and Properties

| Method | Description |
|---|---|
| OnStateChanged | Sends the list of variables along with their changed values to the device host for distribution to subscribed clients. |
| OnStateChangedSafe | Used with VB clients, otherwise same functionality as IUPnPEventSink::OnStateChanged |

IUPnPEventSink::OnStateChanged
The IUPnPDeviceProvider::OnStateChanged method sends an event to the device host with the list of DISPIDs that have changed. The device host will then query your service object to obtain the new values of the state variables. This method is hidden from VB users.

```
HRESULT OnStateChanged(
    DWORD       changes,
    DISPID      rgdispidChanges[ ]
);
```

Parameters:
cChanges
[in] Number of variables in the list being sent to the device host. Indicates the number of variables whose value has changed.
rgdispidChanges[ ]
[in, size_is(changes)] List of DISPIDs of the state variables that have changed.
Return Values:
If the method succeeds, the return value is S_OK. Otherwise, the method returns one of the COM error codes defined in WinError.h.
IUPnPEventSink::OnStateChangedSafe The IUPnPDeviceProvider::OnStateChangedSafe should be used from VB, and has the same functionality as IUPnPEventSink::OnStateChanged.

```
HRESULT OnStateChangedSafe(
    LONG                cChanges
    SAFEARRAY(DISPID)   *rgdispidChanges
);
```

Parameters:
cChanges
[in] Number of variables in the list being sent to the device host. Indicates the number of variables whose value has changed.
rgdispidChanges[ ]
[in, size_is(changes)] Safe array of DISPIDs of variables that have changed.
Return Values:
If the method succeeds, the return value is S_OK. Otherwise, the method returns one of the COM error codes defined in WinError.h.

IUPnPEventSource

The IUPnPEventSource interface allows the device host to subscribe/unsubscribe to/from receiving events from the hosted service.

| IDL Reference |
|---|
| [<br>    uuid(204810b5-73b2-11d4-bf42-00b0d0118b56),<br>    pointer_default(unique)<br>]<br>interface IUPnPEventSource: IUnknown<br>{<br>    [helpstring("method Advise")]<br>    HRESULT Advise(<br>        [in] IUnknown * punkSubscriber);<br>    [helpstring("method Unadvise")]<br>    HRESULT Unadvise(<br>        [in] IUnknown * punkSubscriber);<br>} |

When to Implement
Service object implements if the service object has evented state variables.
When to Use
The device host uses this interface to set up/tear down the association between itself and the hosted service for receiving events
Methods and Properties

| Method | Description |
|---|---|
| Advise | Used by the device host to set up the association between the itself and the hosted service for the hosted service to send events to the device host |
| Unadvise | Used by the device host to tell the hosted service to remove the association between itself and the hosted service for receiving events |

IUPnPEventSource::Advise
The IUPnPEventSource::Advise method is invoked by the device host to set up for receiving events from the hosted service. The device host passes in a pointer to its IUnknown interface that the hosted service must query for the IUPnPEventSink interface.

```
HRESULT Advise(
    IUnknown    *punkSubscriber
);
```

Parameters:
punkSubscriber
[in] Pointer to the device host's IUnknown interface that the hosted service will query for IUPnPEventSink interface.
Return Values:
If the method succeeds, the return value is S_OK. Otherwise, the method returns one of the COM error codes defined in WinError.h.
IUPnPEventSource::Unadvise
The IUPnPEventSource::Unadvise method is invoked by the device host to tell the hosted service that it does not wish to receive events. The device host passes in the same object pointer that it did for the IUPnPEventSource::Advise method causing the hosted service to release the reference that it held.

```
HRESULT Unadvise(
    IUnknown    *punkSubscriber
);
```

Parameters:
punkSubscriber
[in] Pointer to the device host's IUnknown interface. This is the same object pointer that was passed in the IUPnPEventSource::Advise call.
Return Values:
If the method succeeds, the return value is S_OK. Otherwise, the method returns one of the COM error codes defined in WinError.h.

IUPnPAutomationProxy

The IUPnPAutomationProxy interface provides a method for executing UPnP control requests by invoking a method on a service object's service-specific dispinterface.

| IDL Definition |
|---|
| [<br>    object,<br>    uuid(C4AB1FEA-D0DD-44FD-96CB-41B41B5F718A),<br>    helpstring("IUPnPAutomationProxy Interface"),<br>    pointer_default(unique)<br>]<br>interface IUPnPAutomationProxy: IUnknown<br>{<br>    [helpstring("method QueryStateVariablesByDispId")]<br>    HRESULT QueryStateVariablesByDispIds(<br>        [in]            DWORD    cDispIds,<br>        [in, size_is(cDispIds)]  DISPID   * rgDispIds,<br>        [out]           DWORD    * pcVariables,<br>        [out, size_is(*pcVariables)] LPWSTR   * rgszVariableNames,<br>        [out, size_is(*pcVariables)] VARIANT  * rgvarValues,<br>        [out, size_is(*pcVariables)] LPWSTR   * rgszUPnPDataTypes);<br>    [helpstring("method ExecuteRequest")]<br>    HRESULT ExecuteRequest(<br>        [in] UPNP_CONTROL_REQUEST * pucreq,<br>        [out] UPNP_CONTROL_RESPONSE * pucresp);<br>}; |

When to Implement

You should not implement this interface. The UPnP Device Host API provides complete functionality.

When to Use

This interface will be used by the UPnP Device Host Service Control ISAPI extension.

IUPnPAutomationProxy::ExecuteRequest

The IUPnPAutomationProxy::ExecuteRequest( ) method takes a deserialized control request, executes the request, and returns deserialized response information.

HRESULT ExecuteRequest([in] UPNP_CONTROL_REQUEST * pucreq, [out] UPNP_CONTROL_RESPONSE * pucresp);

Parameters pucreq

[in] Contains a pointer to a UPNP_CONTROL_REQUEST structure containing a deserialized UPnP control request pucresp

[out] Contains a pointer to a caller-allocated UPNP_CONTROL_RESPONSE structure. Upon return, this will contain the deserialized response from the service object. Memory for the array of output arguments will be allocated internally and must be freed by the caller using CoTaskMemFree( ).

Return Values

If the method succeeds and the service object returns a successful response to the control request, the return value is S_OK. If the method succeeds, but the service object returns a failure response to the control request the return value is UPNP_S_ACTION_FAILED. Otherwise, the method returns one of the COM error codes defined in WinError.h.

Remarks

If this method returns S_OK, the caller should look at the fields pertaining to success responses in the UPNP_CONTROL_RESPONSE structure returned. If this method returns UPNP_S_ACTION_FAILED, then the caller should look at the fields pertaining to failure responses instead.

IUPnPServiceDescriptionInfo

The IUPnPServiceDescriptionInfo interface provides methods for obtaining data type information from a Service Description.

| IDL Definition |
| --- |
| [<br>  object,<br>  uuid(f5b63656-069d-4e80-b4fd-9e0db16604d8),<br>  helpstring("IUPnPServiceDescriptionInfo Interface"),<br>  pointer_default(unique)<br>]<br>interface IUPnPServiceDescriptionInfo : IUnknown<br>{<br>  [helpstring("method GetVariableType")]<br>  HRESULT GetVariableType(<br>    [in] LPCWSTR pcwszVarName,<br>    [out] BSTR  * pbstrType);<br>  [helpstring("method GetArgumentType")]<br>  HRESULT GetArgumentType(<br>    [in] LPWSTR pcwszActionName,<br>    [in] LPWSTR pcwszArgumentName,<br>    [out] BSTR  * pbstrType);<br>  [helpstring("method GetOutputArgumentName")]<br>  HRESULT GetOutputArgumentName(<br>    [in] LPWSTR pcwszActionName,<br>    [in] DWORD dwOutArgNum,<br>    [out] BSTR  * pbstrName);<br>}; |

When to Implement

You should not implement this interface. The UPnP Device Host provides complete functionality.

When to Use

This interface will be used by the UPnP Device Host Service Control ISAPI extension and the eventing subsystem.

IUPnPServiceDescriptionInfo::GetVariableType

The IUPnPServiceDescriptionInfo:: Get VariableType method returns the data type information for a service state variable.

HRESULT GetVariableType([in] LPCWSTR pcwszVarName, [out] BSTR *pbstrType);

Parameters pcwszVarName

[in] Contains a pointer to a null-terminated wide-character string containing the variable name pbstrType

[out] On successful return, receives a pointer to a BSTR that specifies the data type of the state variable. This BSTR is allocated internally and must be freed by the caller using SysFreeString( ).

Return Values

If the method succeeds, the return value is S_OK. Otherwise, the method returns one of the COM error codes defined in WinError.h, or one of the values described below:

| | |
| --- | --- |
| UPNP_E_INVALID_VARIABLE | The variable whose name is specified by pcwszVarName does not exist. |

Remarks

The string returned in pbstrType contains one of the standard UPnP data type names (e.g. "i4" or "string").

IUPnPServiceDescriptionInfo::GetArgumentType

The IUPnPServiceDescriptionInfo::GetArgumentType method returns the data type information for an argument to a service action.

HRESULT GetArgumentType([in] LPWSTR pcwszActionName, [in] LPWSTR pcwszArgumentName, [out] BSTR *pbstrType);

Parameters pcwszActionName

[in] Contains a pointer to a null-terminated wide-character string containing the service action name pcwszArgumentName

[in] Contains a pointer to a null-terminated wide-character string containing the argument name pbstrType

[out] On successful return, receives a pointer to a BSTR that specifies the data type of the argument. This BSTR is allocated internally and must be freed by the caller using SysFreeString( ).

Return Values

If the method succeeds, the return value is S_OK. Otherwise, the method returns one of the COM error codes defined in WinError.h, or one of the values described below:

| | |
| --- | --- |
| UPNP_E_INVALID_ACTION | The action whose name is specified by pcwszActionName does not exist. |
| UPNP_E_INVALID_ARGUMENT | The argument whose name is specified by pcwszArgumentName does not exist. |

Remarks

The string returned in pbstrType contains one of the standard UPnP data type names (e.g. "i4" or "string").

IUPnPServiceDescriptionInfo::GetOutputArgumentName

The IUPnPServiceDescriptionInfo::GetOutputArgumentName method returns the name of an output argument to a service action.

HRESULT GetOutputArgumentName([in] LPWSTR pcwszActionName, [in] DWORD dwOutArgNum, [out] BSTR *pbstrName);

Parameters pcwszActionName

[in] Contains a pointer to a null-terminated wide-character string containing the service action name dwOutArgNum

[in] Contains the ordinal number of the output argument whose name is being sought. This number is zero based i.e. to get the name of the first output argument, specify 0 for this parameter; to get the name of the second output argument, specify 1 for this parameter etc.

pbstrName

[out] On successful return, receives a pointer to a BSTR that contains the name of the output argument. This BSTR is allocated internally and must be freed by the caller using SysFreeString( ).

Return Values

If the method succeeds, the return value is S_OK. Otherwise, the method returns one of the COM error codes defined in WinError.h, or one of the values described below:

| | |
|---|---|
| UPNP_E_INVALID_ACTION | The action whose name is specified by pcwszActionName does not exist. |
| UPNP_E_INVALID_ARGUMENT | dwOutArgNum specifies an invalid ordinal number |

APPENDIX

Universal Plug and Play Device Architecture

Table of Contents

Introduction

0. Addressing

1. Discovery

2. Description

3. Control

4. Eventing

5. Presentation

Glossary

INTRODUCTION

What is Universal Plug and Play?

Universal Plug and Play (UPnP) is an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. Universal Plug and Play is a distributed, open networking architecture that leverages TCP/IP and the Web technologies to enable seamless proximity networking in addition to control and data transfer among networked devices in the home, office, and public spaces.

UPnP is more than just a simple extension of the plug and play peripheral model. It is designed to support zero-configuration, "invisible" networking and automatic discovery for a breadth of device categories from a wide range of vendors. This means a device can dynamically join a network, obtain an IP address, convey its capabilities, and learn about the presence and capabilities of other devices. DHCP and DNS servers are optional and are used only if available on the network. Finally, a device can leave a network smoothly and automatically without leaving any unwanted state behind.

UPnP leverages Internet components, including IP, TCP, UDP, HTTP, and XML. Like the Internet, contracts are based on wire protocols that are declarative, expressed in XML, and communicated via HTTP. IP internetworking is a strong choice for UPnP because of its proven ability to span different physical media, to enable real world multiple-vendor interoperation, and to achieve synergy with the Internet and many home and office intranets. UPnP has been explicitly designed to accommodate these environments. Further, via bridging, UPnP accommodates media running non-IP protocols when cost, technology, or legacy prevents the media or devices attached to it from running IP.

What is "universal" about UPnP? No device drivers; common protocols are used instead. UPnP networking is media independent. UPnP devices can be implemented using any programming language, and on any operating system. UPnP does not specify or constrain the design of an API for applications running on control points; OS vendors may create APIs that suit their customer's needs. UPnP enables vendor control over device UI and interaction using the browser as well as conventional application programmatic control.

UPnP Forum

The UPnP Forum is an industry initiative designed to enable easy and robust connectivity among stand-alone devices and PCs from many different vendors. The UPnP Forum seeks to develop standards for describing device protocols and XML-based device schemas for the purpose of enabling device-to-device interoperability in a scalable networked environment. The UPnP Forum oversees a logo program for compliant devices.

The UPnP Forum has set up working committees in specific areas of domain expertise. These working committees are charged with creating proposed device standards, building sample implementations, and building appropriate test suites. This document indicates specific technical decisions that are the purview of UPnP Forum working committees.

UPnP vendors can build compliant devices with confidence of interoperability and benefits of shared intellectual property and the logo program. Separate from the logo program, vendors may also build devices that adhere to the UPnP Device Architecture defined herein without a formal standards procedure. If vendors build non-standard devices, they determine technical decisions that would otherwise be determined by a UPnP Forum working committee.

In this Document

The Universal Plug and Play (UPnP) Device Architecture described herein defines the protocols for communication between controllers, or control points, and devices. For discovery, description, control, eventing, and presentation, UPnP uses the following protocol stack.

At the highest layer, messages logically contain only UPnP vendor-specific information about their devices. Moving down the stack, vendor content is supplemented by information defined by UPnP Forum working committees. Messages from the layers above are hosted in UPnP-specific protocols, defined in this document. In turn, the above messages are formatted using the Simple Service Discovery Protocol (SSDP), General Event Notification Architecture (GENA), and Simple Object Access Protocol (SOAP). The above messages are delivered via HTTP, either a multicast or unicast variety running over UDP, or the standard HTTP running over TCP. Ultimately, all messages above are delivered over IP. The remaining sections of this document describe the content and format for each of these protocol layers in detail. For reference, colors in [square brackets] above indicate which protocol defines specific message components throughout this document.

The foundation for UPnP networking is IP addressing. Each device has a Dynamic Host Configuration Protocol (DHCP) client and search for a DHCP server when the device is first connected to the network. If a DHCP server is available, i.e., the network is managed, the device uses the IP addressed assigned to it. If no DHCP server is available, i.e., the network is unmanaged, the device uses Auto IP to get an address. In brief, Auto IP defines how a device intelligently chooses an IP address from a set of reserved addresses and is able to move easily between managed and unmanaged networks. If during the DHCP transaction, the device obtains a domain name, e.g., through a DNS server or via DNS forwarding, the device uses that name in subsequent network operations; otherwise, the device uses its IP address.

Given an IP address, the first step in UPnP networking is discovery. When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information. The UPnP discovery protocol is based on the Simple Service Discovery Protocol (SSDP). The section on Discovery below explains how devices advertise, how control points search, and details of the format of discovery messages.

The second step in UPnP networking is description. After a control point has discovered a device, the control point still knows very little about the device. For the control point to learn more about the device and its capabilities, or to interact with the device, the control point retrieves the device's description from the URL provided by the device in the discovery message. Devices may contain other, logical devices, as well as functional units, or services. The UPnP description for a device is expressed in XML and includes vendor-specific, manufacturer information like the model name and number, serial number, manufacturer name, URLs to vendor-specific Web sites, etc. The description also includes a list of any embedded devices or services, as well as URLs for control, eventing, and presentation. For each service, the description includes a list of the commands, or actions, the service responds to, and parameters, or arguments, for each action; the description for a service also includes a list of variables; these variables model the state of the service at run time, and are described in terms of their data type, range, and event characteristics. The section on Description below explains how devices are described and how those descriptions are retrieved by control points.

The third step in UPnP networking is control. After a control point has retrieved a description of the device, the control point can send actions to a device's service. To do this, a control point sends a suitable control message to the URL for control URL for the service (provided in the device description). Control messages are also expressed in XML using the Simple Object Access Protocol (SOAP). Like function calls, in response to the control message, the service returns any action-specific values. The effects of the action, if any, are modeled by changes in the variables that describe the run-time state of the service. The section on Control below explains the description of actions, state variables, and the format of control messages.

The fourth step in UPnP networking is eventing. A UPnP description for a service includes a list of actions the service responds to and a list of variables that model the state of the service at run time. The service publishes updates when these variables change, and a control point may subscribe to receive this information. The service publishes updates by sending event messages. Event messages contain the names of one of more state variables and the current value of those variables. These messages are also expressed in XML and formatted using the General Event Notification Architecture (GENA). A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all evented variables that have changed, and event messages are sent no matter why the state variable changed (either in response to a requested action or because the state the service is modeling changed). The section on Eventing below explains subscription and the format of event messages.

The fifth step in UPnP networking is presentation. If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device. The section on Presentation below explains the protocol for retrieving a presentation page.

0. Addressing

Addressing is Step 0 of UPnP networking. Through addressing, devices get a network address. Addressing enables discovery (Step 1) where control points find interesting device(s), description (Step 2) where control points learn about device capabilities, control (Step 3) where a control point sends commands to device(s), eventing (Step 4) where control points listen to state changes in device(s), and presentation (Step 5) where control points display a user interface for device(s).

The foundation for UPnP networking is IP addressing. Each device has a Dynamic Host Configuration Protocol (DHCP) client and search for a DHCP server when the device is first connected to the network. If a DHCP server is available, i.e., the network is managed, the device uses the IP addressed assigned to it. If no DHCP server is available, i.e., the network is unmanaged; the device uses automatic IP addressing (Auto-IP) to obtain an address.

Auto-IP defines how a device: (a) determines if DHCP is unavailable, and (b) intelligently chooses an IP address from a set of link-local IP addresses. This method of address assignment enables a device to easily move between managed and unmanaged networks.

The operations described in this section are further clarified in the reference documents listed below. Where conflicts between this document and the reference documents exist, the reference document always takes precedence.

0.1 Addressing: Determining Whether to Use Auto-IP

A device that supports AUTO-IP and is configured for dynamic address assignment begins by requesting an IP address via DHCP by sending out a DHCPDISCOVER message. The amount of time this DHCP Client listens for DHCPOFFERS is implementation dependent. If a DHCPOFFER is received during this time, the device continues the process of dynamic address assignment. If no valid DHCPOFFERS are received, the device may then auto-configure an IP address.

0.2 Addressing: Choosing an Address

To auto-configure an IP address using Auto-IP, the device uses an implementation dependent algorithm for choosing an address in the 169.254/16 range. The first and last 256 addresses in this range are reserved and is not used.

The selected address then is tested to determine if the address is already in use. If the address is in use by another device, another address is chosen and tested, up to an implementation dependent number of retries. The address selection is randomized to avoid collision when multiple devices are attempting to allocate addresses.

0.3 Addressing: Testing the Address

To test the chosen address, the device uses an Address Resolution Protocol (ARP) probe. An ARP probe is an ARP request with the device hardware address used as the sender's hardware address and the sender's IP address set to 0s. The device will then listen for responses to the ARP probe, or other ARP probes for the same IP address. If either of these ARP packets is seen, the device considers the address in use and try a new address.

0.4 Addressing: Periodic Checking for Dynamic Address Availability

A device that has auto-configured an IP address periodically checks for the existence of a DHCP server. This is accomplished by sending DHCPDISCOVER messages. How often this check is made is implementation dependent, but checking every 5 minutes would maintain a balance between network bandwidth required and connectivity maintenance. If a DHCP offer is received, the device proceeds with dynamic address allocation. Once a DHCP assigned address is in place, the device may release the auto-configured address, but may also choose to maintain this address for a period of time to maintain connectivity.

To switch over from one IP address to a new one, the device cancels any outstanding advertisements and reissue new ones. The section on Discovery explains advertisements and their cancellations.

0.5 Addressing: Device Naming and DNS Interaction

Once a device has a valid IP address for the network, it can be located and referenced on that network through that address. There may be situations where the end user needs to locate and identify a device. In these situations, a friendly name for the device is much easier for a human to use than an IP address.

Moreover, names are much more static than IP addresses. Clients referring a device by name don't require any modification when IP address of a device changes. Mapping of the device's DNS name to its IP address could be entered into DNS database manually or dynamically according to RFC 2136. While computers and devices supporting dynamic DNS updates can register their DNS records directly in DNS, it is also possible to configure a DHCP server to register DNS records on behalf of these DHCP clients.

0.6 Addressing: Name to IP Address Resolution

A computer that needs to contact a device identified by a DNS name needs to discover its IP address. The computer submits a DNS query according to RFC1034 and 1035 to the pre-configured DNS server(s) and receives a response from a DNS server containing the IP address of the target device. A computer can be statically pre-configured with the list of DNS servers. Alternatively a computer could be configured with the list of DNS server through DHCP, or after the address assignment through a DHCPINFORM message.

1. Discovery

Discovery is Step 1 in UPnP networking. Discovery comes after addressing (Step 0) where devices get a network address. Through discovery, control points find interesting device(s). Discovery enables description (Step 2) where control points learn about device capabilities, control (Step 3) where a control point sends commands to device(s), eventing (Step 4) where control points listen to state changes in device(s), and presentation (Step 5) where control points display a user interface for device(s).

Discovery is the first step in UPnP networking. When a device is added to the network, the UPnP discovery protocol allows that device to advertise its services to control points on the network. Similarly, when a control point is added to the network, the UPnP discovery protocol allows that control point to search for devices of interest on the network. The fundamental exchange in both cases is a discovery message containing a few, essential specifics about the device or one of its services, e.g., its type, identifier, and a pointer to more detailed information.

When a new device is added to the network, it multicasts a number of discovery messages advertising its embedded devices and services. Any interested control point can listen to the standard multicast address for notifications that new capabilities are available.

Similarly, when a new control point is added to the network, it multicasts a discovery message searching for interesting devices, services, or both. All devices listen to the standard multicast address for these messages and responds if any of their embedded devices or services match the search criteria in the discovery message.

To reiterate, a control point may learn of a device of interest because that device sent discovery messages advertising itself or because the device responded to a discovery message searching for devices. In either case, if a control point is interested in a device and wants to learn more about it, the control point uses the information in the discovery message to send a description query message. The section on Description explains description messages in detail.

When a device is removed from the network, it multicasts a number of discovery messages revoking it's earlier announcements, effectively declaring that it's embedded devices and services will not be available.

To limit network congestion, the time-to-live (TTL) of each IP packet for each multicast message defaults to 4 and is configurable.

Discovery plays an important role in the interoperability of devices and control points using different versions of UPnP networking. The UPnP Device Architecture (defined herein) is versioned with both a major and a minor version, usually written as major.minor, where both major and minor are integers. Advances in minor versions is a compatible superset of earlier minor versions of the same major version. Advances in major version are not required to be supersets of earlier versions and are not guaranteed to be backward compatible. Version information is communicated in discovery and description messages. In the former, each discovery message includes the version of UPnP networking that the device supports. As a backup, the latter also includes the same information. This section explains the format of version information in discovery messages and specific requirements on discovery messages to maintain compatibility with advances in minor versions.

The standard multicast address, as well as the mechanisms for advertising, searching, and revoking, are defined by the Simple Service Discovery Protocol (SSDP). The remainder of this section explains SSDP in detail, enumerating how devices advertise and revoke their advertisements as well as how control points search and devices respond.

1.1 Discovery: Advertisement

When a device is added to the network, the UPnP discovery protocol allows that device to advertise its services to control points. It does this by multicasting discovery messages to a standard address and port. Control points listen to this port to detect when new capabilities are available on the network. To advertise the full extent of its capabilities, a device multicasts a number of discovery messages corresponding to each of its embedded devices and services. Each message contains information specific to the embedded device (or service) as well as information about its enclosing device. Messages include duration until the advertisements expire; if the device remains available, the advertisements are re-sent with (with new duration). If the device becomes unavailable, the device explicitly cancels its advertisements, but if the device is unable to do this, the advertisements will expire on their own.

11.1. Discovery: Advertisement Protocols and Standards

To send (and receive) advertisements, devices (and control points) use the following subset of the overall UPnP protocol stack. (The overall UPnP protocol stack is listed at the beginning of this document.)

At the highest layer, discovery messages contain vendor-specific information, e.g., URL for the device description and device identifier. Moving down the stack, vendor content is supplemented by information from a UPnP Forum working committee, e.g., device type. Messages from the layers above are hosted in UPnP-specific protocols, defined in this document. In turn, the above messages are delivered via a multicast variant of HTTP that has been extended using General Event Notification Architecture (GENA) methods and headers and Simple Service Discovery Protocol (SSDP) headers. The HTTP messages are delivered via UDP over IP. For reference, colors in [square brackets] above indicate which protocol defines specific headers and values in discovery messages listed below.

1.1.2 Discovery: Advertisement: Device Available—NOTIFY with ssdp:alive

When a device is added to the network, it multicasts discovery messages to advertise its root device, to advertise any embedded devices, and to advertise its services. Each discovery message contains four major components:

1. a potential search target (e.g., device type) sent in an NT header,
2. a composite identifier for the advertisement sent in a USN header,
3. a URL for more information about the device (or enclosing device in the case of a service) sent in a LOCATION header, and
4. a duration for which the advertisement is valid sent in a CACHE-CONTROL header.

To advertise its capabilities, a device multicasts a number of discovery messages. Specifically, a root device multicasts:

| | NT | USN |
|---|---|---|
| | Three discovery messages for the root device. | |
| 1 | device UUID | device UUID |
| 2 | device type | device UUID and :: and device type |
| 3 | upnp:rootdevice | device UUID and :: and upnp:rootdevice |
| | Two discovery messages for each embedded device. | |
| 1 | device UUID | device UUID |
| 2 | device type | device UUID and :: and device type |
| | Once for each service. | |
| 1 | service type | device UUID and :: and service type |

If a root device has d embedded devices and s embedded services but only k distinct service types, this works out to 3+2d+k requests. This advertises the full extend of the device's capabilities to interested control points. These messages are sent out as a series with roughly comparable expiration times; order is unimportant, but refreshing or canceling individual messages is prohibited.

Choosing an appropriate duration for advertisements is a balance between minimizing network traffic and maximizing freshness of device status. Relatively short durations close to the minimum of 1800 seconds will ensure that control points have current device status at the expense of additional network traffic; longer durations, say on the order of a day, compromise freshness of device status but can significantly reduce network traffic. Generally, device vendors choose a value that corresponds to expected device usage: short durations for devices that are expected to be part of the network for short periods of time, and significantly longer durations for devices expected to be long-term members of the network.

Due to the unreliable nature of UDP, devices send each of the above discovery messages more than once. As a fallback, to guard against the possibility that a control point might not receive an advertisement for a device or service, the device re-sends its advertisements periodically (cf. CACHE-CONTROL below). Note that UDP packets are also bounded in length (perhaps as small as 512 Bytes in some implementations) and that there is no guarantee that the above 3+2d+k messages will arrive in a particular order.

When a device is added to the network, it sends a multicast request with method NOTIFY and ssdp:alive in the NTS header in the following format. Values in italics are placeholders for actual values.

NOTIFY * HTTP/1.1
HOST: 239.255.255.250:1900
CACHE-CONTROL: max-age=seconds until advertisement expires
LOCATION: URL for UPnP description for root device
NT: search target
NTS: ssdp:alive
SERVER: OS/version, UPnP/1.0, product/version
USN: advertisement UUID
(No body for request with method NOTIFY, but note that the message has a blank line following the last HTTP header.)
The TTL for the IP packet defaults to 4 and is configurable.

Listed below are details for the request line and headers appearing in the listing above. All header values are case sensitive except where noted.

Request Line

NOTIFY

Method defined by GENA for sending notifications and events.

*

Request applies generally and not to a specific resource.

HTTP/1.1

HTTP version.

Headers

HOST

Multicast channel and port reserved for SSDP by Internet Assigned Numbers Authority (IANA). Is 239.255.255.250:1900.

CACHE-CONTROL max-age directive specifies number of seconds the advertisement is valid. After this duration, control points assume the device (or service) is no longer available. Specified by UPnP vendor. Integer.

LOCATION

Contains a URL to the UPnP description of the root device. In some unmanaged networks, host of this URL may contain an IP address (versus a domain name). Specified by UPnP vendor. Single URL.

NT

Notification Type. Is one of the following. Single URI.

upnp:rootdevice

Sent once for root device.

uuid:schemas-upnp-org:device:device-type:device-UUID

Specified by UPnP vendor. Sent once for each device, root or embedded.

urn:schemas-upnp-org:device:device-type

Defined by UPnP Forum working committee. Sent once for each device, root or embedded.

urn:schemas-upnp-org:service:service-type

Defined by UPnP Forum working committee. Sent once for each service.

NTS

Notification Sub Type. Is ssdp:alive. Single URI.

SERVER

Concatenation of OS name, OS version, UPnP/1.0, product name, and product version. Specified by UPnP vendor. String.

USN header defined by SSDP. Unique Service Name. Is one of the following. (cf. table above.) The prefix (before the double colon) matches the value of the UDN element in the device description. (The section on Description explains the UDN element.)

Single URI.

uuid:device-UUID::upnp:rootdevice

Sent once for root device.

uuid:device-UUID

Specified by UPnP vendor. Sent once for every device, root or embedded.

uuid:device-UUID::urn:schemas-upnp-org:device:device-Type:v

Sent once for every device, root or embedded.

uuid:device-UUID::urn:schemas-upnp-org:service:service-Type:v

Sent once for every service.

(No response for a request with method NOTIFY.)

1.1.3 Discovery: Advertisement: Device Unavailable—NOTIFY with ssdp:byebye

When a device and its services are going to be removed from the network, the device multicasts a ssdp:byebye message corresponding to each of the ssdp:alive messages it multicasted that have not already expired. If the device is removed abruptly from the network, it might not be possible to multicast a message. As a fallback, discovery messages include an expiration value in a CACHE-CONTROL header (as explained above); if not re-advertised, the discovery message eventually expires on its own and is removed from any control point cache.

(Note: when a control point is about to be removed from the network, no discovery-related action is required.)

When a device is about to be removed from the network, it explicitly revokes its discovery messages by sending one multicast request for each ssdp:alive message it sent. Each multicast request has method NOTIFY and ssdp:byebye in the NTS header in the following format. Values in italics are placeholders for actual values.

---

<SPAN class=gena>NOTIFY</SPAN> * HTTP/1.1
HOST: <SPAN class=ssdp>239.255.255.250</SPAN>:<SPAN class=ssdp>1900</SPAN>
<SPAN class=gena>NT</SPAN>: <SPAN class=vendor>search target</SPAN>
<SPAN class=gena>NTS</SPAN>: <SPAN class=ssdp>ssdp:byebye</SPAN>
<SPAN class=ssdp>USN</SPAN>: <SPAN class=vendor>advertisement UUID</SPAN>

---

(No body for request with method NOTIFY, but note that the message has a blank line following the last HTTP header.) The TTL for the IP packet defaults to 4 and is configurable.

Listed below are details for the request line and headers appearing in the listing above. All header values are case sensitive except where noted.

Request Line

NOTIFY

Method defined by GENA for sending notifications and events.

*

Request applies generally and not to a specific resource.

HTTP/1.1

HTTP version.

Headers

HOST

Multicast channel and port reserved for SSDP. Is 239.255.255.250:1900.

NT

Notification Type. Single URI.

NTS

Notification Sub Type. Is ssdp:byebye. Single URI.

USN

Unique Service Name. Single URI.

(No response for a request with method NOTIFY.)

Due to the unreliable nature of UDP, devices send each of the above messages more than once. As a fallback, if a control point fails to receive notification that a device or services is unavailable, the original discovery message will eventually expire yielding the same effect.

1.2 Discovery: Search

When a control point is added to the network, the UPnP discovery protocol allows that control point to search for devices of interest on the network. It does this by multicasting a search message with a pattern, or target, equal to a type or identifier for a device or service. Responses from devices contain discovery messages essentially identical to those advertised by newly connected devices; the former are unicast while the latter are multicast.

1.2.1 Discovery: Search Protocols and Standards

To search for devices (and be discovered by control points), control points (and devices) use the following subset of the overall UPnP protocol stack. (The overall UPnP protocol stack is listed at the beginning of this document.)

At the highest layer, search messages contain vendor-specific information, e.g., the control point, device, and service identifiers. Moving down the stack, vendor content is supplemented by information from a UPnP Forum working committee, e.g., device or service types. Messages from the layers above are hosted in UPnP-specific protocols, defined in this document. In turn, search requests are delivered via a multicast variant of HTTP that has been extended using Simple Service Discovery Protocol (SSDP) methods headers. Search responses are delivered via a unicast variant of HTTP that has also been extended with SSDP. (GENA is not involved when control points search for devices.) Both kinds of HTTP messages are delivered via UDP over IP. For reference, colors in [square brackets] above indicate which protocol defines specific headers and values in discovery messages listed below.

1.2.2 Discovery: Search: Request with M-SEARCH

When a control point is added to the network, it sends a multicast request with method M-SEARCH in the following format. Values in italics are placeholders for actual values.

M-SEARCH * HTTP/1.1
HOST: 239.255.255.250:1900
MAN: "ssdp:discover"
MX: seconds to delay response
S: uuid:control point UUID
ST: search target
(No body for request with method M-SEARCH.)

Listed below are details for the request line and headers appearing in the listing above. All header values are case sensitive except where noted.

Request Line

M-SEARCH
Method defined by SSDP for search requests.

*
Request applies generally and not to a specific resource.

HTTP/1.1
HTTP version.
Headers

HOST
Multicast channel and port reserved for SSDP. Is 239.255.255.250:1900.

MAN
Is "ssdp:discover".

MX
Maximum wait. Device responses are delayed a random duration between 0 and this many seconds to balance load for the control point when it processes responses. Specified by UPnP vendor. Integer.

S
Source identifier. Universally-unique identifier for the control point. Specified by UPnP vendor. Single URI.

ST
Search Target. Is one of the following. (cf. NT header in advertisement.) Single URI.

ssdp:all
Search for all devices and services.

upnp:rootdevice
Search for root devices only.

uuid:schemas-upnp-org:device:device-type:device-UUID
Specified by UPnP vendor. Search for a particular device.

urn:schemas-upnp-org:device:device-type
Defined by UPnP Forum working committee. Search for any device of this type.

urn:schemas-upnp-org:service:service-type
Defined by UPnP Forum working committee. Search for any service of this type.

1.2.3 Discovery: Search: Response

To be found, a device sends a response in the following format. (Compare to multicast request with method NOTIFY and ssdp:alive in the NTS header above.) Values in italics are placeholders for actual values.

HTTP/1.1 200 OK
CACHE-CONTROL: max-age=seconds until advertisement expires
DATE: When response was generated
EXT:
LOCATION: URL for UPnP description for root device
S: uuid:control point UUID
SERVER: OS/version, UPnP/1.0, product/version
ST: search target
USN: uuid:scbemas-upnp-org:device:device-type:UUID
(No body for a response to a request with method M-SEARCH.)

Listed below are details for the headers appearing in the listing above. All header values are case sensitive except where noted.

Headers

CACHE-CONTROL
max-age directive specifies number of seconds the advertisement is valid. After this duration, control points assume the device (or service) is no longer available. Specified by UPnP vendor. Integer.

DATE
When response was generated. RFC 1123 date.

EXT
Confirms that the MAN header was understood. (Header only; no value.)

LOCATION
Contains a URL to the UPnP description of the root device. Specified by UPnP vendor. Single URL.

S
Source identifier. Is the universally-unique identifier sent in the request. Specified by UPnP vendor. Single URI.

SERVER
Concatenation of OS name, OS version, UPnP/1.0, product name, and product version. Specified by UPnP vendor. String.

ST

Search Target. Single URI. If ST header in request was, ssdp:all

Respond 3+2d+s times for a root device with d embedded devices and s embedded services.

upnp:rootdevice

Respond once for root device.

uuid:schemas-upnp-org:device:device-type:device-UUID

Respond once for each device, root or embedded.

urn:schemas-upnp-org:device:device-type

Respond once for each device, root or embedded.

urn:schemas-upnp-org:service:service-type

Respond once for each service.

USN

Unique Service Name. Single URI.

(No UPnP-specific errors are defined for search messages.) Errors may be returned by layers in the protocol stack below UPnP. Consult documentation on those protocols for details.

2. Description

Description is Step 2 in UPnP networking. Description comes after discovery (Step 1) where control points find interesting device(s). And description enables control (Step 3) where a control points send commands to device(s), eventing (Step 4) where control points listen to state changes in device(s), and presentation (Step 5) where control points display a user interface for device(s).

After a control point has discovered a device, the control point still knows very little about the device—only the information that was in the discovery message, i.e., the device's (or service's) UPnP type, the device's universally-unique identifier, and a URL to the device's UPnP description. For the control point to learn more about the device and its capabilities, or to interact with the device, the control point retrieves the device's description from the URL provided by the device in the discovery message.

The UPnP description for a device includes vendor-specific, manufacturer information like the model name and number, serial number, manufacturer name, URLs to vendor-specific Web sites, etc. (details below). The description also includes a list of any embedded devices or services, as well as URLs for control, eventing, and presentation. This section explains embedded devices; the section on Control explains how services are described, and the sections on Control, Eventing, and Presentation explain how URLs for control, eventing, and presentation are used, respectively.

Note that a single physical device may include multiple logical devices. Multiple logical devices can be modeled as a single root device with embedded devices (and services) or as multiple root devices (perhaps with no embedded devices). In either case, there is one UPnP description for each root device, with embedded device descriptions as needed.

The UPnP description for a device is written by a UPnP vendor. The description is in XML syntax and is usually based on a standard UPnP Device Template. A UPnP Device Template is produced by a UPnP Forum working committee; they derive the template from the UPnP Template Language, which was derived from standard constructions in XML. This section explains the format for a UPnP device description, UPnP Device Templates, and the part of the UPnP Template Language that covers devices. (The section on Control explains the part of the UPnP Template Language that covers services.)

Retrieving the UPnP description for a device is simple: the control point issues an HTTP GET request on the URL in the discovery message, and the device returns the description document. The protocol stack, method, headers, and body for the response and request are explained in detail below.

UPnP vendors can differentiate their devices by extending services, including additional UPnP services, or embedding additional UPnP devices. When a control point retrieves a particular device's description, these added features are exposed to the control point for control, eventing, and presentation. (Other means for UPnP vendor differentiation are explained in the control section.)

The remainder of this section first explains how devices are described, explaining details of vendor-specific information, embedded devices, and URLs for control, eventing, and presentation. Then it explains UPnP Device Templates and the UPnP Template Language as it pertains to describing devices. Finally, it explains in detail how a control point retrieves a description from a device.

2.1 Description: Device Description

The UPnP description for a device contains several pieces of vendor-specific information, definitions of embedded devices and services, and URLs for control, eventing, and presentation of the device.

To illustrate these, below is a listing with placeholders (in italics) for actual elements and values. Some of these placeholders would be specified by a UPnP Forum working committee (colored red) or by a UPnP vendor (purple). (Elements defined by the UPnP Device Architecture are colored green for later reference.) Immediately following the listing is a detailed explanation of the elements, attributes, and values.

<?xml version="1.0"?>
<root xmlns="urn:schemas-upnp-org:device:1:0">
<specVersion>
<major>1</major>
<minor>0</minor>
</specVersion>
<URLBase>base URL for all relative URLs</URLBase>
<device>
<deviceType>urn:schemas-upnp-org:device:*device-type*</deviceType>
<friendlyName>*short user-friendly title*</friendlyName>
<modelDescription>*long user-friendly title*</modelDescription>
<modelName>*model name*</modelName>
<modelNumber>*model number*</modelNumber>
<modelURL>*URL to model site*</modelURL>
<manufacturer>*manufacturer name*</manufacturer>
<manufacturerURL>*URL to manufacturer site*</manufacturerURL>
<serialNumber>*manufacturer's serial number*</serialNumber>
<UDN>uuid:schemas-upnp-org:device:*device-type*:UUID</UDN>
<UPC>*Universal Product Code*</UPC>
<iconList>
<icon>
<mimetype>image/*format*</mimetype>
<width>*horizontal pixels*</width>
<height>*vertical pixels*</height>
<depth>*color depth*</depth>
<url>*URL to icon*</url>
</icon>
*XML to declare other icons, if any, go here*
</iconList>
<serviceList>
<service>
<serviceType>
urn:schemas-upnp-org:service:*service-type:service-version*
</serviceType>
<serviceId>*service ID*</serviceId>
<SCPDURL>*URL to service description*</SCPDURL>
<controlURL>*URL for control*</controlURL>
<eventSubURL>*URL for eventing*</eventSubURL>
</service>

-continued

*Declarations for other services defined by a UPnP Forum working committee (if any)*
go here
*Declarations for other services added by UPnP vendor (if any) go here*
</serviceList>
<deviceList>
*Description of embedded devices defined by a UPnP Forum working committee (if any)*
go here
*Description of embedded devices added by UPnP vendor (if any) go here*
</deviceList>
<presentationURL>*URL for presentation*</presentationURL>
</device>
</root>

Listed below are details for each of the elements, attributes, and values appearing in the listing above. All elements and attributes are case sensitive; HTTP specifies case sensitivity for URLs; other values are not case sensitive except where noted. The order of elements is insignificant.

xml
  Case sensitive.

root
  Has urn:schemas-upnp-org:device:1:0 as the value for the xmlns attribute; this references the UPnP Template Language (described below). Case sensitive. Contains all other elements describing the root device, i.e., contains the following sub elements:

specVersion
  Contains the following sub elements:

major
  Major version of the UPnP Device Architecture. Is 1.

minor
  Minor version of the UPnP Device Architecture. Is 0.

URLBase
  Defines the base URL. Used to construct fully-qualified URLs. All relative URLs that appear elsewhere in the description are appended to this base URL. If URLBase is empty or not given, the base URL is the value of the LOCATION header in the discovery message. Specified by UPnP vendor. Single URL.

device
  Contains the following sub elements:

deviceType
  UPnP device type.
  For standard devices defined by a UPnP Forum working committee, begins with urn:schemas-upnp-org:device: followed by a device type suffix (as shown in the listing above).
  For non-standard devices specified by UPnP vendors, begins with urn:, followed by a domain name owned by the vendor, followed by :device:, followed by a device type suffix, i.e., urn:domain-name:device:device-type.
  Single URI.

friendlyName
  Short description for end user. Is localized (cf. ACCEPT-LANGUAGE header). String. Is <64 characters.

manufacturer
  Manufacturer's name. Specified by UPnP vendor. String. Is <64 characters.

manufacturerURL
  Web site for Manufacturer. May be relative to base URL. Specified by UPnP vendor. Single URL.

modelDescription
  Long description for end user. Is localized (cf. ACCEPT-LANGUAGE header). Specified by UPnP vendor. String. Is <128 characters.

modelName
  Model name. Specified by UPnP vendor. String. Is <32 characters.

modelNumber
  Model number. Specified by UPnP vendor. String. Is <32 characters.

modelURL
  Web site for model. May be relative to base URL. Specified by UPnP vendor. Single URL.

presentationURL
  URL to presentation hosted by device (cf. section on Presentation). May be relative to base URL. Specified by UPnP vendor. Single URL.

serialNumber
  Serial number. Specified by UPnP vendor. String. Is <64 characters.

UDN
  Universal Device Name. Universally-unique identifier for the device, whether root or embedded.
    For standard devices defined by a UPnP Forum working committee, begins with uuid:schemas-upnp-org:device: followed by the device type, colon; UPnP vendor specifies UUID suffix (as shown in the listing above).
    For non-standard devices specified by UPnP vendors, begins with uuid:, followed by a domain name owned by the vendor, followed by :device:, followed by the device type, colon, followed by a UUID suffix, i.e., uuid:domain-name:device:device-type:UUID.
    Single URI.

UPC
  Universal Product Code. 12-digit, all-numeric code that identifies the consumer package. Managed by the Uniform Code Council. Single UPC.

iconList
  Contains the following sub elements:

icon
  Icon to depict device in a control point UI. Recommend one icon in each of the following sizes (width×height×depth): 16×16×1, 16×16×8, 32×32×1, 32×32×8, 48×48×1, 48×48×8. Contains the following sub elements:

mimetype
  Icon's MIME type (cf. RFC 2387). Single MIME image type.

width
  Horizontal dimension of icon in pixels. Integer.

height
  Vertical dimension of icon in pixels. Integer.

depth
  Number of color bits per pixel. Integer.

url
   Pointer to icon image. (XML does not support embedding of binary data. See note below.) Retrieved via HTTP. May be relative to base URL. Specified by UPnP vendor. Single URL.

serviceList
   Contains the following sub elements:

service
   Repeated once for each service defined by a UPnP Forum working committee. If UPnP vendor differentiates device by adding additional, standard UPnP services, repeated once for additional service. Contains the following sub elements:

controlURL
   URL for control (cf. section on Control). May be relative to base URL. Specified by UPnP vendor. Single URL.

eventSubURL
   URL for eventing (cf. section on Eventing). May be relative to base URL. Specified by UPnP vendor. Single URL.

SCPDURL
   URL for service description (nee Service Control Protocol Definition URL). (cf. section on Control.) May be relative to base URL. Specified by UPnP vendor. Single URL.

serviceId
   Service identifier. Is unique within this device description. <format TBD>. Defined by a UPnP Forum working committee. Single URI.

serviceType
   UPnP service type.
   For standard service types defined by a UPnP Forum working committee, begins with urn:schemas-upnp-org:service: followed by a service type suffix (as shown in the listing above).
   For non-standard service types specified by UPnP vendors, begins with urn:, followed by a domain name owned by the vendor, followed by :service:, followed by a service type suffix, i.e., urn:domain-name:service:service-type:service-version.

Single URI.

deviceList
   Contains the following sub elements:

device
   Repeat once for each embedded device defined by a UPnP Forum working committee. If UPnP vendor differentiates device by embedding additional UPnP devices, repeat once for each embedded device. Contains sub elements as defined above for root sub element device.
   For future extensibility, when processing XML like the listing above, devices and control points ignore any unknown elements and any sub elements or content as specified by the Flexible XML Processing Profile (FXPP).
   XML does not support directly embedding binary data, e.g., icons in UPnP descriptions. Binary data may be converted into text (and thereby embedded into XML) using an XML data type of either bin.base64 (a MIME-style base 64 encoding for binary data) or bin.hex (hexadecimal digits represent octets). Alternatively, the data can be passed indirectly, as it were, by embedding a URL in the XML and transferring the data in response to a separate HTTP request; the icon(s) in UPnP descriptions are transferred in this latter manner.

2.2 Description: UPnP Device Template

The listing above also illustrates the relationship between a UPnP device description and a UPnP Device Template. As explained above, the UPnP description for a device is written by a UPnP vendor, in XML, following a UPnP Device Template. A UPnP Device Template is produced by a UPnP Forum working committee as a means to standardize devices.

By appropriate specification of placeholders, the listing above can be either a UPnP Device Template or a UPnP device description. Recall that some placeholders would be defined by a UPnP Forum working committee (colored red), i.e., the UPnP device type identifier, UPnP services, and UPnP embedded devices (if any). If these were defined, the listing would be a UPnP Device Template, codifying the standard for this type of device. UPnP Device Templates are one of the key deliverables from UPnP Forum working committees.

Taking this another step further, the remaining placeholders in the listing above would be specified by a UPnP vendor (colored purple), i.e., vendor-specific information. If these placeholders were specified (as well as the others), the listing would be a UPnP device description, suitable to be delivered to a control point to enable control, eventing, and presentation.

Put another way, the UPnP Device Template defines the overall type of device, and each UPnP device description instantiates that template with vendor-specific information. The first is created by a UPnP Forum working committee; the latter, by a UPnP vendor.

2.3 Description: UPnP Template Language for Devices

The paragraphs above explain UPnP device descriptions and illustrate how one would be instantiated from a UPnP Device Template. As explained, UPnP Device Templates are produced by UPnP Forum working committees, and these templates are derived from the UPnP Template Language. This template language defines well-formed templates for devices and services. Below is a listing and explanation of this language as it pertains to devices. The section on Control explains the UPnP Template Language as it pertains to services.

The UPnP Template Language is written in XML syntax and is derived from XML Schema (Part 1: Structures, Part 2: Datatypes). XML Schema provides a set of XML constructions that express language concepts like required vs. optional elements, element nesting, and data types for values (as well as other properties not of interest here). The UPnP Template Language uses these XML Schema constructions to define elements like specVersion, URLBase, deviceType, et al listed in detail above. Because the UPnP Template Language is constructed using another, precise language, it is unambiguous. And because the UPnP Template Language, UPnP Device Templates, and UPnP device descriptions are all machine-readable, automated tools can automatically check to ensure the latter two have all required elements, are correctly nested, and have values of the correct data types.

Below is the UPnP Template Language for devices as defined by the UPnP Device Architecture herein. The elements it defines are used in UPnP Device Templates; they are colored green here, and they are colored green in the listing above. Below is where these elements are defined; above is where they are used.

Immediately following this is a brief explanation of the XML Schema elements, attributes, and values used. The reference to XML Schema at the end of the section has further details.

| UPnP Template Language for devices |
| --- |
| <?xml version="1.0" ?><br><Schema name="urn:schemas-upnp-org:device:1:0"<br>xmlns="urn:schemas-microsoft-com:xml-data"<br>xmlns:dt="urn:schemas-microsoft-com:datatypes"><br><ElementType name="root" content="eltOnly"><br><element type="specVersion" /><br><element type="URLBase" minOccurs="0" /><br><element type="device" /><br></ElementType><br><ElementType name="specVersion"><br><element type="major" /><br><element type="minor" /><br></ElementType><br><ElementType name="major" dt:type="int" /><br><ElementType name="minor" dt:type="int" /><br><ElementType name="URLBase" dt:type="uri" /><br><ElementType name="device" content="eltOnly"><br><element type="UDN" /><br><element type="friendlyName" /><br><element type="deviceType" /><br><element type="presentationURL" minOccurs="0" /><br><element type="manufacturer" /><br><element type="manufacturerURL" minOccurs="0" /><br><element type="modelName" /><br><element type="modelNumber" minOccurs="0" /><br><element type="modelDescription" minOccurs="0" /><br><element type="modelURL" minOccurs="0" /><br><element type="UPC" minOccurs="0" /><br><element type="serialNumber" minOccurs="0" /><br><element type="iconList" /><br><element type="serviceList" /><br><element type="deviceList" minOccurs="0" /><br></ElementType><br><ElementType name="UDN" dt:type="uri" /><br><ElementType name="friendlyName" dt:type="string" /><br><ElementType name="deviceType" dt:type="uri"/><br><ElementType name="presentationURL" dt:type="uri" /><br><ElementType name="manufacturer" dt:type="string" /><br><ElementType name="manufacturerURL" dt:type="uri" /><br><ElementType name="modelName" dt:type="string" /><br><ElementType name="modelNumber" dt:type="string" /><br><ElementType name="modelDescription" dt:type="string" /><br><ElementType name="modelURL" dt:type="uri" /><br><ElementType name="UPC" dt:type="string" /><br><ElementType name="serialNumber" dt:type="string" /><br><ElementType name="iconList" content="eltOnly"><br><element type="icon" maxOccurs="*" /><br></ElementType><br><ElementType name="icon" content="eltOnly"><br><element type="mimetype" /><br><element type="width" /><br><element type="height" /><br><element type="depth" /><br><element type="url" /><br></ElementType><br><ElementType name="mimetype" dt:type="string" /><br><ElementType name="width" dt:type="int" /><br><ElementType name="height" dt:type="int" /><br><ElementType name="depth" dt:type="int" /><br><ElementType name="url" dt:type="uri" /><br><ElementType name="deviceList" content="eltOnly"><br><element type="device" maxOccurs="*" /><br></ElementType><br><ElementType name="serviceList" content="eltOnly"><br><element type="service" maxOccurs="*" /><br></ElementType><br><ElementType name="service" content="eltOnly"><br><element type="serviceType" /><br><element type="serviceId" /><br><element type="controlURL" /><br><element type="eventSubURL" /><br><element type="SCPDURL" /><br></ElementType><br><ElementType name="serviceType" dt:type="uri" /><br><ElementType name="serviceId" dt:type="uri" /><br><ElementType name="controlURL" dt:type="uri" /><br><ElementType name="eventSubURL" dt:type="uri" /> |

-continued

| UPnP Template Language for devices |
| --- |
| <ElementType name="SCPDURL" dt:type="uri" /><br></Schema> |

ElementType

Defines an element in the new, derived language. name attribute defines element name. dt:type attribute defines the data type for the value of element in the new, derived language.

element

References an element for the purposes of declaring nesting. minOccurs attribute defines minimum number of times the element occurs; default is minOccurs=1; optional elements have minOccurs=0. maxOccurs attribute defines maximum number of times the element occurs; default is maxOccurs=1; elements that can appear one or more times have maxOccurs=*.

2.4 Description: Retrieving a Description

As explained above, after a control point has discovered a device, it still knows very little about the device. To learn more about the device and its capabilities, the control point retrieves the UPnP description for the device using the URL provided by the device in the discovery message. This is a simple HTTP-based process and uses the following subset of the overall UPnP protocol stack. (The overall UPnP protocol stack is listed at the beginning of this document.)

At the highest layer, description messages contain vendor-specific information, e.g., device type, service type, and services. Moving down the stack, vendor content is supplemented by information from a UPnP Forum working committee, e.g., model name, model number, and specific URLs. Messages from the layers above are hosted in UPnP-specific protocols, defined in this document. In turn, the above messages are delivered via HTTP over TCP over IP. For reference, colors in [square brackets] above indicate which protocol defines specific header and body elements in the description messages listed below.

Using this protocol stack, retrieving the UPnP description for a device is simple: the control point issues an HTTP GET request to the URL in the discovery message, and the device returns its description in the body of an HTTP response. The headers and body for the response and request are explained in detail below.

First, a control point sends a request with method GET in the following format. Values in italics are placeholders for actual values.

GET path to device description HTTP/1.1

HOST: host for device description port for device description

ACCEPT-LANGUAGE: language preferred by control point (No message body for request to retrieve a description.)

Listed below are details for the request line and headers appearing in the listing above. All header values are case sensitive except where noted.

Request Line

GET

Method defined by HTTP.

path to device description

Path component of device description URL (LOCATION header in discovery message). Single, relative URL.

HTTP/1.1
 HTTP version.
 Headers

HOST
 Domain name or IP address and optional port components of device description URL (LOCATION header in discovery message). If the port is empty or not given, port 80 is assumed.

ACCEPT-LANGUAGE
 Preferred language(s) for device description. If no description is available in this language, device may return a description in a default language. RFC 1766 language tag(s).

After a control point sends a request, the device takes the second step: a device sends a response in the following format. Values in italics are placeholders for actual values.
 HTTP/1.1 200 OK
 CONTENT-LENGTH: bytes in body
 CONTENT-TYPE: text/xml
 DATE: when responded
 SERVER: OS/version, UPnP/1.0, product/version The body of this response is a UPnP device description as explained in detail above.

Listed below are details for the headers appearing in the listing above. All header values are case sensitive except where noted.
 Headers CONTENT-LENGTH
 Length of body in bytes. Integer.

CONTENT-TYPE
 Is text/xml.

DATE
 When response was generated. RFC 1123 date.

SERVER
 Concatenation of OS name, slash, OS version, UPnP/1.0, product name, slash, and product version. String.

3. Control
 Control is Step 3 in UPnP networking. Control comes after discovery (Step 1) where control points find interesting device(s), and after description (Step 2) where control points learn about device capabilities. Control is intimately linked with eventing (Step 4) where control points listen to state changes in device(s). Through control, control points send actions to devices and poll for values. Control and eventing are complementary to presentation (Step 5) where control points display a user interface provided by device(s).

After a control point has (1) discovered a device and (2) retrieved a description of the device, the control point has the bare essentials for device control. To learn more about the service, a control point retrieves a detailed UPnP description for each service.

A UPnP description for a service includes a list of the commands, or actions, the service responds to, and parameters, or arguments, for each action. A service description also includes a list of variables. These variables model the state of the service at run time, and are described in terms of their data type, range, and event characteristics. This section explains the description of actions, arguments, state variables, and properties of those variables. The section on Eventing explains event characteristics.

Like the UPnP description for a device, the UPnP description for a service is written by a UPnP vendor. The description is in XML syntax and is based on a standard UPnP Service Template. A UPnP Service Template is produced by a UPnP Forum working committee; they derive the template from the UPnP Template Language, augmenting it with human language where necessary. As explained above, the UPnP Template Language is derived from standard constructions in XML. This section explains the format for a UPnP service description, UPnP Service Templates, typical augmentations in human language, and the part of the UPnP Template Language that covers services. (The section on Description explains the part of the UPnP Template Language that covers devices.)

To control a device, a control point requests a device's service to perform an action. To do this, a control point sends a suitable control message to the control URL for the service (provided in the device description). In response, the service provides a simple acknowledgement; unlike function calls, no service-specific value is returned. The effects of the action, if any, are modeled by changes in the variables that describe the run-time state of the service. When these state variables change, events are published to all interested control points. This section explains the protocol stack for, and format of, control messages. The section on Eventing explains event publication.

To prevent a race condition between events headed for control points and requested actions headed for a service, control messages may include a key. With each new event message a service generates, the service increments the key, and includes that key in the event message. When a control point sends a control message, it may choose to include a key. If a control message includes a key, the service checks to see if the key is current, i.e., if no events have been sent since this key was issued. If the key is current (or if there was no key in the control message), then the service acknowledges the action request. If the key is not current, the service fails the action request. This section briefly explains the event key. The section on Eventing explains in detail event messages and event publication.

To determine the current value of a state variable, a control point may poll the service. Similar to requesting an action, a control point sends a suitable query message to the control URL for the service. In response, the service provides the value of the variable. This section also explains the format of these query messages. The section on eventing explains automatic notification of variable values.

The remainder of this section first explains how services are described, explaining details of actions, arguments, state variables, and properties of those variables. Second, it explains UPnP Service Templates, typical ways to augment service descriptions with human language, and the UPnP Template Language as it pertains to services. Third, it explains how a control point retrieves a service description. Finally, this section explains in detail how control and query messages are formatted and sent to devices.

3.1 Control: Service Description
 The UPnP description for a service defines actions and their arguments, and state variables and their data type, range, and event characteristics.

Each action may have zero or more arguments. Each argument corresponds to a state variable. This direct-manipulation programming model reinforces simplicity.

To illustrate these points, below is a listing with placeholders (in italics) for actual elements and values. For a standard UPnP service, some of these placeholders would be defined by a UPnP Forum working committee (colored red) or specified by a UPnP vendor (purple). For a vendor-unique service, all of these placeholders would be specified by a UPnP vendor. (Elements defined by the UPnP Device Architecture are colored green for later reference.) Immediately following the listing is a detailed explanation of the elements, attributes, and values.

```
<?xml version="1.0"?>
<scpd xmlns="urn:schemas-upnp-org:service:1:0">
<actionList>
<action>
<name>action name</name>
<argumentList>
<argument>
<name>formal parameter name</name>
<relatedStateVariable>state variable name</relatedStateVariable>
</argument>
Declarations for other arguments defined by UPnP Forum working
committee (if any)
go here
</argumentList>
</action>
Declarations for other actions defined by UPnP Forum working committee
(if any)
go here
Declarations for other actions added by UPnP vendor (if any) go here
</actionList>
<serviceStateTable>
<stateVariable>
<name>variable name</name>
<dataType>variable data type</dataType>
<defaultValue>default value</defaultValue>
<allowedValueRange>
<minimum>minimum value</minimum>
<maximum>maximum value</maximum>
<step>increment value</step>
</allowedValueRange>
</stateVariable>
Declarations for other state variables defined by UPnP Forum working
committee
(if any) go here
Declarations for other state variables added by UPnP vendor (if any)
go here
</serviceStateTable>
</scpd>
```

Listed below are details for each of the elements, attributes, and values appearing in the listing above. All elements and attributes are case sensitive; values are not case sensitive except where noted. Except where noted, the order of elements is insignificant.

xml
 Case sensitive.

scpd
 Has urn:schemas-upnp-org:service:1:0 as the value for the xmlns attribute; this references the UPnP Template Language (explained below). Case sensitive. Contains all other elements describing the service, i.e., contains the following sub elements:

actionList
 Contains the following sub elements:

action
 Contains the following sub elements:

name
 Name of action. String. Is <32 characters.

argumentList
 Repeat once for each parameter. Contains the following sub elements:

argument
 Contains the following sub elements:

name
 Name of formal parameter. Is name of a state variable that models an effect the action causes. String. Is <32 characters.

relatedStateVariable
 Is the name of a state variable.

serviceStateTable
 Contains the following sub elements:

stateVariable
 If UPnP vendor differentiates service by adding additional state variables, required for each additional variable. sendEvents attribute defines whether event messages will be generated when the value of this state variable changes; non-evented state variables have sendEvents=no; default is sendEvents=yes. Contains the following sub elements:

name
 Name of state variable. Defined by a UPnP Forum working committee for standard state variables; specified by UPnP vendor for extensions. String. Is <32 characters.

dataType
 Defined by a UPnP Forum working committee for standard state variables; specified by UPnP vendor for extensions. Is one of the following values:

i4
 Fixed point, integer number. May have a leading sign. May have leading zeros. (No currency symbol.) (No grouping of digits to the left of the decimal, e.g., no commas.) Is between −2147483648 and 2147483647, i.e., 4 byte, long integer. (Same as i4 data type defined by XML Schema, Part 2: Datatypes.)

r8
 Floating point number. Mantissa (left of the decimal) and/or exponent may have a leading sign. Mantissa and/or exponent may have leading zeros. Decimal character in mantissa is a period, i.e., whole digits in mantissa separated from fractional digits by period. Mantissa separated from exponent by E. (No currency symbol.) (No grouping of digits in the mantissa, e.g., no commas.) Is between −1.79769313486232E308 and −4.94065645841247E-324 for negative values, and between 4.94065645841247E-324 and 1.79769313486232E308 for positive values, i.e., IEEE 64-bit (8-byte) double. (Same as r8 data type defined by XML Schema, Part 2: Datatypes).

string
 Unicode string. (Same as string data type defined by XML.)

dateTime
 Date and Time in ISO 8601 format (Same as dateTime data type defined by XML Schema, Part 2: Datatypes.)

boolean
 0, false, or no for false; 1, true, or yes for true. (Same as boolean data type defined by XML Schema, Part 2: Datatypes.)

bin.hex or bin.bin64
 Hexadecimal representation of binary data. (Same as bin.base64 and bin.hex data types defined by XML Schema, Part 2: Datatypes.)

defaultValue
 Expected, initial value. Defined by a UPnP Forum working committee or delegated to UPnP vendor. Matches data type. Satisfies allowedValueList or allowedValueRange constraints.

allowedValueList

Enumerates legal string values. Prohibited for data types other than string. At most one of allowedValueRange and allowedValueList may be specified. Sub elements are ordered (e.g., see NEXT_STRING_BOUNDED). Contains the following sub elements:

allowedValue

A legal value for a string variable. Defined by a UPnP Forum working committee for standard state variables; specified by UPnP vendor for extensions. String. Is <32 characters.

allowedValueRange

Defines bounds for legal numeric values; defines resolution for numeric values. Prohibited for data types other than i4 and r8. At most one of allowedValueRange and allowedValueList may be specified. At least one of the following sub elements is included. Contains the following sub elements:

minimum

Inclusive lower bound. Defined by a UPnP Forum working committee or delegated to UPnP vendor. Single i4 or r8.

maximum

Inclusive upper bound. Defined by a UPnP Forum working committee or delegated to UPnP vendor. Single i4 or r8.

step

Size of an increment operation, i.e., value of s in the operation v=v+s. Defined by a UPnP Forum working committee or delegated to UPnP vendor. Single i4 or r8.

For future extensibility, when processing XML like the listing above, devices and control points ignores any unknown elements and any sub elements or content as specified by the Flexible XML Processing Profile (FXPP).

Note that it is logically possible for a service to have no actions but have state variables and eventing; such a service would be an autonomous information source. Conversely, it is also logically possible for a service to have no state variables (and no eventing) but have actions; such a service might be stateless and cause short-term environmental effects.

Services standardized by UPnP Forum working committees are versioned. Every later version of a service is a superset of the previous version, i.e., it includes all actions and state variables exactly as they are defined by earlier versions of the service. The UPnP service type remains the same across all versions of a service whereas the service version is larger for later versions.

3.2 Control: UPnP Service Template

The listing above also illustrates the relationship between a UPnP service description and a UPnP Service Template. As explained above, the UPnP description for a service is written by a UPnP vendor, in XML, following a UPnP Service Template. A UPnP Service Template is produced by a UPnP Forum working committee as a means to standardize devices.

By appropriate specification of placeholders, the listing above can be either a UPnP Service Template or a UPnP service description. Recall that some placeholders would be defined by a UPnP Forum working committee (colored red), i.e., actions and their parameters, and states and their data type, range, and event characteristics. If these were specified, the listing above would be a UPnP Service Template, codifying the standard for this type of service. Along with UPnP Device Templates (cf. section on Description), UPnP Service Templates are one of the key deliverables from UPnP Forum working committees.

Taking this another step further, the remaining placeholders in the listing above would be specified by a UPnP vendor (colored purple), i.e., additional, vendor-specified actions and state variables. If these placeholders were specified (as well as the others), the listing would be a UPnP service description, suitable for effective control of the service within a device.

Put another way, the UPnP Service Template defines the overall type of service, and each UPnP service description instantiates that template with vendor-specific additions. The first is created by a UPnP Forum working committee; the latter, by a UPnP vendor.

3.3 Control: UPnP Template Language for Services

The paragraphs above explain UPnP service descriptions and illustrate how one would be instantiated from a UPnP Service Template. Like UPnP Device Templates, UPnP Service Templates are produced by UPnP Forum working committees, and these templates are derived from the UPnP Template Language. This template language defines well-formed templates for devices and services. The section on Description explains the UPnP Template Language as it pertains to devices. As explained in the section on Description, the UPnP Template Language is written in XML syntax and is derived from XML Schema (Part 1: Structures, Part 2: Datatypes). Below is a listing of this language as it pertains to services. The elements it defines are used in UPnP Service Templates; they are colored green here, and they are colored green in the listing above. Below is where these elements are defined; above is where they are used.

Immediately following this is a brief explanation of the XML Schema elements, attributes, and values used. The reference to XML Schema at the end of the section has further details.

| UPnP Template Language for services |
|---|

```
<?xml version="1.0"?>
<Schema name="urn:schemas-upnp-org:service:1:0"
xmlns="urn:schemas-microsoft-com:xml-data"
xmlns:dt="urn:schemas-microsoft-com:datatypes">
<ElementType name="name" content="textOnly" dt:type="string" />
<ElementType name="defaultValue" content="textOnly" dt:type=
"string" />
<ElementType name="minimum" content="textOnly" dt:type=
"number" />
<ElementType name="maximum" content="textOnly" dt:type=
"number" />
<ElementType name="step" content="textOnly" dt:type="number" />
<ElementType name="allowedValueRange" content="eltOnly" model=
"closed">
<element type="minimum" />
<element type="maximum" />
<element type="step" minOccurs="0" />
</ElementType>
<ElementType name="allowedValue" content="textOnly" />
<ElementType name="allowedValueList" content="eltOnly" model=
"closed">
<element type="allowedValue" minOccurs="1" maxOccurs="*" />
</ElementType>
<ElementType name="dataType" content="textOnly" dt:type="string" />
<ElementType name="stateVariable" content="eltOnly" model="closed">
<element type="name" />
<element type="dataType" />
<element type="defaultValue" minOccurs="0" maxOccurs="1" />
<group minOccurs="0" maxOccurs="1" order="one">
<element type="allowedValueList" />
<element type="allowedValueRange" />
</group>
<AttributeType name="sendEvents" />
<attribute default="yes" type="sendEvents" required="no" />
</ElementType>
<ElementType name="serviceStateTable" content="eltOnly" model=
"closed">
<element type="stateVariable" minOccurs="1" maxOccurs="*" />
```

-continued

UPnP Template Language for services

```
</ElementType>
<ElementType name="relatedStateVariable" content="textOnly" dt:type="string"
/>
<ElementType name="argument" content="eltOnly" model="closed">
<element type="name" />
<element type="relatedStateVariable" />
</ElementType>
<ElementType name="argumentList" content="eltOnly" model="closed">
<element type="argument" minOccurs="1" maxOccurs="*" />
</ElementType>
<ElementType name="action" content="eltOnly" model="closed">
<element type="name" />
<element type="argumentList" minOccurs="0" maxOccurs="*" />
</ElementType>
<ElementType name="actionList" content="eltOnly" model="closed">
<element type="action" minOccurs="0" maxOccurs="*" />
</ElementType>
<ElementType name="scpd" content="eltOnly" model="closed">
<element type="serviceStateTable" />
<element type="actionList" />
</ElementType>
</Schema>
``` attribute

References an attribute in the new, derived language for the purposes of declaring in which elements it may appear. Like any XML element, the AttributeType element may have attributes of its own. Using the required attribute within this element indicates whether the attribute is present; optional attributes have required=no.

AttributeType

Defines an attribute in the new, derived language. Like any XML element, the AttributeType element may have attributes of its own. Using the name attribute within this element defines the name of the attribute as it will be used in the derived language.

element

References an element for the purposes of declaring nesting. minOccurs attribute defines minimum number of times the element occurs; default is minOccurs=1; optional elements have minOccurs=0. maxOccurs attribute defines maximum number of times the element occurs; default is maxOccurs=1; elements that can appear one or more times have maxOccurs=*.

ElementType

Defines an element in the new, derived language. name attribute defines element name. dt:type attribute defines the data type for the value of element in the new, derived language. model attribute indicates whether elements in the new, derived language can contain elements not explicitly specified here; when only previously specific elements may be used, model=closed. content attribute indicates what content may contain; elements that contain only other elements have content=eltOnly; elements that contain only strings have content=textOnly.

group

Organizes content into a group to specify a sequence. minOccurs attribute defines minimum number of times the group occurs. maxOccurs attribute defines maximum number of times the group occurs. order attribute constrains the sequence of elements; when at most one element is allowed, order=one.

3.4 Control: Augmenting the UPnP Template Language

As is the case with describing devices, some properties of services are difficult to capture in the XML Schema formalism. For services in particular, it is useful to describe the effect actions have on state variables. This procedural information is awkward to describe in a declarative language like XML, so below is a recommended vocabulary for UPnP Forum working committees to use when defining service actions or for UPnP vendors to use when they wish to document the effects of extra actions.

ASSIGN (v, a)

Variable v becomes the value of argument a, i.e., v=a. v and a is the same data type. <why both this and SET?>

DECREMENT (v)

Equivalent to INCREMENT (v) with allowedValueRange step treated as −step.

DECREMENT_BOUNDED (v)

Equivalent to INCREMENT_BOUNDED (v) with allowedValueRange step treated as −step.

DECREMENT_WRAP (v)

Equivalent to INCREMENT_WRAP (v) with allowedValueRange step treated as −step.

INCREMENT (v)

Variable v becomes the value of v plus allowedValueRange step, i.e., v=v+step. Equivalent to DECREMENT (v) with allowedValueRange step treated as −step. v is either i4 or r8 and has an allowedValueRange definition.

INCREMENT_BOUNDED (v)

Variable v becomes the value of v plus allowedValueRange step, i.e., v=v+step.

If step is greater than 0 and if v plus step would be greater than allowedValueRange maximum, then v becomes maximum.

If step is less than 0 and if v plus step would be less than allowedValueRange minimum, then v becomes minimum.

Equivalent to DECREMENT_BOUNDED (v) with allowedValueRange step treated as −step. v is either i4 or r8 and has an allowedValueRange definition.

INCREMENT_WRAP (v, c)

Variable v becomes the value of v plus allowedValueRange step, i.e., v=v+step.

If step is greater than 0, and if v plus step would be greater than allowedValueRange maximum, then v becomes minimum plus step minus 1, i.e., v=minimum+step −1; if step is 1, this simplifies to v=minimum.

If step is less than 0 and if v plus step would be less than allowedValueRange minimum, then v becomes maximum plus step plus 1, i.e., v=maximum+step+1; if step is −1, this simplifies to v=maximum.

Equivalent to DECREMENT_WRAP (v) with allowedValueRange step treated as −step. v is either i4 or r8 and has an allowedValueRange definition.

NEXT_STRING_BOUNDED (v)

Variable v becomes the next allowedValue after the current value of v. If v was already the last allowedValue, then v does not change. v is a string data type and has an allowedValueList definition.

NEXT_STRING_WRAP (v)

Variable v becomes the next allowedValue after the current value of v. If v was already the last allowedValue, then v becomes the first allowedValue. v is a string data type and has an allowedValueList definition.

PREV_STRING_BOUNDED (v)

Variable v becomes the previous allowedValue before the current value of v. If v was already the first allowedValue, then v does not change. v is a string data type and has an allowedValueList definition.

PREV_STRING_WRAP (v)

Variable v becomes the previous allowedValue before the current value of v. If v was already the first allowedValue, then v becomes the last allowedValue. v is a string data type and has an allowedValueList definition.

SET (v, c)

Variable v becomes the value of constant c, i.e., v=c. v and c is the same data type.

TOGGLE (v)

Variable v becomes the boolean negation of the value of v, i.e., v=NOT v. v is boolean.

3.5 Control: Retrieving a Service Description

As explained above, after a control point has discovered a device and has retrieved a device description, it may need to learn more about the services provided by the device. Nearly identical to the process for retrieving a device description, a control point may retrieve a service description using a description URL in the description (vs. discovery) message. (For details on retrieving a service description, please consult the corresponding discussion on retrieving a device description in the section on Description.)

3.6 Control: Sending an Action

To send actions and receive confirmation, control points (and devices) use the following subset of the overall UPnP protocol stack. (The overall UPnP protocol stack is listed at the beginning of this document.)

At the highest layer, control and query messages contain vendor-specific information, e.g., URL for control and argument values. Moving down the stack, vendor content is supplemented by information from a UPnP Forum working committee, e.g., service types, action names, argument names. Messages from the layers above are hosted in UPnP-specific protocols, defined in this document. In turn, the above messages are formatted using a Simple Object Access Protocol (SOAP) header and body elements, and the messages are delivered via HTTP over TCP over IP. For reference, colors in [square brackets] above indicate which protocol defines specific header elements in the subscription messages listed below.

3.6.1 Control: Messages: Request

The Simple Object Access Protocol (SOAP) defines the use of XML and HTTP for remote procedure calls. UPnP uses SOAP to deliver control messages to devices and return acknowledgement or failure codes back to control points.

SOAP defines additional HTTP headers, and to ensure that these are not confused with other HTTP extensions, SOAP follows the HTTP Extension Framework and specifies a SOAP-unique URI in the MAN header and prefixes the HTTP method with M-. In this case, the method is M-POST. Using M-POST requires the HTTP server to find and understand the SOAP-unique URI and SOAP-specific headers.

To provide firewalls and proxies greater administrative flexibility, SOAP specifies that requests first be attempted without the MAN header or M-prefix. If the request is rejected with a response of "405 Method Not Allowed", then a second request is sent using the MAN header and M-prefix. If that request is rejected with a response of "501 Not Implemented" or "510 Not Extended", the request fails. (Other HTTP responses is processed according to the HTTP specification.)

Below is a listing of a control message sent using the POST method (without the MAN header) followed by an explanation of the headers and body. This is immediately followed by a listing of a control message sent using the M-POST method and MAN header.

As explained above, a control message may include an key to indicate whether the control point has received the most recent message. To include a key, the body of a control message includes two SOAP headers, one for the event subscription UUID, and one for the key itself. Both are illustrated in the listings below. The section on Eventing explains the contents of the two headers in detail.

To send a requested action to a device, a control point sends a request with method POST in the following format. Values in italics are placeholders for actual values.

```
POST path of control URL HTTP/1.1
HOST: host of control URL:port of control URL
CONTENT-LENGTH: bytes in body
CONTENT-TYPE: text/xml
SOAPMETHODNAME: urn:schemas-upnp-
org:service:serviceType:serviceVersion#actionName
<SOAP:Envelope xmlns:SOAP="urn:schemas-xmlsoap-org:soap.v1">
<SOAP:Header>
<s:SID xmlns:s="urn:schemas-upnp-org:control:1:0">subscriber
UUID</s:SID>
<s:SequenceNumber>last event number</s:SequenceNumber>
</SOAP:Header>
<SOAP:Body>
<m:actionName xmlns:m="urn:schemas-upnp-
org:service:serviceType:serviceVersion">
<argumentName>argument value</argumentName>
</m:actionName>
</SOAP:Body>
</SOAP:Envelope>
```

Listed below are details for the request line, headers, and body elements appearing in the listing above. All header values and element names are case sensitive; values are not case sensitive except where noted. Except where noted, the order of elements is insignificant.

Request Line

POST

Method defined by HTTP.

path control URL

Path component of URL for control for this service (controlURL sub element of service element of device description). Single, relative URL.

HTTP/1.1

HTTP version.

Headers

HOST

Domain name or IP address and optional port components of URL for control for this service (controlURL sub element of service element of device description). If the port is empty or not given, port 80 is assumed.

ACCEPT-LANGUAGE (No ACCEPT-LANGUAGE header is used in control messages.)

CONTENT-LENGTH

Length of body in bytes. Integer.

CONTENT-TYPE
   Is text/xlm.

MAN
   (No MAN header in request with method POST.)

SOAPMETHODNAME
   Starts with urn:schemas-upnp-org:service:, followed by UPnP standard service type, colon, service version, hash mark, and name of action to be invoked. If used in a request with method M-POST, header name is qualified with name space defined in MAN header. Single URI.
   Body SOAP:Envelope
   xmlns namespace attribute is "urn:schemas-xmlsoap-org:soap.v1". All SOAP-defined elements is qualified with this namespace. Contains the following sub elements:

SOAP:Header
   Is qualified with SOAP namespace. Contains the following sub elements:

SID
   Subscription Identifier. Unique identifier for this event subscription. (cf. section on Eventing.) xmlns namespace attribute is urn:schemas-upnp-org:control:1:0. Single URI.

SequenceNumber
   Most recent event key received by control point from service. (cf. section on Eventing.) Is qualified with SID namespace. Single integer.

SOAP:Body
   Is qualified with SOAP namespace. Contains the following sub element:

actionName
   Name of element is name of action control point is requesting service to perform. xmlns namespace attribute starts with urn:schemas-upnp-org:service:, followed by UPnP standard service type, colon, and service version. Contains the following, ordered sub element(s):

argumentName
   Repeat once for each argument. Value to be passed to action. (Element name not qualified by a namespace; element nesting context is sufficient.) Single data type as defined by UPnP Service Template.
   If a request with POST is rejected with a response of "405 Method Not Allowed", then a control point sends a second request with method M-POST and MAN in the following format. Values in italics are placeholders for actual values.
   M-POST path of control URL HTTP/1.1
   HOST: host of control URL:port of control URL
   CONTENT-LENGTH: bytes in body
   CONTENT-TYPE: text/xml
   MAN: "urn:schemas-xmlsoap-org:soap.v1"; ns=01
   01-SOAPMETHODNAME: urn:schemas-upnp-org:service:serviceType:service Version#actionName
   (Message body for request with method M-POST is the same as body for request with method POST. See above.)
   Request Line M-POST
   Method defined by HTTP Extension Framework.

path of control URL
   Path component of URL for control for this service (controlURL sub element of service element of device description). Single, relative URL.

HTTP/1.1
   HTTP version.
   Headers

HOST
   Domain name or IP address and optional port components of URL for control for this service (controlURL sub element of service element of device description). If the port is empty or not given, port 80 is assumed.

ACCEPT-LANGUAGE
   (No ACCEPT-LANGUAGE header is used in control messages.)

CONTENT-LENGTH
   Length of body in bytes. Integer.

CONTENT-TYPE
   Is text/xlm.

MAN
   Is "urn:schemas-xmlsoap-org:soap.v1". ns directive defines namespace (e.g., 01) for other SOAP headers (e.g., SOAPMETHODNAME).

SOAPMETHODNAME
   Starts with urn:schemas-upnp-org:service:, followed by UPnP standard service type, colon, service version, hash mark, and name of action to be invoked. If used in a request with method M-POST, header name is qualified with name space defined in MAN header. Single URI.

3.6.2 Control: Messages: Response
   If a service accepts an action request from a control point, the service sends a response in the following format. Values in italics are placeholders for actual values.

```
HTTP/1.1 200 OK
CONTENT-LENGTH: bytes in body
CONTENT-TYPE: text/xml
DATE: when response was generated
EXT:
SERVER: OS / version, UPnP / 1.0, product / version
<SOAP:Envelope xmlns:SOAP="urn:schemas-xmlsoap-org:soap.v1">
<SOAP:Body>
<m:actionNameResponse xmlns:m="urn:schemas-upnp-
org:service:sType:sVers">
<return>return code</return>
</m:actionNameResponse>
</SOAP:Body>
</SOAP:Envelope>
```

Listed below are details for each of the headers and body elements appearing in the listing above. All header values and element names are case sensitive; values are not case sensitive except where noted. Except where noted, the order of elements is insignificant.
   Headers ACCEPT-LANGUAGE
   (No ACCEPT-LANGUAGE header is used in control messages.)

CONTENT-LENGTH
   Length of body in bytes. Integer.

CONTENT-TYPE
   Is text/xlm.

DATE
   When response was generated. RFC 1123 date.

EXT
Confirms that the MAN header was understood. (Header only; no value.)

SERVER
Concatenation of OS name, forward slash, OS version, comma, UPnP/1.0, comma, product name, forward slash, and product version. String.

Body

SOAP:Envelope
xmlns namespace attribute is "urn:schemas-xmlsoap-org:soap.v1". All SOAP-defined elements is qualified with this namespace. Contains the following sub elements:

SOAP:Header
(No SOAP:Header element in response to control message.)

SOAP:Body
Is qualified with SOAP namespace. Contains the following sub element:

actionNameResponse
Name of element is action name prepended to Response. xmlns namespace attribute starts with urn:schemas-upnp-org:service:, followed by UPnP standard service type, colon, and service version. Contains the following sub element:

return
(Element name not qualified by a namespace; element nesting context is sufficient.) Has one of the following values:

0
Service accepts action request and will attempt to perform it. Legal only from services without eventing.

1
Event key is valid. Service accepts action request and will attempt to perform it.
Legal only from services with eventing.
If the service does not accept an action request from a control point, the service sends a response in the following format. Values in italics are placeholders for actual values.

```
HTTP/1.1 200 OK
CONTENT-LENGTH: bytes in body
CONTENT-TYPE: text/xml
DATE: when response was generated
EXT:
SERVER: OS / version, UPnP / 1.0, product / version
<SOAP:Envelope xmlns:SOAP="urn:schemas-xmlsoap-org:soap.v1">
<SOAP:Body>
<SOAP:fault>
<faultcode>code for request error</faultcode>
<faultstring>string describing request error</faultstring>
<runcode>did request get to device?</runcode>
</SOAP:fault>
</SOAP:Body>
</SOAP:Envelope>
```

(Headers for a response when a service does not accept an action request are the same as headers for a response when a service does. See above.)

Body

SOAP:Envelope
xmlns namespace attribute is "urn:schemas-xmlsoap-org:soap.v1". All SOAP-defined elements is qualified with this namespace. Contains the following sub elements:

SOAP:Header
(No Header element in response to control message.)

SOAP:Body
Is qualified with SOAP namespace. Contains the following sub element:

SOAP:fault
Why the service did not accept the action request. Contains the following sub elements:

faultcode
Code identifying why service did not accept the action request. Has one of the following values:

301
Invalid action name, i.e., no action by that name at this service.

302
Invalid arguments. Could be any of the following: not enough arguments, too many arguments, no argument by that name, one or more arguments are of the wrong data type.

303
Out of synchronization. Action request accompanied by invalid event key.

401
Action request failed. May be returned if current state of service prevents performing action. (No guarantee that service will return a fault in such situations.)

faultstring
Short description for end user. Defined by a UPnP Forum working committee or delegated to UPnP vendor. String. Recommend<256 characters.

runcode
Whether or not the request reached the service. Could be relevant if another system is operating as a proxy, bridge, or gateway for device and it's services. Is one of the following values:

0
  Maybe
1
  No
2
  Yes 3.7 Control: Query for Variable
In addition to sending requested actions to a service, control points may also poll the service for the value of a state variable by sending a query message. A query message may query only one state variable; multiple query messages is sent to query multiple state variables.

3.7.1 Control: Messages: Query
To query for the value of a state variable, a control point sends a request in the following format. Values in italics are placeholders for actual values.

```
POST path of control URL HTTP/1.1
HOST: host of control URL:port of control URL
CONTENT-LENGTH: bytes in body
CONTENT-TYPE: text/xml
SOAPMETHODNAME:
urn:schemas-upnp-org:control:1:0#QueryStateVariable
<SOAP:Envelope xmlns:SOAP="urn:schemas-xmlsoap-org:soap.v1">
<SOAP:Body>
<m:QueryStateVariable xmlns:m="urn:schemas-upnp-org:control:1:0">
<m:varName>variableName</m:varName>
```

```
</m:QueryStateVariable>
</SOAP:Body>
</SOAP:Envelope>
```

Listed below are details for the request line, headers, and body elements appearing in the listing above. All header values and element names are case sensitive; values are not case sensitive except where noted. Except where noted, the order of elements is insignificant.

Request Line

POST
Method defined by HTTP.

path of control URL
Path component of URL for control for this service (controlURL sub element of service element of device description). Single, relative URL.

HTTP/1.1
HTTP version.

Headers

HOST
Domain name or IP address and optional port components of URL for control for this service (controlURL sub element of service element of device description). If the port is empty or not given, port 80 is assumed.

ACCEPT-LANGUAGE
(No ACCEPT-LANGUAGE header is used in control messages.)

CONTENT-LENGTH
Length of body in bytes. Integer.

CONTENT-TYPE
Is text/xlm.

MAN
(No MAN header in request with method POST.)

SOAPMETHODNAME
Is urn:schemas-upnp-org:control:1:0#QueryStateVariable. If used in a request with method M-POST, header name is qualified with name space defined in MAN header. Single URI.

Body

SOAP:Envelope
xmlns namespace attribute is "urn:schemas-xmlsoap-org:soap.v1". All SOAP-defined elements is qualified with this namespace. Contains the following sub elements:

SOAP:Header
(No SOAP:Header is used to query the value of a variable.)

SOAP:Body
Is qualified with SOAP namespace. Contains the following sub element:

QueryStateVariable
Action name. xmlns namespace attribute is urn:schemas-upnp-org:control:1:0. Contains the following, ordered sub element(s):

varName
Variable name. Is qualified by QueryStateVariable namespace. Values is name of state variable to be queried. String.

If a request with POST is rejected with a response of "405 Method Not Allowed", then a control point sends a second request with method M-POST and MAN as explained above.

3.7.2 Control: Messages: Response

To answer a query for the value of a state variable, the service sends a response in the following format. Values in italics are placeholders for actual values.

```
HTTP/1.1 200 OK
CONTENT-LENGTH: bytes in body
CONTENT-TYPE: text/xml
DATE: when response was generated
EXT:
SERVER: OS / version, UPnP / 1.0, product / version
<SOAP:Envelope xmlns:SOAP="urn:schemas-xmlsoap-org:soap.v1">
<SOAP:Body>
<m:QueryStateVariableResponse
xmlns:m="urn:schemas-upnp-org:control:1:0">
<return>variable value</return>
</m:QueryStateVariableResponse>
</SOAP:Body>
</SOAP:Envelope>
```

Listed below are details for each of the headers and body elements appearing in the listing above. All header values and element names are case sensitive; values are not case sensitive except where noted. Except where noted, the order of elements is insignificant.

Headers

ACCEPT-LANGUAGE
(No ACCEPT-LANGUAGE header is used in control messages.)

CONTENT-LENGTH
Length of body in bytes. Integer.

CONTENT-TYPE
Is text/xlm.

DATE
When response was generated. RFC 1123 date.

EXT
Confirms that the MAN header was understood. (Header only; no value.)

SERVER
Concatenation of OS name, forward slash, OS version, comma, UPnP/1.0, comma, product name, forward slash, and product version. String.

Body

SOAP:Envelope
xmlns namespace attribute is "urn:schemas-xmlsoap-org:soap.v1". All SOAP-defined elements is qualified with this namespace. Contains the following sub elements:

SOAP:Header
(No SOAP:Header is used to query the value of a variable.)

SOAP:Body
Is qualified with SOAP namespace. Contains the following sub element:

QueryStateVariableResponse
xmlns namespace attribute is urn:schemas-upnp-org:control:1:0. Contains the following sub element:

return (Element name not qualified by a namespace; element nesting context is sufficient.) Value is current value of the state variable specified in varName element in request.

If the service cannot provide a value for the request, then the service sends a response in the following format. Values in italics are placeholders for actual values.

```
HTTP/1.1 200 OK
CONTENT-LENGTH: bytes in body
CONTENT-TYPE: text/xml
DATE: when response was generated
EXT:
SERVER: OS / version, UPnP / 1.0, product / version
<SOAP:Envelope xmlns:SOAP="urn:schemas-xmlsoap-org:soap.v1">
<SOAP:Body>
<SOAP:fault>
<faultcode>code for request error</faultcode>
<faultstring>string describing request error</faultstring>
<runcode>did request get to device?</runcode>
</SOAP:fault>
</SOAP:Body>
</SOAP:Envelope>
```

(Headers for a response when a service cannot provide a value are the same as headers for a response when a service does. See above.)

Body

SOAP:Envelope xmlns namespace attribute is "urn:schemas-xmlsoap-org: soap.v1". All SOAP-defined elements is qualified with this namespace. Contains the following sub elements:

SOAP:Header (No Header element in response to control message.)

SOAP:Body

Is qualified with SOAP namespace. Contains the following sub element:

SOAP:fault

Why the service did not accept the action request. Contains the following sub elements:

faultcode

Code identifying why service did not accept the action request. Has one of the following values:

304

Invalid variable name, i.e., no state variable by that name at this service.

faultstring

Short description for end user. Defined by a UPnP Forum working committee or delegated to UPnP vendor. String. Recommend<256 characters.

runcode

Whether or not the request reached the service. Could be relevant if another system is operating as a proxy, bridge, or gateway for device and it's services. Is one of the following values:

0

Maybe

1

No

2

Yes

4. Eventing

Eventing is Step 4 in UPnP networking. Eventing comes after discovery (Step 1) where control points find interesting device(s), and after description (Step 2) where control points learn about device capabilities. Eventing is intimately linked with control (Step 3) where control points send actions to devices. Through eventing, control points listen to state changes in device(s). Control and eventing are complementary to presentation (Step 5) where control points display a user interface provided by device(s).

After a control point has (1) discovered a device and (2) retrieved a description of the device, the control point has the bare essentials for eventing. As is the case with control, to learn more about the device's services, the control point retrieves a detailed UPnP description for each service of interest.

As the section on Control explains, a UPnP description for a service includes a list of actions the service responds to and a list of variables that model the state of the service at run time. If one or more of these state variables are evented, then the service publishes updates when these variables change, and a control point may subscribe to receive this information.

To subscribe to eventing, a control point sends a subscription message. If the subscription is accepted, the service responds with a duration for the subscription. To keep the subscription active, a control point renews its subscription before the subscription expires. When a control point no longer needs eventing from a particular service, the control point cancels its subscription. This section explains subscription, renewal, and cancellation messages in detail below.

The service publishes changes to state variables by sending event messages. Event messages contain the names of one of more state variables and the current value of those variables, expressed in XML. A special initial event message is sent when a control point first subscribes; this event message contains the names and values for all evented variables and allows the subscriber to initialize its model of the state of the service. To support scenarios with multiple control points, eventing is designed to keep all control points equally informed about the effects of any action. Therefore, all subscribers are sent all event messages, subscribers receive event messages for all evented variables (not just some), and event messages are sent no matter why the state variable changed (either in response to a requested action or because the state the service is modeling changed). This section explains the format of event messages in detail below.

Some state variables may change value too rapidly for eventing to be useful. One alternative is to filter, or moderate, the number of event messages sent due to changes in a variable's value. Some state variables may contain values too large for eventing to be useful; for this, or other reasons, a service may designate one or more state variables as non evented and never send event messages to a subscriber. To determine the current value for such non-evented variables, control points poll the service explicitly. This section explains how variable eventing is described within a service description. The section on Control explains how to poll a service for a variable value.

To prevent a race condition between events headed for control points and requested actions headed for a service, control messages may include a key. With each new event message a service generates, the service increments the key, and includes that key in the event message. When a control point sends a control message, it may choose to include a key. If a control message includes a key, the service checks to see if the key is current, i.e., if no events have been sent since this key was issued. If the key is current (or if there was no key in the control message), then the service acknowledges the action request. If the key is not current, the service fails the action request. This section explains details of event keys and the synchronization between control and event messages.

To send and receive subscription and event messages, control points and services use the following subset of the overall UPnP protocol stack. (The overall UPnP protocol stack is listed at the beginning of this document.)

At the highest layer, subscription and event messages contain vendor-specific information like URLs for subscription and duration of subscriptions or specific variable values. Moving down the stack, vendor content is supplemented by information from a UPnP Forum working committee, like service identifiers or variable names. Messages from the layers above are hosted in UPnP-specific protocols, defined in this document. In turn, the above messages are formatted using General Event Notification Architecture (GENA) headers, and the messages are delivered via HTTP over TCP over IP. For reference, colors in [square brackets] above indicate which protocol defines specific header elements in the subscription messages listed below.

The remainder of this section first explains subscription, including details of subscription messages, renewal messages, and cancellation messages. Second, it explains in detail how event messages are formatted and sent to control points, the initial event message, and how event keys synchronize control and eventing. Finally, it explains the UPnP Template Language as it pertains to eventing.

4.1 Eventing: Subscription

A service has eventing if and only if one or more of the state variables are evented. If a service has eventing, it publishes event messages to interested control points, or subscribers. The service maintains a list of subscribers, keeping for each subscriber the following information.

unique subscription identifier

Is unique over the lifetime of the subscription, however long or short that may be. Generated by service in response to subscription message. Recommend universally-unique identifiers to ensure uniqueness. Single URI.

delivery URL for event messages

Provided by control point in subscription message. Single URL.

event key

Key is 0 for initial event message. Key is sequentially numbered for each subsequent event message; control points can verify that no event messages have been lost if the control point has received sequentially numbered event keys. Single integer.

subscription duration

Amount of time, or duration until subscription expires. Single integer or keyword infinite.

The service may wish to persist subscriptions across power failures. While control points can recover from complete network failure, if the problem is brief and localized to the device, reusing stored subscriptions may speed recovery.

The list of subscribers is updated via subscription, renewal, and cancellation messages explained below and event messages explained later in this section.

To subscribe to eventing for a service, a control point sends a subscription message containing a URL for the publisher, a service identifier for the publisher, and a delivery URL for event messages. The subscription message may also include a requested duration for the subscription. The URL and service identifier for the publisher come from a description message. As the section on Description explains, a description message contains a device description. A device description contains (among other things), for each service, an eventing URL (in the eventSubURL element) and a service identifier (in the serviceId element); these correspond to the URL and service identifier for the publisher, respectively.

The subscription message is a request to receive all event messages. No mechanism is provided to subscribe to event messages on a variable-by-variable basis. A subscriber is sent all event messages from the service. This is one factor to be considered when designing a service.

If the subscription is accepted, the service responds with unique identifier for this subscription and a duration for this subscription. A duration is chosen that matches assumptions about how frequently devices are removed from the network; if devices are removed every few minutes, then the duration is similarly short, allowing a service to rapidly deprecate any expired subscribers; if devices are semi-permanent, then the duration is very long, minimizing the processing and traffic associated with renewing subscriptions.

As soon as possible after the subscription is accepted, the service also sends the first, or initial event message to the subscriber. This message includes the names and current values for all evented variables. (The data type and range for each variable is described in a service description. The section on Control explains this in more detail.)

To keep the subscription active, a control point renews its subscription before the subscription expires by sending a renewal message. The renewal message is send to the same URL as the subscription message, but the renewal message does not include a delivery URL for event messages; instead the renewal message includes the subscription identifier. The response for a renewal message is the same as one for a subscription message.

If a subscription expires, the subscription identifier becomes invalid, and the service stops sending event messages to the control point and can clean up its list of subscribers. If the control point tries to send any message other than a subscription message, the service will reject the message because the subscription identifier is invalid. To send control messages to the service, the control point sends a subscription message and get a new subscription identifier.

When a control point no longer needs eventing from a particular service, the control point cancels its subscription. Canceling a subscription generally reduces service, control point, and network load. If a control point is removed abruptly from the network, it might be impossible to send a cancellation message. As a fallback, the subscription will eventually expire on its own unless renewed.

Below is an explanation of the specific format of requests, responses, and errors for subscription, renewal, and cancellation messages.

4.1.1 Eventing: Subscribing: SUBSCRIBE with NT and CALLBACK

For each service in a device, a description message contains an eventing URL (eventSubURL sub element of service element in the device description) and the UPnP service identifier (serviceId sub element in service element in device description). To subscribe to eventing for a particular service, a subscription message is sent to that service's eventing URL. The message contains that service's identifier as well as a delivery URL for event messages. A subscription message may also include a requested subscription duration.

To subscribe to eventing for a service, a control point sends a request with method SUBSCRIBE and NT and CALL- BACK headers in the following format. Values in italics are placeholders for actual values.

SUBSCRIBE publisher path HTTP/1.1
    HOST: publisher host:publisher port
    CALLBACK: <delivery URL>
    NT: upnp:event
    TIMEOUT: Second-requested subscription duration
    (No body for request with method SUBSCRIBE.)

Listed below are details for the request line and headers appearing in the listing above. All header values are case sensitive except where noted.

Request Line

SUBSCRIBE
    Method defined by GENA.

publisher path
    Path component of eventing URL (eventSubURL sub element in service element in device description). Single, relative URL.

HTTP/1.1
    HTTP version.
    Headers

HOST
    Domain name or IP address and optional port components of eventing URL (eventSubURL sub element in service element in device description). If the port is missing or empty, port 80 is assumed.

CALLBACK
    Location to send event messages to. Defined by UPnP vendor. If there is more than 1 URL, when the service sends events, it will try these URLs in order until one succeeds. One or more URLs separated by angle brackets.

NT
    Notification Type. Is upnp:event.

SID
    (No SID header is used to subscribe.)

TIMEOUT
    Requested duration until subscription expires, either number of seconds or infinite. Recommendation by a UPnP Forum working committee. Defined by UPnP vendor. Keyword Second—followed by an integer (no space) or keyword infinite.

To accept the subscription, the service assigns a unique identifier for the subscription, assigns a duration for the subscription, and sends an initial event message (explained in detail later in this section). To accept a subscription request, a service sends a response in the following format. Values in italics are placeholders for actual values.

HTTP/1.1 200 OK
    DATE: when response was generated
    SERVER: OS/version, UPnP/1.0, product/version
    SID: uuid:subscription UUID
    TIMEOUT: Second-actual subscription duration
    (No body for response to a request with method SUBSCRIBE.)

Listed below are details for headers appearing in the listing above. All header values are case sensitive except where noted.

Headers

DATE
    When response was generated. RFC 1123 date.

SERVER
    Concatenation of OS name, forward slash, OS version, comma, UPnP/1.0, comma, product name, forward slash, and product version. String.

SID
    Subscription identifier. Is universally-unique. Begins with uuid:. Defined by UPnP vendor. Single URI.

TIMEOUT
    Actual duration until subscription expires, either number of seconds or infinite. Recommendation by a UPnP Forum working committee. Defined by UPnP vendor. Is >1800 seconds (30 minutes). Keyword Second—followed by an integer (no space) or keyword infinite.

If a service cannot accept another event subscriber, or if there is an error with the subscription request, the service sends a response with one of the following errors.

Errors

Incompatible headers
    400 Bad Request. If SID header and one of NT or CALLBACK headers are present, the service responds with HTTP error 400 Bad Request.

Missing or invalid CALLBACK
    412 Precondition Failed. If CALLBACK header is missing or does not contain a valid HTTP URL, the service responds with HTTP error 412 Precondition Failed.

Unable to accept subscription
    5xx. If a service is not able to accept a subscription, it responds with a HTTP 500-series error code.

Other errors may be returned by layers in the protocol stack below UPnp. Consult documentation on those protocols for details.

4.1.2 Eventing: Renewing a Subscription: SUBSCRIBE with SID

To renew a subscription to eventing for a particular service, a renewal messages is sent to that service's eventing URL. However, unlike an initial subscription message, a renewal message does not contain either the service's identifier nor a delivery URL for event messages. Instead, the message contains the subscription identifier assigned by the service, providing an unambiguous reference to the subscription to be renewed. Like a subscription message, a renewal message may also include a requested subscription duration.

The renewal message uses the same method as the subscription message, but the two messages use a disjoint set of headers; renewal uses SID and subscription uses NT and CALLBACK. A message that includes SID and either of NT or CALLBACK headers is an error.

To renew a subscription to eventing for a service, a control point sends a request with method SUBSCRIBE and SID header in the following format. Values in italics are placeholders for actual values.

SUBSCRIBE publisher path HTTP/1.1
    HOST: publisher host:publisher port
    SID: uuid:subscription UUID
    TIMEOUT: Second-requested subscription duration
    (No body for method with request SUBSCRIBE.)

Listed below are details for the request line and headers appearing in the listing above. All header values are case sensitive except where noted.

Request Line

SUBSCRIBE
    Method defined by GENA.

publisher path

Path component of eventing URL (eventSubURL sub element in service element in device description). Single, relative URL.

HTTP/1.1

HTTP version.

Headers

HOST

Domain name or IP address and optional port components of eventing URL (eventSubURL sub element in service element in device description). If the port is missing or empty, port 80 is assumed.

CALLBACK (No CALLBACK header is used to renew an event subscription.)

NT (No NT header is used to renew an event subscription.)

SID

Subscription identifier. Is the subscription identifier assigned by service in response to subscription request. Is universally-unique. Begins with uuid:. Defined by UPnP vendor. Single URI.

TIMEOUT

Requested duration until subscription expires, either number of seconds or infinite. Recommendation by a UPnP Forum working committee. Defined by UPnP vendor. Keyword Second—followed by an integer (no space) or keyword infinite.

To accept a renewal, the service reassigns a duration for the subscription. (No initial event message. See below.) To accept a renewal, a service sends a response in the same format as a response to a request for a new subscription.

If a service cannot accept the renewal, or if there is an error with the renewal request, the service sends a response with one of the following errors.

Errors

Incompatible headers

400 Bad Request. If SID header and one of NT or CALLBACK headers are present, the service responds with HTTP error 400 Bad Request.

Invalid SID

404 Not Found. If a SID does not correspond to a known, un-expired subscription, the service responds with HTTP error 404 Not Found.

Missing SID

412 Precondition Failed. If the SID header is missing or empty, the service responds with HTTP error 412 Precondition Failed.

Unable to accept renewal

5xx. If the service is not able to accept a renewal, it responds with a HTTP 500-series error code.

Other errors may be returned by layers in the protocol stack below UPnP. Consult documentation on those protocols for details.

4.1.3 Eventing: Canceling a Subscription: UNSUBSCRIBE

When eventing is no longer needed from a particular service, a cancellation message is sent to that service's eventing URL. The message contains the subscription identifier. Canceling a subscription generally reduces service, control point, and network load. If a control point is removed abruptly from the network, it might be impossible to send a cancellation message. As a fallback, the subscription will eventually expire on its own unless renewed.

To cancel a subscription to eventing for a service, a control point sends a request with method UNSUBSCRIBE in the following format. Values in italics are placeholders for actual values.

UNSUBSCRIBE publisher path HTTP/1.1

HOST: publisher host:publisher port

SID: uuid:subscription UUID (No body for request with method UNSUBSCRIBE.)

Listed below are details for the request line and headers appearing in the listing above. All header values are case sensitive except where noted.

Request Line

UNSUBSCRIBE

Method defined by GENA.

publisher path

Path component of eventing URL (eventSubURL sub element in service element in device description). Single, relative URL.

HTTP/1.1

HTTP version.

Headers

HOST

Domain name or IP address and optional port components of eventing URL (eventSubURL sub element in service element in device description). If the port is missing or empty, port 80 is assumed.

CALLBACK (No CALLBACK header is used to cancel an event subscription.)

NT (No NT header is used to cancel an event subscription.)

SID

Subscription identifier. Is the subscription identifier assigned by service in response to subscription request. Is universally-unique. Begins with uuid:. Defined by UPnP vendor. Single URI.

TIMEOUT (No TIMEOUT header is used to cancel an event subscription.)

To cancel a subscription, a service sends a response in the following format. Values in italics are placeholders for actual values.

HTTP/1.1 200 OK

If there is an error with the cancellation request, the service sends a response with one of the following errors.

Errors

Incompatible headers

400 Bad Request. If SID header and one of NT or CALLBACK headers are present, the service responds with HTTP error 400 Bad Request.

Invalid SID

404 Not Found. If a SID does not correspond to a known, un-expired subscription, the service responds with HTTP error 404 Not Found.

Missing SID

412 Precondition Failed. If the SID header is missing or empty, the service responds with HTTP error 412 Precondition Failed.

Other errors may be returned by layers in the protocol stack below UPnP. Consult documentation on those protocols for details.

4.2 Eventing: Event Messages

A service publishes changes to its state variables by sending event messages. These messages contain the names of one or more state variables and the current value of those variables. Event messages is sent as soon as possible to get accurate information about the service to control points and allow control points to display a responsive user interface. If the value of more than one variable is changing at the same time, the service bundles these changes into a single event message to reduce processing and network traffic.

As explained above, an initial event message is sent when a control point first subscribes; this event message contains the names and values for all evented variables and allows the subscriber to initialize its model of the state of the service. This message is sent as soon as possible after the service accepts a subscription.

Event messages are tagged with an event key to detect a race condition between event messages headed for control points and control messages headed for a device. A separate event key is maintained by the service for each subscription to facilitate error detection (as explained below). The event key for a subscription is initialized to 0 when the service sends the initial event message. For each subsequent event message, the service increments the event key for a subscription, and includes that updated key in the event message. Any implementation of event keys handles overflow and wrap the event key back to 1 (not 0). Control point also handles this special case when the next event key is not an increment of the previous key.

If there is no response from a control point to the event message, the service continues to send event messages to the control point until the subscription expires.

To repair an event subscription, e.g., if a control point has missed one or more event messages, a control point unsubscribes and re-subscribes. By doing so, the control point will get a new subscription identifier, a new initial event message, and a new event key. With these, the control point can resume sending successful control messages to the service.

4.2.1 Eventing: Event Messages: NOTIFY

To send an event message, a service sends a request with method NOTIFY in the following format. Values in italics below are placeholders for actual values.

```
NOTIFY delivery path HTTP/1.1
HOST: delivery host:delivery port
CONTENT-TYPE: text/xml
CONTENT-LENGTH: bytes in body
NT: upnp:event
NTS: upnp:propchange
SID: uuid:subscription UUID
SEQ: event key
<e:propertyset xmlns:e="urn:schemas-upnp-org:event:1:0">
<e:property>
<variableName>new value<variableName>
</e:property>
Other variable names and values (if any) go here.
</e:propertyset>
```

Listed below are details for the request line, headers, and body elements appearing in the listing above. All header values are case sensitive except where noted. All body elements and attributes are case sensitive; body values are not case sensitive except where noted. Except where noted, the order of elements is insignificant.

Request Line

NOTIFY
   Method defined by GENA.

delivery path
   Path component of delivery URL (CALLBACK header in subscription message). Destination for event message. Single, relative URL.

HTTP/1.1
   HTTP version.
   Headers

HOST
   Domain name or IP address and optional port components of delivery URL (CALLBACK header in subscription message). If the port is missing or empty, port 80 is assumed.

CONTENT-LENGTH
   Length of body in bytes. Integer.

CONTENT-TYPE
   Is text/xml.

NT
   Notification Type. Is upnp:event.

NTS
   Notification Sub Type. Is upnp:propchange.

SID
   Subscription identifier. Is universally unique. Begins with uuid:. Defined by UPnP vendor. Single URI.

SEQ
   Event key. Is 0 for initial event message. Is incremented by 1 for each event message sent to a particular subscriber. Is 8 bytes. Single integer.

Body propertyset
   xmlns namespace attribute is urn:schemas-upnp-org:event:1:0. All sub elements is qualified with this namespace. Contains the following sub element.

property
   Repeat once for each variable name and value in the event message. Is qualified by propertyset namespace. Contains the following sub element.

variableName
   Element is name of a state variable that changed (name sub element of stateVariable element in service description). Is qualified by propertyset namespace. Values is the new value for this state variable. Single data type as specified by UPnP Service Template.

For future extensibility, when processing XML like the listing above, devices and control points ignore any unknown elements and any sub elements or content as specified by the Flexible XML Processing Profile (FXPP).

To acknowledge receipt of this event message, a control point responds in the following format.

HTTP/1.1 200 OK
(No body for a request with method NOTIFY.)

If there is an error with the event message, the control point responds with one of the following errors.

Errors

Missing SID

412 Precondition Failed. If the SID header is missing or empty, the control point responds with HTTP error 412 Precondition Failed.

Invalid SID

412 Precondition Failed. If a SID does not correspond to a known subscription, the control point responds with HTTP error 412 Precondition Failed. (Service terminates this SID when it receives this error response.)

Missing NT or NTS header

400 Bad Request. If the NT or NTS header is missing, the control point responds with HTTP error 400 Bad Request.

Invalid NT or NTS header (200 OK. No error. If NT or NTS header is invalid, the control point ignores it and respond with HTTP 200 OK.)

Other errors may be returned by layers in the protocol stack below UPnP. Consult documentation on those protocols for details.

4.3 Eventing: UPnP Template Language for Eventing

The UPnP Template Language defines well-formed templates for devices and services. To a lesser extent, it also provides a template for the body of event messages. The section on Description explains the UPnP Template Language as it pertains to devices, and the section on Control explains the UPnP Template Language as it pertains to services. As explained in those sections, the UPnP Template Language is written in XML syntax and is derived from XML Schema (Part 1: Structures, Part 2: Datatypes). Below is a listing of this language as it pertains to eventing. The elements it defines are used in event messages; they are colored green here, and they are colored green in the listing above. Below is where these elements are defined (though it is a minimal definition); above is where they are used.

Immediately following this is a brief explanation of the XML Schema elements, attributes, and values used. The reference to XML Schema at the end of this section has further details.

---

UPnP Template Language for eventing

```
<?xml version="1.0" ?>
<Schema name="urn:schemas-upnp-org:event:1:0"
xmlns="urn:schemas-microsoft-com:xml-data"
xmlns:dt="urn:schemas-microsoft-com:datatypes">
<ElementType name="propertyset" content="eltOnly">
<element type="property" maxOccurs="*" />
</ElementType>
<ElementType name="property" content="eltOnly" model="open" />
</Schema>
```

--- element

References an element for the purposes of declaring nesting. maxOccurs attribute defines maximum number of times the element occurs; default is maxOccurs=1; elements that can appear one or more times have maxOccurs=*.

ElementType

Defines an element in the new, derived language. name attribute defines element name. model attribute indicates whether elements in the new, derived language can contain elements not explicitly specified here; when only unspecified sub elements may be included, model=open. content attribute indicates what content may contain; elements that contain only other elements have content=eltOnly.

As explained in the section on Control, the UPnP Template Language for services also specifies a sendEvents attribute for a state variable. The default value for this attribute is yes. To denote that a state variable is evented, the value of this attribute is yes (or the attribute is omitted) in a service description; to denote that a state variable is non-evented, the value is no. Note that if all of a service's state variables are non-evented, the service has nothing to publish, and control points cannot subscribe and will not receive event messages from the service.

4.4 Eventing: Augmenting the UPnP Template Language

It is useful to augment the description of devices and services with annotations that are not captured in the UPnP Template Language. To a lesser extent, there is value in these annotations to capture event filtering, or moderation.

As explained above, some state variables may change value too rapidly for eventing to be useful. Below is a recommended vocabulary for UPnP Forum working committees or UPnP vendors to document moderation in the number of event messages sent due to changes in a variables value.

maximumRate=n

Optional. State variable v will not be part of an event message more often than n seconds. If v is the only variable changing, then an event message will not be generated more often than every n seconds. If v ceases to change after an event message has been sent but before n seconds have transpired, an event message is sent with the new value of v. Recommended for variables that model continuously changing properties. Single integer.

minimumDelta=n

Optional. State variable v will not be part of an event message unless its value has changed by more than n* allowedValueRange step since the last time an event message was sent that included v, e.g., unless v has been incremented n times. (cf. INCREMENT, INCREMENT_BOUNDED, and INCREMENT_WRAP explained in the section on Control.) Only defined variables with number and real data type. Recommended for variables that model counters. Single integer.

5. Presentation

Presentation is Step 5 in UPnP networking. Presentation comes after discovery (Step 1) where control points find interesting device(s), and after description (Step 2) where control points learn about device capabilities. Presentation exposes an HTML-based user interface for controlling and/or viewing device status. Presentation is complementary to control (Step 3) where control points send actions to devices, and eventing (Step 4) where control points listen to state changes in device(s).

After a control point has (1) discovered a device and (2) retrieved a description of the device, the control point is ready to begin presentation. If a device has a URL for presentation, then the control point can retrieve a page from this URL, load the page into a browser, and depending on the capabilities of the page, allow a user to control the device and/or view device status. The degree to which each of these can be accomplished depends on the specific capabilities of the presentation page and device.

The URL for presentation is contained within the presentationURL element in the device description. The device description is delivered via a description message. The section on Description explains the device description and description messages in detail.

Retrieving a presentation page is a simple HTTP-based process and uses the following subset of the overall UPnP protocol stack. (The overall UPnP protocol stack is listed at the beginning of this document.)

At the highest layer, the presentation page is specified by a UPnP vendor. Moving down the stack, the UPnP Device Architecture specifies that this page be written in HTML. The page is delivered via HTTP over TCP over IP. For reference, colors in [square brackets] are included for consistency with other sections in this document.

To retrieve a presentation page, the control point issues an HTTP GET request to the presentation URL, and the device returns a presentation page.

Unlike the UPnP Device and Service Templates, and standard device and service types, the capabilities of the presentation page are completely specified by the UPnP vendor. The presentation page is not under the auspices of a UPnP Forum working committee. The page is an HTML page; it is version HTML 3.0 or later. However, other design aspects are left to the vendor to specify. This includes, but is not limited to, all capabilities of the control point's browser, scripting language or browser plug-ins used, and means of interacting with the device. To implement a presentation page, a UPnP vendor may wish to use UPnP mechanisms for control and/or eventing, leveraging the device's existing capabilities but is not constrained to do so.

GLOSSARY action
Command exposed by a service. Takes one or more arguments but does not return values. For more information, see section on Control.

argument
Parameter for action exposed by a service. For more information, see section on Control.

control point
Retrieves device and service descriptions, sends actions to services, polls for service state variables, and receives events from services.

device
Logical device. A container. May embed other logical devices. Embeds one or more services. For more information, see section on Description.

device definition
Formal definition of a logical device, expressed in the UPnP Template Language. Written in XML syntax. Specified by a UPnP vendor by filling in the placeholders in a UPnP Device Template, including, e.g., manufacturer name, model name, model number, serial number, and URLs for control, eventing, and presentation. For more information, see section on Description.

device type
Standard device types are denoted by urn:schemas-upnp-org:device: followed by a unique name assigned by a UPnP Forum working committee. One-to-one relationship with UPnP Device Templates. UPnP vendors may specify additional device types; these are denoted by urn:domain-name: device: followed by a unique name assigned by the vendor, where domain-name is a domain name registered to the vendor. For more information, see section on Description.

event
Notification of one or more changes in state variables exposed by a service. For more information, see section on Eventing.

root device
A logical device that is not embedded in any other logical device. For more information, see section on Description.

service
Logical functional unit. Exposes actions and models the state of a physical device with state variables. For more information, see section on Control.

service definition
Formal definition of a logical service, expressed in the UPnP Template language. Written in XML syntax. Specified by a UPnP vendor by filling in any placeholders in a UPnP Service Template. (Was SCPD.) For more information, see section on Control.

service type
Standard service types are denoted by urn:schemas-upnp-org:service: followed by a unique name assigned by a UPnP forum working committee, colon, and a version number. One-to-one relationship with UPnP Service Templates. UPnP vendors may specify additional services; these are denoted by urn:domain-name:service: followed by a unique name assigned by the vendor, colon, and a version number, where domain-name is a domain name registered to the vendor. For more information, see section on Description.

SOAP
Simple Object Access Protocol. A remote-procedure call mechanism based on XML that sends commands and receives values over HTTP. For more information, see section on Control.

SSDP
Simple Service Discovery Protocol. A multicast discovery and search mechanism that uses a multicast variant of HTTP over UDP. For more information, see section on Discovery.

state variable
Single facet of a model of a physical service. Exposed by a service. Has a name, data type, optional default value, optional constraints values, and may trigger events when its value changes. For more information, see section on Control.

UPnP Device Template
Template listing device type, embedded devices (if any), and services. Written in XML syntax and derived from the UPnP Template Language. Defined by a UPnP Forum working committee. One-to-one relationship with standard device types. For more information, see section on Description.

UPnP Service Template
Template listing action names, parameters for those actions, state variables, and properties of those state variables. Written in XML syntax and derived from the UPnP Template Language. Defined by a UPnP Forum working committee. One-to-one relationship with standard service types. For more information, see section on Control.

UPnP Template Language
Defines the elements and attributes used in UPnP Device and Service Templates. Written in XML syntax and derived from XML Schema (Part 1: Structures, Part 2: Datatypes). Defined by the UPnP Device Architecture herein. For more information, see sections on Description and Control.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a network of computing devices interoperating via a peer networking protocol, a method of peer networking protocol hosting for a group of controllable logical devices, wherein computing devices on the network are able to interoperate with the hosted logical devices via the peer networking protocol, the method comprising:

in a computing device with software installed thereon for a peer networking host having an implementation of the peer networking protocol, providing an application programming interface associated with the peer networking host software for invoking by a software program also installed on the computing device that implements a controllable logical device having a set of device services to obtain peer network protocol hosting of the controllable logical device and the controllable logical device's device services from the peer networking host, the controllable logical device otherwise lacking peer networking functionality, the software program of the controllable logical device providing descriptive data of the hosted controllable logical device and the hosted controllable logical device's device services to the peer networking host via the application programming interface;

serving discovery requests per the peer networking protocol from the network by the peer networking host, where the discovery request seeks discovery inclusive of the hosted controllable logical device;

serving description requests per the peer networking protocol from the network directed to the hosted controllable logical device within the peer networking host;

serving presentation requests per the peer networking protocol from the network directed to the hosted controllable logical device within the peer networking host;

proxying service control requests per the peer networking protocol from the network directed to the device services of the hosted controllable logical device within the peer networking host, wherein the peer networking host invokes the respective device service responsive to a particular service control request; and communicating events sourced from the hosted controllable logical device by the peer networking host to the network in accordance with the peer networking protocol.

2. A computer-readable storage medium having a link-able program module thereon, the program module executable on a computer in a network of computing devices interoperating via a peer networking protocol to provide hosting of the peer networking protocol for logical device software installed on the computer that operates as a controllable logical device having a set of services on the computer such that computing devices in the network of computing devices interoperate with the controllable logical device through the peer networking protocol, the controllable logical device otherwise lacking peer networking protocol functionality, the program module comprising:

a discovery application programming interface for receiving device discovery data from the logical device software;

a discovery protocol server module operating to serve discovery responses to discovery requests received in the peer networking protocol at the computer from the network that seek discovery inclusive of the controllable logical device;

a description application programming interface for receiving device description data from the logical device software;

a description protocol server module operating to serve description responses to description requests received in the peer networking protocol at the computer from the network and directed toward the controllable logical device;

a service control application programming interface for interfacing to the services;

a service control server module operating responsive to control messages received in the peer networking protocol at the computer from the network that are directed to the services of the controllable logical device so as to invoke the services in accordance with the control messages;

a presentation application programming interface for receiving presentation data from the logical device software; and a presentation server module operating to serve presentation responses to presentation requests received in the peer networking protocol at the computer from the network and directed toward the controllable logical device.

3. A distributed computing network having at least one computing device, the distributed computing network comprising:

a plurality of peer networking computing devices communicating according to a peer networking connectivity model having user control points and controlled devices;

at least some of said peer networking computing devices being programmed to operate as controlled devices exposing at least one operational function to control from others of said peer networking computing devices;

at least some of said peer networking computing devices being programmed to operate as user control points whereat a user interface is presented for interaction by a user to control said controlled devices; and at least one of said peer networking computing devices being a computer having a peer networking host that implements the peer networking protocol for a plurality of hosted controlled logical devices which otherwise lack peer networking functionality executing on the computer via the peer networking host having an application programming interface for invoking by the hosted controlled logical devices to supply description data to the peer networking host, the peer networking host serving responses to discovery, description and service control requests from user control points according to the peer networking connectivity model for the hosted controlled logical devices, the peer networking host thereby exposing services of the hosted controlled logical devices to control from the user control points.

4. A computer-readable storage medium having a software program encoded thereon and executable on a computing device in a distributed network of peer computing devices, the software program comprising:

a peer networking host for software-implemented controllable logical devices on a computer in the distributed network operating as a discoverable, self-descriptive, peer controlled device according to a peer networking service control protocol defining communications between peer controlling devices and peer controlled devices permitting control of the peer controlled devices by the peer controlling devices on a peer networking basis, the controllable logical devices otherwise lacking peer networking functionality, the peer networking host having an application programming interface for invoking by software of controllable logical devices on the computer to supply description data of the controllable logical devices to the peer networking host;

proxy code in the peer networking host operating responsive to control communications from a peer controlling device according to the peer networking device control protocol to invoke services of the software-implemented controllable logical devices via an application programming interface.

5. The computer-readable storage medium of claim 4 wherein the services of the software-implemented controllable logical devices are programming objects exposing object automation interfaces, and the proxy code invokes the services via calls to the object automation interfaces.

6. The computer-readable storage medium of claim 5 wherein the object automation interfaces comprise a run-time invocation dispatching interface.

* * * * *